United States Patent
Holeton et al.

(10) Patent No.: US 12,472,839 B2
(45) Date of Patent: Nov. 18, 2025

(54) POWER SOURCE AND CONTROL SYSTEM FOR A LAWN MOWER

(71) Applicant: Ariens Company, Brillion, WI (US)

(72) Inventors: Michael J. Holeton, Kaukauna, WI (US); Clayton J. Van Thiel, Little Chute, WI (US); William Tenorio, Woodridge, IL (US)

(73) Assignee: Ariens Co., Brillion, WI (US)

( * ) Notice: Subject to any disclaimer, the term of this patent is extended or adjusted under 35 U.S.C. 154(b) by 794 days.

(21) Appl. No.: 17/767,823

(22) PCT Filed: Sep. 18, 2020

(86) PCT No.: PCT/US2020/051636
§ 371 (c)(1),
(2) Date: Apr. 8, 2022

(87) PCT Pub. No.: WO2021/071655
PCT Pub. Date: Apr. 15, 2021

(65) Prior Publication Data
US 2023/0122499 A1 Apr. 20, 2023

Related U.S. Application Data

(60) Provisional application No. 62/914,107, filed on Oct. 11, 2019.

(51) Int. Cl.
*B60L 53/80* (2019.01)
*A01D 34/66* (2006.01)
(Continued)

(52) U.S. Cl.
CPC .............. *B60L 53/80* (2019.02); *A01D 69/02* (2013.01); *B60L 53/60* (2019.02); *H02J 7/0029* (2013.01);
(Continued)

(58) Field of Classification Search
None
See application file for complete search history.

(56) References Cited

U.S. PATENT DOCUMENTS

| | | |
|---|---|---|
| 4,849,682 A | 7/1989 | Bauer et al. |
| 5,007,234 A | 4/1991 | Shurman et al. |
| (Continued) | | |

FOREIGN PATENT DOCUMENTS

| | | |
|---|---|---|
| CA | 2227539 C | 10/1998 |
| CA | 2586830 A1 | 11/2007 |
| (Continued) | | |

OTHER PUBLICATIONS

Inventus Power, Charging Specification for 03-57409-001 Ariens McFly Project, Copyright 2018, 9 Pages.
(Continued)

*Primary Examiner* — Tynese V McDaniel
(74) *Attorney, Agent, or Firm* — Michael Best & Friedrich LLP

(57) ABSTRACT

A battery-powered electric lawn mower includes battery packs mounted on a docking stations of a bus bar by way of a gravity-biased engagement. The lawn mower also includes a priority charging control logic for giving priority of charge to battery packs that have a state of charge over a threshold. The lawn mower also includes a live to drive system which alerts the user when the lawn mower is capable of moving in response to manipulation of controls. The lawn mower also includes a variable speed control which adjusts a sensitivity of speed controls such that more precise, slower speed control of the lawn mower is achieved when mowing around trees and the like.

13 Claims, 39 Drawing Sheets

(51) Int. Cl.
*A01D 69/02* (2006.01)
*A01D 101/00* (2006.01)
*B60L 53/60* (2019.01)
*H02J 7/00* (2006.01)

(52) U.S. Cl.
CPC .......... *H02J 7/0045* (2013.01); *H02J 7/0047* (2013.01); *H02J 7/0063* (2013.01); *A01D 34/66* (2013.01); *A01D 2101/00* (2013.01)

(56) References Cited

U.S. PATENT DOCUMENTS

| | | | | |
|---|---|---|---|---|
| 5,042,238 | A * | 8/1991 | White, III | B62D 9/00 |
| | | | | 280/211 |
| 5,251,711 | A * | 10/1993 | Meyer | A47L 5/28 |
| | | | | 180/19.1 |
| 5,303,532 | A | 4/1994 | Phillips | |
| 5,335,487 | A | 8/1994 | Murakawa et al. | |
| 5,402,626 | A * | 4/1995 | Zinck | A01D 34/78 |
| | | | | 56/11.9 |
| 5,488,818 | A * | 2/1996 | Powers | A01D 34/6806 |
| | | | | D15/18 |
| 5,502,957 | A * | 4/1996 | Robertson | A01D 34/6806 |
| | | | | 56/10.2 G |
| 5,594,411 | A | 1/1997 | Ono | |
| 5,644,903 | A | 7/1997 | Davis, Jr. | |
| 5,760,569 | A | 6/1998 | Chase, Jr. | |
| 5,848,520 | A * | 12/1998 | Arfstrom | B62D 11/183 |
| | | | | 56/11.4 |
| 5,894,714 | A * | 4/1999 | Braun | F16H 61/66 |
| | | | | 56/11.4 |
| 5,934,051 | A * | 8/1999 | Hahn | B60K 28/04 |
| | | | | D15/15 |
| 5,934,053 | A * | 8/1999 | Fillman | A01D 34/44 |
| | | | | 56/11.9 |
| 5,983,612 | A * | 11/1999 | Bauswell | A01D 69/02 |
| | | | | 180/68.5 |
| D422,605 | S * | 4/2000 | Danthois | D15/17 |
| 6,070,690 | A | 6/2000 | Eavenson et al. | |
| 6,082,083 | A | 7/2000 | Staples et al. | |
| 6,171,126 | B1 | 1/2001 | Wu et al. | |
| D449,622 | S * | 10/2001 | Csonka | D15/14 |
| 6,350,149 | B1 | 2/2002 | Nakane | |
| 6,609,357 | B1 | 8/2003 | Davis et al. | |
| 6,616,174 | B2 | 9/2003 | Bierma | |
| 6,666,187 | B2 | 12/2003 | Dahlberg et al. | |
| 6,826,895 | B2 | 12/2004 | Iida et al. | |
| 6,892,517 | B2 * | 5/2005 | Adams | A01D 34/78 |
| | | | | 56/10.2 R |
| 6,938,400 | B2 | 9/2005 | Fillman et al. | |
| 6,990,399 | B2 | 1/2006 | Hrazdera et al. | |
| 7,059,433 | B2 * | 6/2006 | Hasegawa | B60K 17/105 |
| | | | | 180/6.48 |
| 7,117,966 | B2 | 10/2006 | Kohda et al. | |
| 7,172,041 | B2 * | 2/2007 | Wuertz | B62D 11/04 |
| | | | | 180/335 |
| 7,320,843 | B2 | 1/2008 | Harrington | |
| 7,402,062 | B2 * | 7/2008 | Perry | H01R 11/287 |
| | | | | 439/248 |
| 7,478,689 | B1 | 1/2009 | Sugden et al. | |
| D588,613 | S * | 3/2009 | Schroeder | D15/28 |
| 7,549,243 | B1 * | 6/2009 | Gilles | E02F 3/627 |
| | | | | 403/321 |
| 7,594,377 | B1 * | 9/2009 | Jansen | A01D 34/006 |
| | | | | 56/10.2 H |
| 7,598,705 | B2 * | 10/2009 | Watson | H01M 50/264 |
| | | | | 320/114 |
| 7,604,507 | B1 | 10/2009 | Millon | |
| 7,659,809 | B2 | 2/2010 | Valascho et al. | |
| 7,665,564 | B2 * | 2/2010 | Smith | B60K 17/354 |
| | | | | 180/245 |
| 7,735,592 | B2 * | 6/2010 | Bellot | A01D 69/025 |
| | | | | 180/165 |
| 7,944,174 | B2 | 5/2011 | Casalena et al. | |
| 7,953,526 | B2 | 5/2011 | Durkos et al. | |
| 8,047,310 | B2 * | 11/2011 | Kallevig | B60K 26/00 |
| | | | | 180/6.48 |
| 8,056,653 | B2 * | 11/2011 | Hunt | B60K 6/46 |
| | | | | 56/10.7 |
| 8,104,552 | B2 * | 1/2012 | Papke | A01D 34/82 |
| | | | | 180/6.48 |
| 8,234,026 | B2 | 7/2012 | Wyatt et al. | |
| 8,282,413 | B2 | 10/2012 | Fukumoto et al. | |
| 8,459,662 | B2 | 6/2013 | Baird | |
| 8,472,205 | B2 | 6/2013 | Gondosch et al. | |
| 8,511,216 | B2 | 8/2013 | Sasahara et al. | |
| 8,543,295 | B2 * | 9/2013 | Bryant | B60T 8/175 |
| | | | | 701/42 |
| 8,548,694 | B2 | 10/2013 | Wyatt et al. | |
| 8,552,669 | B2 | 10/2013 | Kusakawa | |
| 8,572,939 | B2 | 11/2013 | Koike et al. | |
| 8,621,833 | B2 | 1/2014 | Shida et al. | |
| 8,653,786 | B2 * | 2/2014 | Baetica | H01M 50/262 |
| | | | | 56/11.9 |
| 8,689,918 | B2 | 4/2014 | Yu et al. | |
| 8,710,801 | B2 | 4/2014 | Schwartz | |
| 8,720,968 | B2 * | 5/2014 | Zalan | B60L 53/16 |
| | | | | 296/97.22 |
| 8,863,485 | B2 | 10/2014 | Pitcel et al. | |
| 8,965,669 | B2 | 2/2015 | Fisher et al. | |
| 8,966,870 | B2 | 3/2015 | Mackinnon et al. | |
| 8,984,711 | B2 | 3/2015 | Ota et al. | |
| 9,070,923 | B2 | 6/2015 | Yu et al. | |
| 9,112,292 | B2 | 8/2015 | Ogura | |
| 9,132,792 | B2 * | 9/2015 | Lyons | B29D 99/001 |
| 9,136,715 | B2 | 9/2015 | Wu | |
| 9,166,437 | B2 | 10/2015 | Hamburgen et al. | |
| 9,196,879 | B2 | 11/2015 | Hayashi et al. | |
| 9,210,839 | B2 * | 12/2015 | Schygge | B60L 50/60 |
| 9,226,444 | B2 * | 1/2016 | Schygge | A01D 69/02 |
| 9,282,695 | B2 | 3/2016 | Goto | |
| 9,288,939 | B2 * | 3/2016 | Porter | B62D 11/006 |
| 9,288,942 | B2 * | 3/2016 | Moriguchi | B60L 1/003 |
| 9,292,983 | B2 | 3/2016 | Luke et al. | |
| 9,301,443 | B2 | 4/2016 | Hashima et al. | |
| 9,313,948 | B2 | 4/2016 | Moriguchi et al. | |
| 9,350,132 | B2 | 5/2016 | Onoda | |
| 9,373,828 | B2 | 6/2016 | Kawatani et al. | |
| 9,403,435 | B2 | 8/2016 | Bejcek | |
| 9,404,465 | B2 * | 8/2016 | Koenen | B08B 3/026 |
| 9,408,343 | B2 | 8/2016 | Wyatt et al. | |
| 9,472,793 | B2 | 10/2016 | Kim et al. | |
| 9,496,531 | B2 * | 11/2016 | Hachisuka | H01M 10/425 |
| 9,502,801 | B2 | 11/2016 | Ogura | |
| 9,538,699 | B1 | 1/2017 | Bejcek et al. | |
| 9,601,729 | B2 | 3/2017 | Naito | |
| 9,616,736 | B2 * | 4/2017 | Ito | B60K 17/043 |
| 9,616,893 | B2 * | 4/2017 | Bejcek | A01D 34/69 |
| 9,624,891 | B2 * | 4/2017 | Koenen | H02J 7/0048 |
| 9,686,909 | B2 * | 6/2017 | Schygge | A01D 34/006 |
| 9,696,749 | B2 | 7/2017 | Kaskawitz et al. | |
| 9,699,965 | B2 * | 7/2017 | Schygge | B60L 50/66 |
| 9,706,706 | B2 | 7/2017 | Barendrecht | |
| 9,711,767 | B2 | 7/2017 | Juenger et al. | |
| 9,722,437 | B2 | 8/2017 | Kim et al. | |
| 9,726,135 | B2 * | 8/2017 | Zeiler | H02J 7/0016 |
| 9,783,203 | B2 * | 10/2017 | Koike | H02P 23/14 |
| 9,825,559 | B2 | 11/2017 | Wang et al. | |
| 9,831,689 | B2 | 11/2017 | Kang et al. | |
| 9,839,179 | B2 | 12/2017 | Stover et al. | |
| 9,864,396 | B1 * | 1/2018 | Brown | B62D 15/00 |
| 9,929,573 | B2 | 3/2018 | Gong | |
| 9,937,779 | B2 * | 4/2018 | Koike | B60K 1/04 |
| 9,949,436 | B2 * | 4/2018 | Ito | A01D 34/81 |
| 9,988,084 | B2 | 6/2018 | Lewis et al. | |
| 10,027,001 | B2 | 7/2018 | Tutzer et al. | |
| 10,038,176 | B2 * | 7/2018 | Ito | H01M 10/48 |
| 10,080,328 | B2 * | 9/2018 | Kraus | A01D 41/14 |
| D831,566 | S | 10/2018 | Nommensen et al. | |
| 10,099,714 | B2 | 10/2018 | Oswald et al. | |
| 10,104,834 | B2 * | 10/2018 | Yuki | A01D 34/78 |
| 10,130,037 | B2 | 11/2018 | Conrad et al. | |

(56) References Cited

U.S. PATENT DOCUMENTS

| | | | |
|---|---|---|---|
| 10,150,502 B2* | 12/2018 | Kallevig | B62D 11/006 |
| 10,181,590 B2 | 1/2019 | Zeiler et al. | |
| 10,181,733 B2* | 1/2019 | Jo | B60L 58/22 |
| D841,572 S | 2/2019 | Gilpatrick et al. | |
| 10,214,869 B1* | 2/2019 | Krajewski | E01H 5/09 |
| 10,230,078 B2* | 3/2019 | Kubota | H01M 50/249 |
| 10,252,665 B2 | 4/2019 | Sturmat | |
| 10,263,436 B2 | 4/2019 | Beaston et al. | |
| 10,277,041 B2 | 4/2019 | Zane et al. | |
| D853,319 S | 7/2019 | Nommensen et al. | |
| 10,386,884 B1 | 8/2019 | Brown et al. | |
| 10,421,481 B2 | 9/2019 | Wilske et al. | |
| 10,442,292 B2* | 10/2019 | Lapp | B60K 17/08 |
| 10,483,791 B2 | 11/2019 | Mergener et al. | |
| 10,485,166 B2 | 11/2019 | Wang et al. | |
| 10,499,565 B2* | 12/2019 | Ito | A01D 34/66 |
| 10,536,007 B2 | 1/2020 | Beaston et al. | |
| 10,546,073 B2 | 1/2020 | Morita et al. | |
| 10,555,076 B1 | 2/2020 | Valeri et al. | |
| 10,595,459 B2* | 3/2020 | Aposhian | A01D 34/76 |
| 10,602,659 B2* | 3/2020 | Ito | A01D 34/006 |
| 10,605,843 B2 | 3/2020 | Hamanda | |
| 10,647,207 B2 | 5/2020 | Rivas et al. | |
| 10,668,923 B2 | 6/2020 | Breuer et al. | |
| 10,687,464 B2* | 6/2020 | Zeiler | A01D 69/02 |
| 10,690,725 B2 | 6/2020 | Diamond et al. | |
| 10,710,609 B2 | 7/2020 | Saleh et al. | |
| 10,761,492 B2* | 9/2020 | Eagleton | H02P 7/298 |
| 10,789,790 B1 | 9/2020 | Vandenbussche et al. | |
| 10,813,284 B2* | 10/2020 | Shoaf | A01D 34/84 |
| 10,827,675 B2 | 11/2020 | Gresch et al. | |
| 10,836,426 B1* | 11/2020 | Busboom | B62D 11/04 |
| 10,850,622 B2* | 12/2020 | Matsuda | B60L 7/24 |
| 10,850,725 B2 | 12/2020 | Tabatowski-Bush et al. | |
| D910,546 S * | 2/2021 | Dong | D13/104 |
| D910,547 S * | 2/2021 | Dong | D13/106 |
| D910,548 S * | 2/2021 | Dong | D13/106 |
| D911,933 S * | 3/2021 | Dong | D13/104 |
| D919,671 S * | 5/2021 | Donati | D15/15 |
| D965,515 S * | 10/2022 | Seefeldt | D13/107 |
| D968,318 S * | 11/2022 | Donati | H01M 50/271 |
| | | | D13/103 |
| D978,782 S * | 2/2023 | Donati | H01M 50/207 |
| | | | D13/103 |
| D978,783 S * | 2/2023 | Holeton | D13/103 |
| 11,690,318 B2* | 7/2023 | Conrad | A01D 34/008 |
| | | | 56/10.2 A |
| 12,261,275 B2* | 3/2025 | Nedjimi | H02J 7/0045 |
| 2002/0166313 A1* | 11/2002 | Gloudemans | A01D 34/64 |
| | | | 56/14.9 |
| 2003/0029149 A1* | 2/2003 | Fillman | A01D 34/58 |
| | | | 56/10.6 |
| 2004/0130159 A1* | 7/2004 | Brandon | B60K 6/46 |
| | | | 290/40 C |
| 2004/0250643 A1 | 12/2004 | Jones | |
| 2005/0055147 A1 | 3/2005 | Hrazdera et al. | |
| 2005/0279066 A1 | 12/2005 | Osborne | |
| 2006/0010844 A1* | 1/2006 | Angott | B60L 50/61 |
| | | | 56/7 |
| 2006/0028177 A1* | 2/2006 | Ferro | B62B 1/125 |
| | | | 320/114 |
| 2006/0216580 A1 | 9/2006 | Schlosser | |
| 2006/0229770 A1 | 10/2006 | Strong | |
| 2007/0125056 A1* | 6/2007 | Edmond | A01D 34/78 |
| | | | 56/11.9 |
| 2007/0269713 A1 | 11/2007 | Hanson et al. | |
| 2007/0295545 A1 | 12/2007 | Romig et al. | |
| 2008/0136134 A1 | 6/2008 | McCoid et al. | |
| 2008/0169676 A1 | 7/2008 | Hanson et al. | |
| 2009/0250270 A1 | 10/2009 | Hauser | |
| 2009/0252994 A1* | 10/2009 | Livingston | H01M 10/625 |
| | | | 429/1 |
| 2009/0266042 A1* | 10/2009 | Mooney | B60L 50/52 |
| | | | 56/14.7 |
| 2010/0206647 A1* | 8/2010 | Ishii | B62D 9/00 |
| | | | 180/6.24 |
| 2010/0291427 A1* | 11/2010 | Zhou | H01M 10/482 |
| | | | 429/100 |
| 2011/0126502 A1 | 6/2011 | Pitman et al. | |
| 2011/0187521 A1 | 8/2011 | Beruscha et al. | |
| 2011/0259012 A1* | 10/2011 | Tada | F01N 3/055 |
| | | | 60/690 |
| 2011/0307155 A1 | 12/2011 | Simard | |
| 2012/0159916 A1* | 6/2012 | Ishii | B60L 58/40 |
| | | | 56/10.2 G |
| 2012/0164496 A1 | 6/2012 | Lachenmeier et al. | |
| 2012/0227368 A1* | 9/2012 | Koike | A01D 69/02 |
| | | | 56/10.2 A |
| 2012/0265390 A1* | 10/2012 | Hauser | A01D 34/008 |
| | | | 701/22 |
| 2013/0047565 A1* | 2/2013 | Shida | A01D 34/58 |
| | | | 56/10.2 H |
| 2013/0110351 A1* | 5/2013 | Stone | B62D 11/24 |
| | | | 701/33.1 |
| 2013/0167495 A1* | 7/2013 | Borinato | A01D 69/02 |
| | | | 56/10.2 G |
| 2013/0239533 A1* | 9/2013 | Juenger | A01D 69/02 |
| | | | 429/96 |
| 2013/0293006 A1 | 11/2013 | Kang et al. | |
| 2013/0337308 A1 | 12/2013 | Rathmacher | |
| 2014/0013722 A1* | 1/2014 | Pitcel | B60W 20/20 |
| | | | 180/65.23 |
| 2014/0173946 A1* | 6/2014 | Gerrits | E02F 9/16 |
| | | | 56/14.7 |
| 2014/0262560 A1* | 9/2014 | Dwyer | A01D 34/82 |
| | | | 56/320.1 |
| 2015/0077239 A1 | 3/2015 | Litjen | |
| 2015/0315982 A1 | 11/2015 | Koenen et al. | |
| 2015/0318521 A1* | 11/2015 | Zeiler | H01M 50/296 |
| | | | 429/96 |
| 2015/0375633 A1* | 12/2015 | Masuda | B60L 58/21 |
| | | | 320/109 |
| 2016/0114692 A1 | 4/2016 | Tripathi et al. | |
| 2016/0121744 A1* | 5/2016 | Meinl | F16J 15/027 |
| | | | 320/107 |
| 2016/0181837 A1 | 6/2016 | Shu | |
| 2016/0183451 A1* | 6/2016 | Conrad | A01D 34/66 |
| | | | 56/10.2 R |
| 2017/0072553 A1 | 3/2017 | Bakker | |
| 2017/0117726 A1* | 4/2017 | Jore | H02J 7/342 |
| 2018/0026244 A1* | 1/2018 | Ito | B60L 50/64 |
| | | | 429/96 |
| 2018/0027731 A1 | 2/2018 | Self et al. | |
| 2018/0049368 A1* | 2/2018 | Stover | A01D 34/001 |
| 2018/0084723 A1 | 3/2018 | Gresch et al. | |
| 2018/0103582 A1* | 4/2018 | Self | A01D 34/824 |
| 2018/0115169 A1 | 4/2018 | Edwards et al. | |
| 2018/0160620 A1 | 6/2018 | Wang et al. | |
| 2018/0175341 A1 | 6/2018 | Kim et al. | |
| 2018/0202407 A1 | 7/2018 | Harvey et al. | |
| 2019/0075724 A1* | 3/2019 | Becke | H02J 7/0048 |
| 2019/0103639 A1 | 4/2019 | Guglielmo et al. | |
| 2019/0160972 A1* | 5/2019 | Zeiler | H01M 10/441 |
| 2019/0176803 A1 | 6/2019 | Tabatowski-Bush et al. | |
| 2019/0230850 A1 | 8/2019 | Johnson et al. | |
| 2019/0235030 A1 | 8/2019 | Yoshida | |
| 2019/0237571 A1 | 8/2019 | Semen, Jr. et al. | |
| 2019/0263340 A1* | 8/2019 | Harvey | H02P 3/06 |
| 2019/0291779 A1* | 9/2019 | Zeiler | H01Q 1/27 |
| 2019/0322193 A1* | 10/2019 | Duan | B60L 58/20 |
| 2020/0005564 A1 | 1/2020 | Coburn et al. | |
| 2020/0052502 A1 | 2/2020 | Statman | |
| 2020/0052503 A1 | 2/2020 | Statman | |
| 2020/0127467 A1 | 4/2020 | Li | |
| 2020/0128727 A1 | 4/2020 | Jager et al. | |
| 2020/0253115 A1* | 8/2020 | Feng | A01D 34/733 |
| 2020/0315095 A1* | 10/2020 | Liu | A01D 69/02 |
| 2020/0333402 A1* | 10/2020 | Jan | H01M 50/20 |
| 2020/0344947 A1 | 11/2020 | Yan et al. | |
| 2020/0366114 A1* | 11/2020 | Eivaz | H01M 50/231 |
| 2021/0252989 A1* | 8/2021 | Price | B60L 53/31 |
| 2022/0065684 A1* | 3/2022 | Gindt | G01F 23/72 |

(56) References Cited

U.S. PATENT DOCUMENTS

| | | | |
|---|---|---|---|
| 2023/0122499 A1* | 4/2023 | Holeton | B60L 58/20 |
| | | | 320/109 |
| 2023/0241989 A1* | 8/2023 | Ando | B60L 53/16 |
| | | | 320/104 |
| 2023/0329143 A1* | 10/2023 | Siebert | B60W 50/082 |
| 2024/0097464 A1* | 3/2024 | Niwa | H01M 50/213 |
| 2024/0157847 A1* | 5/2024 | Holeton | B60L 58/13 |
| 2024/0170807 A1* | 5/2024 | Liu | H01M 50/271 |
| 2024/0180070 A1* | 6/2024 | Van Thiel | A01D 69/02 |
| 2025/0109558 A1* | 4/2025 | Rasmussen | E01H 5/061 |
| 2025/0113772 A1* | 4/2025 | Spatchek | A01D 34/73 |
| 2025/0275500 A1* | 9/2025 | Seefeldt | A01D 34/66 |

FOREIGN PATENT DOCUMENTS

| | | |
|---|---|---|
| CA | 2948203 C | 11/2015 |
| CN | 104527545 A | 4/2015 |
| CN | 104943558 A | 9/2015 |
| CN | 105905055 A | 8/2016 |
| CN | 107521363 A | 12/2017 |
| CN | 108015725 A | 5/2018 |
| CN | 108263228 A | 7/2018 |
| DE | 102006022247 A1 | 11/2007 |
| EP | 1319577 B1 | 3/2006 |
| EP | 1647175 A1 | 4/2006 |
| EP | 1674374 B1 | 6/2006 |
| EP | 1846776 B1 | 10/2007 |
| EP | 2105337 B1 | 12/2011 |
| EP | 2269437 B1 | 1/2013 |
| EP | 2385755 B1 | 3/2013 |
| EP | 2583858 B1 | 4/2013 |
| EP | 1977493 B1 | 6/2016 |
| EP | 2875712 B1 | 10/2016 |
| EP | 2990903 B1 | 7/2017 |
| EP | 2731821 B1 | 1/2018 |
| EP | 2731560 B1 | 3/2018 |
| EP | 3097758 B1 | 5/2018 |
| EP | 2315336 B1 | 1/2019 |
| EP | 2048933 B1 | 2/2019 |
| EP | 2828118 B1 | 5/2019 |
| EP | 3217780 B1 | 9/2019 |
| EP | 340647 | 4/2020 |
| FR | 2658131 A3 | 8/1991 |
| FR | 2958705 B2 | 6/2012 |
| GB | 1488915 A | 10/1977 |
| JP | 2011177106 A | 9/2011 |
| JP | 5742688 B2 | 7/2015 |
| WO | WO2011086745 A1 | 7/2011 |
| WO | WO2013104191 A1 | 7/2013 |
| WO | WO2016104187 A1 | 6/2016 |
| WO | WO2016194537 A1 | 12/2016 |
| WO | WO2017194790 A1 | 11/2017 |
| WO | WO2018031719 A1 | 2/2018 |
| WO | WO2018072384 A1 | 4/2018 |
| WO | WO2018087340 A2 | 5/2018 |
| WO | WO2018087340 A3 | 5/2018 |
| WO | WO2018087340 A4 | 5/2018 |
| WO | WO2018087340R1 A4 | 5/2018 |
| WO | WO2018101086 A1 | 6/2018 |
| WO | WO2018102338 A1 | 6/2018 |
| WO | WO2019042130 A1 | 3/2019 |
| WO | WO2019129045 A1 | 7/2019 |
| WO | WO2019236958 A1 | 12/2019 |
| WO | WO2020025024 A1 | 2/2020 |
| WO | WO2020050492 A1 | 3/2020 |
| WO | WO2020059952 A1 | 3/2020 |
| WO | WO2020077176 A1 | 4/2020 |
| WO | WO2020078038 A1 | 4/2020 |
| WO | WO2020087161 A1 | 5/2020 |
| WO | WO2020147841 A1 | 7/2020 |

OTHER PUBLICATIONS

Inventus Power, Customer Battery Pack Requirements for 03-57409-001 Ariens McFly Project, Copyright 2018, 10 Pages.
Inventus Power, Hardware and Software Interface for 03-57409-001 Ariens McFly Project, Copyright 2018, 22 Pages.
Inventus Power, Customer Bus Bar Requirements for 03-57409-301 Ariens McFly Project, Copyright 2019, 10 Pages.
International Search Report with Written Opinion for related Application No. PCT/US2020/051636 dated Oct. 2, 2021 (55 Pages).
Chinese Patent Office Action for Application No. 202080079605.8 dated Sep. 8, 2023 (15 pages including English translation).
Extended European Search Report for Application No. 20873472.3 dated Dec. 19, 2023 (9 pages).

* cited by examiner

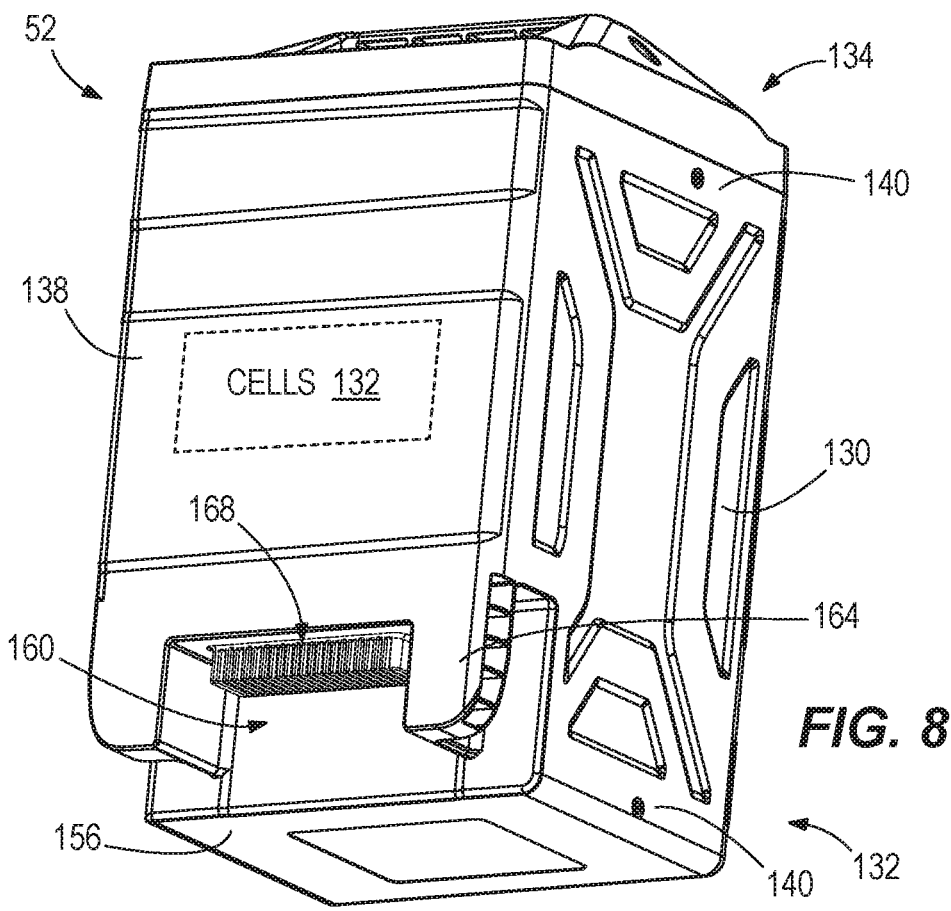
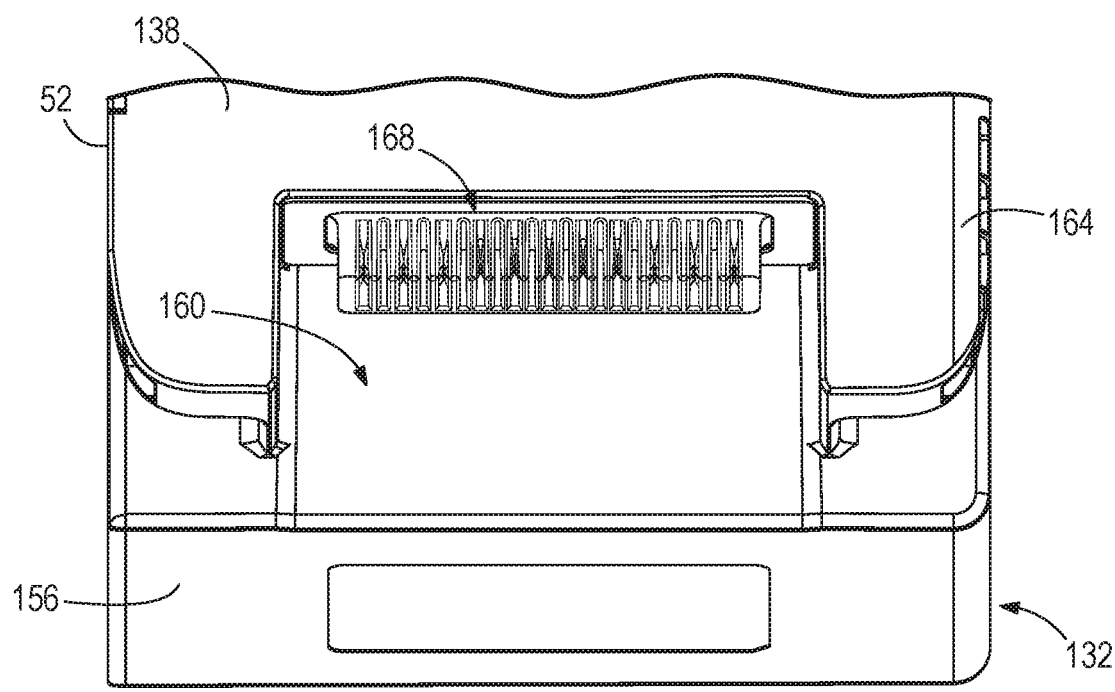
FIG. 8
FIG. 9

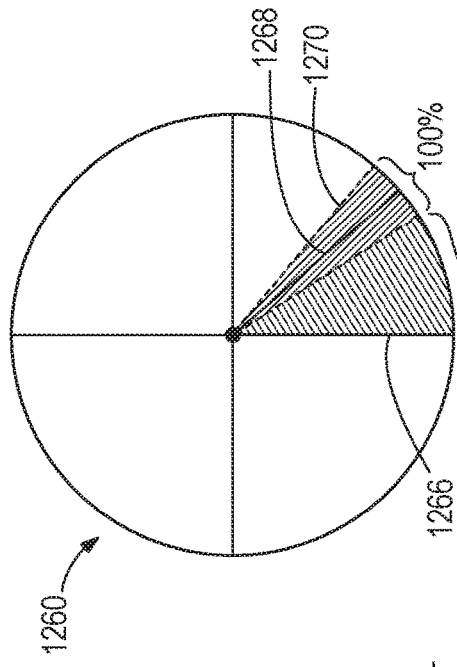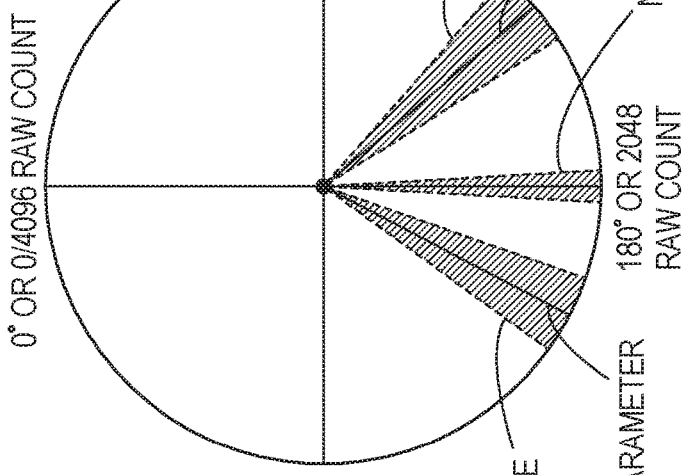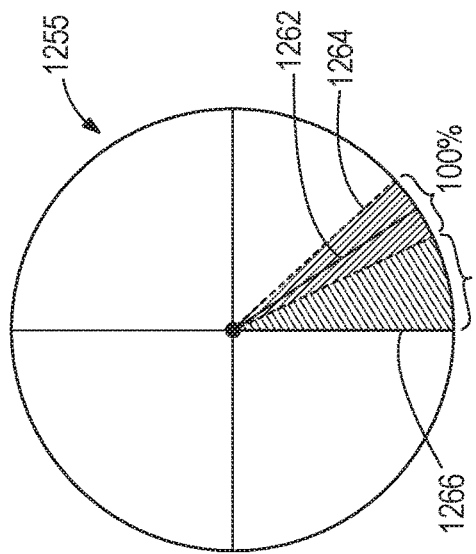
FIG. 42C
FIG. 42A
FIG. 42B

POWER SOURCE AND CONTROL SYSTEM FOR A LAWN MOWER

FIELD OF THE INVENTION

The present invention relates to a lawn mower having a power source in the form of a plurality of battery packs secured within a battery compartment of the lawn mower. The present invention also relates to control systems of the lawn mower that controls a priority charging method of the power source, a live to drive control system that alerts the user of the lawn mower that the lawn mower is in an operable state, and a variable speed control system that controls the sensitivity of maneuvering controls of the lawn mower during operation.

SUMMARY

In one aspect, the invention provides an electric lawn mower comprising a frame; a drive wheel supporting the frame above a ground surface; a drive motor mounted to the frame and driving rotation of the drive wheel to move the lawn mower over the ground surface; an operator platform supported by the frame, and operable to support the weight of a user during operation of the lawn mower; a cutting deck coupled to the frame; a deck motor mounted to the cutting deck and configured to drive rotation of a blade under the cutting deck to cut grass under the cutting deck; a battery compartment supported by the frame and defining an inner space; a battery docking station mounted to a bottom wall of the battery compartment in the inner space; and a battery pack connected to the docking station through a gravity-biased connection, the battery pack providing electrical power to at least one of the drive motor and the deck motor.

In some embodiments, the electric lawn mower further comprises a lid for the battery compartment, the lid movable between an open position to provide access to the inner space and a closed position to restrict access to the inner space. In some embodiments, the lid includes a latch configured to selectively secure the lid in the closed position, and the lid, in the closed position, engages the battery pack to provide a gravity-assisted connection force that urges the battery packs into engagement with the battery docking station. In some embodiments, the battery pack weighs less than fifty-five pounds. In some embodiments, the docking station includes an alignment structure and an electrical connector, the alignment structure aligning the battery pack with the electrical connector prior to the battery pack engaging the electrical connectors as the battery pack is connected to the docking station. In some embodiments, the electric lawn mower further comprises a vehicle control module communicating with the drive motor and the deck motor to control operation of the drive motor and deck motor in response to commands from the user. In some embodiments, the electric lawn mower further comprises a user display, wherein the battery pack communicates with the user display to provide battery-related information on the user display. In some embodiments, the battery-related information includes state of charge of the battery pack. In some embodiments, the electric lawn mower further comprises left and right maneuvering controls graspable by the user on the operator platform, the electric lawn mower is a zero turn radius lawn mower; the drive wheel comprises left and right drive wheels; and the drive motor comprises left and right drive motors independently controlled by manipulation of the respective left and right maneuvering controls for independently driving rotation of the respective left and right drive wheels at a selected speed and direction of rotation. In some embodiments, the battery docking station comprises a plurality of battery docking stations mounted to a bottom wall of the battery compartment; and the battery pack comprises a plurality of battery packs connected to the battery docking stations. In some embodiments, the electric lawn mower further comprises a charging port communicating with the plurality of battery packs and a bus bar communicating with the plurality of docking stations, the charging port, and a vehicle control module, the vehicle control module receives power from the plurality of battery packs via the docking stations and the bus bar and directs the power to the drive motors and the deck motor. In some embodiments, a weight of the plurality of battery packs provides a gravity-biased connection between each of the plurality of battery packs and the plurality of docking stations such that the plurality of battery packs are removable from engagement with the plurality of docking stations without the need for tools. In some embodiments, each of the plurality of battery packs includes a handle integrally formed with an upper portion of the battery pack to facilitate handling of the battery pack by a user. In some embodiments, each of the plurality of docking stations includes contacts; each of the plurality of battery packs includes a flat bottom, a recessed portion, and contacts in the recessed portion; and contacts of the battery packs engage the contacts of the docking stations with a majority of the weight of the battery packs being borne by the flat bottom of the battery packs engaging a bottom of the battery compartment when the battery packs are lowered onto the docking stations. In some embodiment, the electric lawn mower further comprises a lid for the battery compartment; the lid is movable between an open position to provide access to the inner space and a closed position to restrict access to the inner space, the lid includes a latch configured to selectively secure the lid in the closed position, and the lid, in the closed position, engages the battery packs to provide a gravity-assisted connection force that overcomes a frictional force between the contacts of the battery packs and the contacts of the docking stations so the battery pack is electrically connected to the docking station.

In another aspect, the invention provides a method for managing a priority of charging among a plurality of battery packs in an electric vehicle or an electric device, the method comprising determining; by an electronic controller, a state of charge for each of the plurality battery packs; comparing, by the electronic controller, the state of charge of each of the plurality of battery packs to a predetermined threshold; grouping into a first set, by the electronic controller, any of the battery packs having a state of charge above the predetermined threshold; grouping into a second set, by the electronic controller, any of the battery packs having a state of charge under the predetermined threshold; and controlling; by the electronic controller, a charging configuration including at least a first charger to charge the first set before charging the second set.

In some embodiments, the method further comprises designating; by the electronic controller, a first battery pack of the battery packs as a master battery pack, and at least one other battery pack of the battery packs as slave battery pack. In some embodiments, each of the battery packs includes an identification number and wherein the step of designating one of the battery packs as a master battery pack includes designating the battery pack having the lowest identification number as the master battery pack. In some embodiments, the method further comprises in response to replacing one of the battery packs with a new battery pack having an identification number, the new battery pack and the non-replaced battery packs together defining a new plurality of battery packs: comparing the identification numbers of the new plurality of battery packs; and designating as the master battery pack the battery pack among the new plurality of battery packs having the lowest identification number. In some embodiments, comparing the state of charge of each of the plurality of battery packs to a predetermined threshold is performed with the predetermined threshold being 70%, In some embodiments, comparing the state of charge of each of the plurality of battery packs to a predetermined threshold is performed with the predetermined threshold being in the range 75% to 90%. In some embodiments, charging the first set includes charging the first set in order of battery state of charge from highest to lowest. In some embodiments, comparing the state of charge of each of the plurality of battery packs to a predetermined threshold is performed with the predetermined threshold being in the range 80% to 85%. In some embodiments, a first battery pack of the battery packs is a master battery pack, and wherein the electric vehicle includes a first charging port and a second charging port, the master battery pack communicating with both of the first charging port and the second charging port, the method further comprising: identifying whether the first charger of the charger configuration is connected to the first charging port and whether a second charger of the charger configuration is connected to the second charging portion; and determining a priority charging method based on whether one or both of the first charger and second charger are respectively connected to the first charging port and second charging port. In some embodiments, determining a priority charging method comprises, during the charging the first set step, charging a single battery pack in the event that only the first charger is connected to the first charging port and charging a plurality of battery packs in parallel in the event that both the first charger is connected to the first charging port and the second charger is connected to the second charging port. In some embodiments, the method further comprises grouping into a third set any of the battery packs having a state of charge under a low threshold and charging the battery packs in the third set concurrently. In some embodiments, the low threshold is 15%. In some embodiments, the method further comprises ordering the battery packs in the second set according to state of charge; wherein charging the second set comprises: charging the lowest state of charge battery in the second set; and once the state of charge of the lowest state of charge battery pack in the second set is equal to the state of charge of the second lowest state of charge battery pack in the second set, concurrently charging the lowest state of charge battery pack and the second lowest state of charge battery pack in the second set. In some embodiments, the electronic controller is at least one selected from the group consisting of a battery controller positioned within a master battery pack of the battery packs and a control of a vehicle control module positioned on the electric vehicle. In some embodiments, the electric vehicle is an electric lawn mower, the method further comprising: after charging the plurality of battery packs, discharging current from the plurality of battery packs to drive: a drive motor that drives rotation of a drive wheel to move the electric lawn mower over a ground surface, and a deck motor mounted to a cutting deck of the electric lawn mower that drives rotation of a blade under the cutting deck to cut grass under the cutting deck.

In another aspect, the invention provides a system for managing a priority of battery charging for an electric vehicle or an electric device, the system comprising: a frame; a battery compartment supported by the frame and defining an inner space; a plurality of battery docking stations in the inner space of the battery compartment; a plurality of battery packs, each battery pack of the plurality of battery packs connected to a respective docking station of the plurality of docking stations; and a charger configuration including at least a first charger and having a power input connector and a power output connector; the power input connector configured to receive power from an external source, the power output connector configured to provide charging current to the battery pack and an electronic controller coupled to the charging configuration and configured to: determine a state of charge for each of the plurality battery packs; compare the state of charge of each of the plurality of battery packs to a predetermined threshold; group into a first set any of the battery packs having a state of charge above the predetermined threshold; group into a second set any of the battery packs having a state of charge under the predetermined threshold; and control the charging configuration to charge the first set before charging the second set.

In some embodiments, each of the battery packs includes an identification number, the electronic controller is further configured to designate a first battery pack of the battery packs as a master battery pack in response to the first battery pack having the lowest identification number of the battery packs, and the electronic controller is further configured to designate at least one other battery pack of the battery packs as slave battery pack. In some embodiments, a first battery pack of the battery packs is a master battery pack, and wherein the electric vehicle includes a first charging port and a second charging port, the master battery pack communicating with both of the first charging port and the second charging port, the electronic controller is further configured to: identify whether the first charger of the charger configuration is connected to the first charging port and whether a second charger of the charger configuration is connected to the second charging portion; and determine a priority charging method based on whether one or both of the first charger and second charger are respectively connected to the first charging port and second charging port. In some embodiments, the electronic controller is further configured to order the battery packs in the second set according to state of charge, and to control the charging configuration to charge the second set, the electronic controller is further configured to: charge the lowest state of charge battery in the second set; and once the state of charge of the lowest state of charge battery pack in the second set is equal to the state of charge of the second lowest state of charge battery pack in the second set, concurrently charge the lowest state of charge battery pack and the second lowest state of charge battery pack in the second set. In some embodiment, the electronic controller is at least one selected from the group consisting of a battery controller positioned within a master battery pack of the battery packs and a control of a vehicle control module positioned on the electric vehicle.

In another aspect, the invention provides a method for alerting a user of an electric vehicle that the vehicle is in a live to drive state, the electric vehicle including at least one maneuvering control, the method comprising: determining with a vehicle control module that a set of predetermined conditions of the live to drive state are satisfied; generating an audible alert with an audible element in response to identifying that the set of predetermined conditions of the live to drive state are satisfied; generating a visual alert at a user display on the vehicle in response to identifying that the set of predetermined conditions of the live to drive state are satisfied, and identifying that the electric vehicle is in the live to drive state based on determining that the set of predetermined conditions of the live to drive state are satisfied, wherein, in the live to drive state, the vehicle can be moved by operation of the maneuvering control.

In some embodiments, the audible element includes at least one from the group of: a speaker supported by the lawn mower and a headset used by the user. In some embodiments, the audible element includes a headset; and generating an audible alert includes transmitting the audible alert via a short-range wireless communication protocol or a wired connection between the headset and the vehicle control module. In some embodiments, generating a visual alert includes at least one from the group of: illuminating an LED, flashing an LED, and displaying a message on a screen visible to the user. In some embodiments, the method further comprises determining operational states of the vehicle with a plurality of sensors monitoring a system interface, the maneuvering control, an operator platform supporting the user, and the power source providing motive power for the vehicle; and wherein identifying that the predetermined conditions of the live to drive state satisfied includes interpreting whether the operational states of the vehicle meets the set of predetermined conditions. In some embodiments, the predetermined conditions includes at least one from the group of: a battery charger is disconnected from the power source, a pre-charge of the power source is complete, the user is seated in a seat on the operator platform, a parking brake is applied, the maneuvering controls are in a neutral position, there are no system faults, and an ignition is in an on position. In some embodiments, the method further comprises generating an error alert and not permitting the vehicle to operate when the set of predetermined conditions indicative of the live to drive state are not met by the operational states. In some embodiments, generating an audible alert comprises generating a first audible alert, the method further comprising generating a second audible alert one second following the first audible alert. In some embodiments, a parking brake is disabled following the second audible alert so the vehicle can be moved by operation of the at least one maneuvering control.

In another aspect, the invention provides an electric vehicle including a system for alerting a user of the electric vehicle that the vehicle is in a live to drive state, the electric vehicle comprising: frame; a drive wheel supporting the frame above a ground surface; a drive motor mounted to the frame and driving rotation of the drive wheel to move the electric vehicle over the ground surface; an audible element configured to generate sound; a user display; at least one maneuvering control configured to: indicate a drive command for the drive motor; an electronic controller coupled to the at least one maneuvering control and the drive motor, the electronic controller configured to determine that a set of predetermined conditions of the live to drive state are satisfied; generate an audible alert with the audible element in response to determining that the set of predetermined conditions of the live to drive state are satisfied; generate a visual alert at the user display on the vehicle in response to determining that the set of predetermined conditions of the live to drive state are satisfied, and identify the vehicle is in the live to drive state based on determining that the set of predetermined conditions of the live to drive state are satisfied, wherein, in the live to drive state, the vehicle can be moved by operation of the at least one maneuvering control.

In some embodiments, the audible element includes at least one from the group of: a speaker supported by the electric vehicle and a headset used by the user. In some embodiments, the audible element includes a headset; and to generate the audible alert, the electronic controller is configured to transmit the audible alert via a short-range wireless communication protocol or a wired connection to the headset. In some embodiments, to generate a visual alert, the electronic controller is configured to at least one from the group of: illuminate an LED, flash an LED, and display a message on a screen visible to the user. In some embodiments, the electronic controller is further configured to determine operational states of the vehicle with a plurality of sensors monitoring a system interface; the at least one maneuvering control, an operator platform supporting the user, and a power source providing motive power for the vehicle; and wherein, to identify that the vehicle is in the set of preconditions of the live to drive state are satisfied, the electronic controller is further configured to interpret whether the operational states of the vehicle meets the set of predetermined conditions. In some embodiments, the predetermined conditions includes at least one from the group of: a battery charger is disconnected from the power source, a pre-charge of the power source is complete, the user is seated in a seat on the operator platform, a parking brake is applied, the at least one maneuvering control is in a neutral position, there are no system faults, and an ignition is in an on position. In some embodiments, the electronic controller is further configured to generate an error alert and not permit the vehicle to operate when the set of predetermined conditions indicative of the live to drive state is not met by the operational states. In some embodiments, the audible alert is a first audible alert, and the electronic controller is further configured to generate a second audible alert one second following the first audible alert. In some embodiments, the electric vehicle further comprises a parking brake configured to restrict movement of the electric vehicle, wherein the parking brake is configured to be disabled following the second audible alert so the vehicle can be moved by operation of the at least one maneuvering control.

In another aspect, the invention provides a variable speed control system for a lawn mower, the lawn mower including an operator zone comprising an area accessible by a user of the lawn mower during operation of the lawn mower, the system comprising: a maneuvering control in the operator zone and movable by the user through a full range of motion including a maximum speed end at which the lawn mower moves at a maximum speed; and an adjustment mechanism in the operator zone and manually adjustable by the user, the adjustment mechanism adjusting the maximum speed.

In some embodiments the adjustment mechanism comprises an analog mechanism. In some embodiments, the adjustment mechanism is movable between a plurality of positions to allow the maximum speed to be variably adjusted. In some embodiments, the adjustment mechanism is movable between three positions corresponding to three different speed modes corresponding to a low maximum speed, a standard maximum speed, and a high maximum speed. In some embodiments, the adjustment mechanism is movable between discrete positions, the system further comprising a detent mechanism for holding the adjustment mechanism in at least one of the discrete positions. In some embodiments, the adjustment mechanism is integrated within the maneuvering control such that the adjustment mechanism can be manipulated by the user without removing the user's hands from the maneuvering control. In some embodiments, the maximum speed varies as a linear function of the position of the adjustment mechanism. In some embodiments, the system further comprises a vehicle control module communicating with the maneuvering control to adjust a sensitivity of the maneuvering control in response to a position of the adjustment mechanism. In some embodiments, the vehicle control module communicates with a user display in the operator zone to provide a visual alert to the user relating to the adjusted maximum speed. In some embodiments, the visual alert is a bar or dial corresponding to a position of the adjustment mechanism. In some embodiments, the maneuvering control comprises left and right control arms operably coupled to left and right drive wheels of the lawn mower to enable the user to independently control the speed and direction of the left and right drive wheels by moving the left and right control arms through the range of motion.

In another aspect, the invention provides an electric lawn mower, the electric lawn mower comprising a frame; a drive wheel supporting the frame above a ground surface; a cutting deck coupled to the frame; a drive motor mounted to the frame and driving rotation of the drive wheel to move the electric lawn mower over the ground surface, and a deck motor mounted to the cutting deck and configured to drive rotation of a blade under the cutting deck to cut grass under the cutting deck; a plurality of battery packs supported by the frame and configured to provide electrical power to the drive motor and to the deck motor; an electronic controller coupled to the drive motor and to the deck motor; the electronic controller configured to: determine a maximum steady state current value for the plurality of battery packs; determine a maximum drive current value for the drive motor and a maximum deck current value for the deck motor based on the maximum steady state current value, a duty cycle of the drive motor, and a duty cycle of the deck motor; control the drive motor to maintain a motor current of the drive motor below the maximum drive current value; and control the deck motor to maintain a motor current of the deck motor below the maximum deck current value.

In some embodiment, the drive motor is a first drive motor of a plurality of drive motors mounted to the frame and the drive wheel is a first drive wheel of a plurality of drive wheels supporting the frame above a ground surface, each drive motor of the plurality of drive motors is associated with a respective drive wheel of the plurality of drive wheels to move the electric lawn mower over the ground surface, the deck motor is a first deck motor of a plurality of deck motors, and the blade is a first blade of a plurality of blades under the cutting deck, and each deck motor of the plurality of deck motors is configured to drive rotation of a respective blade of the plurality of blades to cut grass under the cutting deck. In some embodiments, to determine a maximum drive current value for the drive motor and a maximum deck current value for the deck motor based on the maximum steady state current value, a duty cycle of the drive motor, and a duty cycle of the deck motor, the motor is further configured to: calculate a maximum aggregate drive motor current for the plurality of drive motors and a maximum aggregate deck motor current for the plurality of deck motors based on the maximum steady state current value, a duty cycle of the drive motor, and a duty cycle of the deck motor, divide the maximum aggregate drive motor current by a total number of the plurality of drive motors to determine the maximum drive current value, and divide the maximum aggregate deck motor current by a total number of the plurality of deck motors to determine the maximum deck current value. In some embodiments, the electronic controller includes a vehicle control module including a processor and memory, a drive controller for each of the plurality of drive motors, and a deck controller for each of the plurality of deck controllers, the vehicle control module is configured to determine and provide the maximum drive current value to each of the plurality of drive controllers and is configured to determine and provide the maximum deck current value to each of the plurality of deck controllers. In some embodiment, each of the plurality of drive controllers is configured to control an associated drive motor to maintain motor current of the associated drive motor below the maximum drive current value, and each of the plurality of deck controllers is configured to control an associated deck motor to maintain motor current of the associated deck motor below the maximum drive current value. In some embodiments, the plurality of battery packs include a master battery pack and a plurality of slave battery packs, and the master battery pack is configured to: determine a steady state current value for each of the plurality of battery packs, sum the steady state current values for each of the plurality of battery packs, and provide, to the electronic controller, the sum of the steady state current values as the maximum steady state current value. In some embodiments, each battery pack of the plurality of battery packs includes a plurality of battery cells, a temperature sensor, cell group voltage sensors, a pack voltage sensor, and a battery controller coupled to the temperature sensor and the voltage sensors, and wherein the battery controller of each of the plurality of battery packs is configured to calculate the steady state current value of the respective battery pack of which the battery controller is a part based on: a minimum cell voltage measured by the cell group voltage sensors of the respective battery pack, a pack state of charge determined from the pack voltage sensor of the respective battery pack, and an internal pack temperature from the temperature sensor of the respective battery pack. In some embodiments, the battery controller of each of the plurality of battery packs is further configured to reduce the steady state current value of the respective battery pack of which the battery controller is a part based on one or more of the following: the minimum cell voltage of the respective battery pack being below a voltage threshold, the pack state of charge of the respective battery pack being below a charge threshold, and the internal pack temperature of the respective battery pack being above a temperature threshold. In some embodiments, the battery controller of each of the plurality of battery packs is further configured to increase the steady state current value of the respective battery pack of which the battery controller is a part based on one or more of the following: the minimum cell voltage of the respective battery pack being above a voltage threshold, the pack state of charge of the respective battery pack being above a charge threshold, and the internal pack temperature of the respective battery pack being below a temperature threshold. In some embodiments, the electronic controller is further configured to: control the drive motor to maintain a regenerative current from the drive motor below a maximum drive charge current value; and control the deck motor to maintain a regenerative current from the deck motor below a maximum deck charge current value.

In another aspect, the invention provides a method of controlling power distribution in an electric lawn mower, the method comprising: determining, by an electronic controller, a maximum steady state current value for a plurality of battery packs supported by a frame of the electric lawn mower and configured to provide electrical power to a drive motor and to a deck motor, where the drive motor is mounted to the frame and configured to drive rotation of a drive wheel to move the electric lawn mower over a ground surface and where the deck motor is configured to drive rotation of a blade to cut grass under a cutting deck; determining, by the electronic controller, a maximum drive current value for the drive motor and a maximum deck current value for the deck motor based on the maximum steady state current value, a duty cycle of the drive motor, and a duty cycle of the deck motor; controlling, by the electronic controller, the drive motor to maintain a motor current of the drive motor below the maximum drive current value; and controlling, by the electronic controller, the deck motor to maintain a motor current of the deck motor below the maximum deck current value.

In some embodiments, the drive motor is a first drive motor of a plurality of drive motors mounted to the frame and the drive wheel is a first drive wheel of a plurality of drive wheels supporting the frame above a ground surface, and wherein the deck motor is a first deck motor of a plurality of deck motors, and the blade is a first blade of a plurality of blades under the cutting deck, the method further comprising driving, by each drive motor of the plurality of drive motors, a respective drive wheel of the plurality of drive wheels to move the electric lawn mower over the ground surface, and driving, by each deck motor of the plurality of deck motors, a respective blade of the plurality of blades to cut grass under the cutting deck. In some embodiments, determining a maximum drive current value for the drive motor and a maximum deck current value for the deck motor based on the maximum steady state current value, the duty cycle of the drive motor, and the duty cycle of the deck motor includes: calculating a maximum aggregate drive motor current for the plurality of drive motors and a maximum aggregate deck motor current for the plurality of deck motors based on the maximum steady state current value, a duty cycle of the drive motor, and a duty cycle of the deck motor, dividing the maximum aggregate drive motor current by a total number of the plurality of drive motors to determine the maximum drive current value, and dividing the maximum aggregate deck motor current by a total number of the plurality of deck motors to determine the maximum deck current value. In some embodiments, the electronic controller includes a vehicle control module including a processor and memory, a drive controller for each of the plurality of drive motors, and a deck controller for each of the plurality of deck controllers, the method further comprising:

providing, by the vehicle control module, the maximum drive current value to each of the plurality of drive controllers; and providing, by the vehicle control module, the maximum deck current value to each of the plurality of deck controllers. In some embodiments, controlling, by each of the plurality of drive controllers, an associated drive motor to maintain motor current of the associated drive motor below the maximum drive current value, and controlling, by each of the plurality of deck controllers, an associated deck motor to maintain motor current of the associated deck motor below the maximum drive current value. In some embodiments, the plurality of battery packs include a master battery pack and a plurality of slave battery packs, the method further comprising: determining, by the master battery pack, a steady state current value for each of the plurality of battery packs, summing, by the master battery pack, the steady state current values for each of the plurality of battery packs, and providing, by the master battery pack, the sum of the steady state current values as the maximum steady state current value to the electronic controller. In some embodiments, each battery pack of the plurality of battery packs includes a plurality of battery cells, a temperature sensor, cell group voltage sensors, a pack voltage sensor, and a battery controller coupled to the temperature sensor and the voltage sensors, the method further comprising: calculating, by the battery controller of each of the plurality of battery packs, the steady state current value of the respective battery pack of which the battery controller is a part based on: a minimum cell voltage measured by the cell group voltage sensors of the respective battery pack, a pack state of charge determined from the pack voltage sensor of the respective battery pack, and an internal pack temperature from the temperature sensor of the respective battery pack. In some embodiments, the method further comprises reducing, by the battery controller of each of the plurality of battery packs, the steady state current value of the respective battery pack of which the battery controller is a part based on one or more of the following: the minimum cell voltage of the respective battery pack being below a voltage threshold, the pack state of charge of the respective battery pack being below a charge threshold, and the internal pack temperature of the respective battery pack being above a temperature threshold. In some embodiments, the methods further comprises increasing, by the battery controller of each of the plurality of battery packs, the steady state current value of the respective battery pack of which the battery controller is a part based on one or more of the following: the minimum cell voltage of the respective battery pack being above a voltage threshold, the pack state of charge of the respective battery pack being above a charge threshold, and the internal pack temperature of the respective battery pack being below a temperature threshold. In some embodiments, the method further comprises controlling, by the electronic controller, the drive motor to maintain a regenerative current from the drive motor below a maximum drive charge current value; and controlling, by the electronic controller, the deck motor to maintain a regenerative current from the deck motor below a maximum deck charge current value.

In another aspect, the invention provides an electric lawn mower, the electric lawn mower comprising: a frame; a drive wheel supporting the frame above a ground surface; a drive motor mounted to the frame and driving rotation of the drive wheel to move the electric lawn mower over the ground surface; a maneuvering control configured to indicate a desired motor control for the drive motor; a motor speed sensor configured to sense a rotational speed of the drive motor; and an electronic controller coupled to the drive motor, the electronic controller configured to: determine a desired motor speed based on an output from the maneuvering control; determine a sensed motor speed based on an output of the motor speed sensor; determine a proportional term adjustment factor based on the sensed motor speed; and control the drive motor according to a proportional integral drive control loop having a proportional term and an integral term, wherein the proportional term is determined based on a difference between the desired motor speed and the sensed motor speed and based on the proportional term adjustment factor.

In some embodiments, the electric lawn mower further comprises a second drive wheel supporting the frame above the ground surface; a second drive motor mounted to the frame and driving rotation of the second drive wheel to move the electric lawn mower over the ground surface; a second maneuvering control configured to indicate a desired motor control for the second drive motor; and a second motor speed sensor configured to sense a rotational speed of the second drive motor; wherein the electronic controller is further coupled to the second drive motor and configured to: determine a desired motor speed for the second drive motor based on an output from the second maneuvering control; determine a sensed motor speed of the second drive motor based on an output of the motor speed sensor; determine a second proportional term adjustment factor based on the sensed motor speed of the second drive motor; and control the second drive motor according to a second proportional integral drive control loop having a second proportional term and a second integral term, wherein the second proportional term is determined based on a difference between the desired motor speed for the second drive motor and the sensed motor speed of the second drive motor and based on the second proportional term adjustment factor. In some embodiments, the electric lawn mower further comprises an operator platform supported by the frame, and operable to support the weight of a user during operation of the lawn mower; a cutting deck coupled to the frame; a deck motor mounted to the cutting deck and configured to drive rotation of a blade under the cutting deck to cut grass under the cutting deck; a battery compartment supported by the frame and defining an inner space; a battery docking station mounted to a bottom wall of the battery compartment in the inner space; and a battery pack connected to the docking station, the battery providing electrical power to at least one of the drive motor and the deck motor. In some embodiments, to control the drive motor according to the proportional integral drive control loop, the electronic controller is further configured to: determine an integral term based on differences between desired motor speeds and sensed motor speeds over time; sum the integral term and the proportional term to generate a motor control signal for the drive motor; and control the drive motor based on the motor control signal. In some embodiments, the drive motor is a brushless motor and the motor control signal is a pulse width modulated (PMW) signal. In some embodiments, to determine the proportional term, the electronic controller is further configured to multiply the difference between the desired motor speed and the sensed motor speed by the proportional term adjustment factor. In some embodiments, the proportional term adjustment factor increases as the sensed motor speed of the drive motor decreases and decreases as the sensed motor speed of the drive motor increases. In some embodiment, to determine the proportional term adjustment factor, the electronic controller maps the sensed motor speed to the proportional term adjustment factor values using a map, the map including at least maximum adjustment factor region, a linear adjustment factor region, and a minimum adjustment factor region, the maximum adjustment factor region associates sensed motor speeds below a minimum speed threshold to a maximum proportional term adjustment factor value, the minimum adjustment factor region associates sensed motor speeds above a maximum speed threshold to a minimum proportional term adjustment factor value, and the linear adjustment factor region associates sensed motor speed between the minimum speed threshold and the maximum speed threshold to a value between the maximum and minimum proportional term adjustment factor values. In some embodiments, the linear adjustment factor region includes at least a first linear mapping sub-region and a second linear mapping sub-region, the first linear mapping sub-region mapping sensed motor speeds in a first range to linear adjustment factor values according tO a linear function having a first slope, and the second linear mapping sub-region mapping sensed motor speeds in a second range to linear adjustment factor values according to a linear function having a second slope.

In another aspect, the invention provides a method of controlling an electric lawn mower, the method comprising: determining, by an electronic controller, a desired motor speed based on an output from a maneuvering control, the maneuvering control configured to indicate a desired motor control for a drive motor mounted to a frame of the electric lawn mower and driving rotation of a drive wheel supporting the frame to move the electric lawn mower over a ground surface; determining, by the electronic controller, a sensed motor speed based on an output of a motor speed sensor configured to sense a rotational speed of the drive motor; determining; by the electronic controller, a proportional term adjustment factor based on the sensed motor speed; and controlling, by the electronic controller, the drive motor according to a proportional integral drive control loop having a proportional term and an integral term, wherein the proportional term is determined based on a difference between the desired motor speed and the sensed motor speed and based on the proportional term adjustment factor.

In some embodiments, the method further comprises determining, by the electronic controller, a desired motor speed for a second drive motor based on an output from a second maneuvering control, the second maneuvering control configured to indicate a desired motor control for the second drive motor mounted to the frame of the electric lawn mower and driving rotation of a second drive wheel supporting the frame to move the electric lawn mower over the ground surface; determining, by the electronic controller, a sensed motor speed of the second drive motor based on an output of a second motor speed sensor configured to sense a rotational speed of the second drive motor; determining, by the electronic controller, a second proportional term adjustment factor based on the sensed motor speed of the second drive motor; and controlling, by the electronic controller, the second drive motor according to a second proportional integral drive control loop having a second proportional term and a second integral term, wherein the second proportional term is determined based on a difference between the desired motor speed for the second drive motor and the sensed motor speed of the second rive motor and based on the second proportional term adjustment factor. In some embodiments, the method further comprises providing electrical power, by a battery pack connected to a battery docking station of the lawn mower, to the drive motor and to a deck motor mounted to a cutting deck of the lawn mower; and controlling; by the electronic controller, the deck motor to drive rotation of a blade under the cutting deck to cut grass under the cutting deck. In some embodiments, controlling the drive motor according to the proportional integral drive control loop further includes: determining an integral term based on differences between desired motor speeds and sensed motor speeds over time; summing the integral term and the proportional term to generate a motor control signal for the drive motor; and controlling the drive motor based on the motor control signal. In some embodiments, the drive motor is a brushless motor and controlling the drive motor based on the motor control signal includes providing a pulse width modulated (PMW) signal as the motor control signal. In some embodiments, determining the proportional term includes multiplying the difference between the desired motor speed and the sensed motor speed by the proportional term adjustment factor. In some embodiments, the proportional term adjustment factor increases as the sensed motor speed of the drive motor decreases and decreases as the sensed motor speed of the drive motor increases. In some embodiments, determining the proportional term adjustment factor includes: mapping, by the electronic controller, the sensed motor speed to the proportional term adjustment factor values using a map, the map including at least maximum adjustment factor region, a linear adjustment factor region, and a minimum adjustment factor region, the maximum adjustment factor region associates sensed motor speeds below a minimum speed threshold to a maximum proportional term adjustment factor value, the minimum adjustment factor region associates sensed motor speeds above a maximum speed threshold to a minimum proportional term adjustment factor value, and the linear adjustment factor region associates sensed motor speed between the minimum speed threshold and the maximum speed threshold to a value between the maximum and minimum proportional term adjustment factor values. In some embodiments, the linear adjustment factor region includes at least a first linear mapping sub-region and a second linear mapping sub-region, the first linear mapping sub-region mapping sensed motor speeds in a first range to linear adjustment factor values according to a linear function having a first slope, and the second linear mapping sub-region mapping sensed motor speeds in a second range to linear adjustment factor values according to a linear function having a second slope.

In another aspect, the invention provides an off-board charger for charging a battery of an electric vehicle removed from the electric vehicle, the off-board charger comprising a frame; a resting support supporting the frame above a ground surface when the off-board charger is in a resting position; a pair of wheels position at a first end of the frame, the frame configured to pivot about an axis of the pair of wheels to lift the resting support off of the ground surface to enable wheeled transport of the off-board charger; a battery compartment supported by the frame and defining an inner space; a battery docking station mounted to a bottom wall of the battery compartment in the inner space; a battery pack connected to the docking station through a gravity-biased connection; and a charging circuit supported by the frame and having a power input connector and a power output connector, the power input connector configured to receive power from an external source, the power output connector configured to provide charging current to the battery pack.

In some embodiments, the off-board charger further comprises a lid for the battery compartment, the lid movable between an open position to provide access to the inner space and a closed position to restrict access to the inner space. In some embodiments, the off-board charger further comprises a lid sensor configured to provide a signal to the battery pack indicative of whether the lid is closed. In some embodiments, charging of the battery pack is disabled when the lid sensor indicates that the lid is open. In some embodiments, the battery pack weighs less than fifty pounds. In some embodiments, the docking station includes an alignment structure and an electrical connector, the alignment structure aligning the battery pack with the electrical connector prior to the battery pack engaging the electrical connectors as the battery pack is connected to the docking station. In some embodiments, the off-board charger further comprises a second charging circuit supported by the frame and having a second power input connector and a second power output connector, the second power input connector configured to receive power from the external source, the second power output connector configured to provide charging current to the battery pack. In some embodiments, the power input connector and the second power input connector are configured to be independently coupled to the external source via a first power cable coupled to the power input connector and extending away from the off-board charger and a second power cable coupled to the second power input connector and extending away from the off-board charger. In some embodiments, the battery docking station comprises a plurality of battery docking stations mounted to a bottom wall of the battery compartment; and the battery pack comprises a plurality of battery packs connected to the battery docking stations. In some embodiments, a bus bar connecting the plurality of docking stations to the charger, where the bus bar includes a printed circuit board with signal traces for communications and conductive plates for transmitting charging current, the conductive plates mounted on the printed circuit board. In some embodiments, the bus bar connecting the plurality of docking stations to a second charger. In some embodiments, a weight of the plurality of battery packs provides a gravity-biased connection between each of the plurality of battery packs and the plurality of docking stations such that the plurality of battery packs are removable from engagement with the plurality of docking stations without the need for tools. In some embodiments, each of the plurality of battery packs includes a handle integrally formed with an upper portion of the battery pack to facilitate handling of the battery pack by a user. In some embodiments, each of the plurality of docking stations includes contacts; each of the plurality of battery packs includes a flat bottom, a recessed portion, and contacts in the recessed portion; and contacts of the battery packs engage the contacts of the docking stations with a majority of the weight of the battery packs being borne by the flat bottom of the battery packs engaging a bottom of the battery compartment when the battery packs are lowered onto the docking stations. In some embodiments, the off-board charger further comprises a handle coupled to the first end of the frame, the handle configured to receive a force transverse to the handle to thereby pivot the frame about the axis of the pair of wheels to lift the resting support off of the ground surface to enable wheeled transport of the off-board charger. In some embodiments, the handle pivotably supported by the frame and has a storage position and a transport position, wherein, in the storage position, the handle is at a first pivot angle relative to the frame and, in the transport position, the handle is at a second pivot angle relative to the frame. In some embodiments, the off-board charger further comprises a handle support structure coupled to the battery compartment, and an adjustment mechanism coupled to the handle support structure, wherein the adjustment mechanism is configured to selectively engage with the handle to restrict pivotably movement of the handle between the storage position and the transport position.

In another aspect, the invention provides an electronic device for charging an electric vehicle battery, the electronic device comprises: a frame; a battery compartment supported by the frame and defining an inner space; a lid for the battery compartment, the lid movable between an open position to provide access to the inner space and a closed position to restrict access to the inner space; a battery docking station in the inner space of the battery compartment; a battery pack connected to the docking station, the battery pack having an electronic controller, a pack out terminal configured to provide an output signal, a wake terminal configured to receive a wake signal, and a safety terminal configured to receive a safety signal, the battery pack configured to power a motor of an electric vehicle; and a safety circuit having a connector that connects the pack out terminal to the wake terminal to provide the output signal to the battery pack as the wake signal, and a lid sensor configured to provide a safety signal to the battery pack indicative of whether the lid is closed; and a charging circuit having a power input connector and a power output connector, the power input connector configured to receive power from an external source, the power output connector configured to provide charging current to the battery pack, the electronic controller of the battery pack is configured to enable charging of the battery pack in response to receipt of the wake signal and the safety signal indicating that the lid is closed.

In some embodiments, the lid sensor includes a lid switch having an input terminal and an output terminal, the lid switch configured to close when the lid is in the closed position to make a connection between the input terminal and the output terminal, and open when the lid is in the open position to interrupt the connection between the input terminal and the output terminal. In some embodiments, the lid switch is a magnetically actuatable switch that is actuated to close when a magnet positioned on the lid is positioned within a range of the lid switch when the lid is closed, and that is actuated to open when a magnet positioned on the lid is positioned outside of the range of the lid switch when the lid is open. In some embodiments, the lid switch is a mechanically actuatable switch that is mechanically actuated to close when the lid is closed, and that is mechanically actuated to open when the lid is open. In some embodiments, the safety circuit provides a connection between the pack out terminal and the input terminal of the lid switch. In some embodiments, the connector that connects the pack out terminal to the wake terminal is a jumper in a charger plug that connects a charger circuit to the off-board charger. In some embodiments, the electronic controller is coupled to the pack out terminal, the wake terminal, and the lid terminal, and wherein the electronic controller is configured to: generate the output signal provided at the pack out terminal; and wake the battery pack in response to receipt of the wake signal. In some embodiments, the electronic device is an off-board charger separate from the electric vehicle. In some embodiments, the electronic device is a mower having the motor, and the electronic controller is further configured to: enable discharging of the battery pack in response to receipt of the wake signal and the safety signal; and provide current from cell so the battery pack to the motor after the enabling of discharging.

In another aspect, the invention provides a method for charging or discharging a battery of an electric vehicle, the method comprises receiving, at a docking station of the electric vehicle or an off-board charger, a battery pack, the docking station positioned in an inner space of a battery compartment of an electronic device, and the battery pack having an electronic controller, a pack out terminal, a wake terminal, and a safety terminal; providing, by the electronic controller, an output signal via the pack out terminal to a safety circuit of the electronic device; receiving, by the electronic controller, the output signal from the safety circuit as a wake signal via the wake terminal; receiving, by the electronic controller, a safety signal from a lid sensor via the safety terminal, the safety signal indicative of whether a lid for the battery compartment is closed; enabling charging of the battery pack, by the electronic controller, in response to receipt of the wake signal and the safety signal; and receiving, by the battery pack, charge current from a charging circuit after the enabling of charging.

In some embodiments, the docking station is of the electric vehicle, the method further comprises enabling discharging of the battery pack, by the electronic controller, in response to receipt of the wake signal and the safety signal; and providing, by the battery pack, current to a motor of the electric vehicle after the enabling of discharging. In some embodiments, the lid sensor includes a lid switch having an input terminal and an output terminal, the method further comprises closing, by the lid switch, when the lid is in a closed position to make a connection between the input terminal and the output terminal, and opening, by the lid switch, when the lid is in an open position to interrupt the connection between the input terminal and the output terminal. In some embodiments, the lid switch is a magnetically actuatable switch that is actuated to close when a magnet positioned on the lid is positioned within a range of the lid switch when the lid is closed, and that is actuated to open when a magnet positioned on the lid is positioned outside of the range of the lid switch when the lid is open. In some embodiments, the lid switch is a mechanically actuatable switch that is mechanically actuated to close when the lid is closed, and that is mechanically actuated to open when the lid is open. In some embodiments, the safety circuit provides a connection between the pack out terminal and the input terminal of the lid switch. In some embodiments, receiving, by the electronic controller, the output signal from the safety circuit as the wake signal via the wake terminal includes: providing, by a connector of the safety circuit, the output signal as the wake signal to the wake terminal, wherein the connector is a jumper in a charger plug that connects a charger circuit to the off-board charger. In some embodiments, the method further comprises waking, by the electronic controller, the battery pack in response to receipt of the wake signal and the safety signal.

In another aspect, the invention provides an electric vehicle comprises a frame; a drive wheel supporting the frame above a ground surface; a drive motor mounted to the frame and driving rotation of the drive wheel to move the electric vehicle over the ground surface; a control arm coupled to the frame at a pivot joint enabling the control arm to pivot about the pivot joint through a range of motion that includes a forward range of positions, a neutral position, and a reverse range of positions; a position sensor configured to indicate an angular position of the control arm in the range of motion; an electronic controller in communication with the position sensor and configured to: operate in a calibration mode, in response to a request received via a user interface, in which the electronic controller is configured to: inhibit driving of the drive motor, identify a neutral set parameter based on a first output value from the position sensor associated with a neutral position of the control arm, identify a forward set parameter based on a second output value from the position sensor associated with a maximum forward position of the control arm, identify a reverse set parameter based on a third output value from the position sensor associated with a maximum reverse position of the control arm; and operate in a drive mode in which the electronic controller is configured to control the drive motor in accordance with the angular position of the control arm indicated by the position sensor, the neutral set parameter, the forward set parameter, and the reverse set parameter.

In some embodiments, in the calibration mode, the electronic controller is further configured to: determine a neutral deadband based on the neutral set parameter, determine a maximum forward deadband based on the forward set parameter, and determine a maximum reverse deadband based on the reverse set parameter; and wherein, in the drive mode, the electronic controller is further configured to control the drive motor in accordance with the angular position of the control arm indicated by the position sensor, the neutral deadband, the maximum forward deadband, and the maximum reverse deadband. In some embodiments, to control the drive motor in accordance with the angular position of the control arm indicated by the position sensor, the neutral deadband, the maximum forward deadband, and the maximum reverse deadband, the electronic controller is further configured to: not drive the drive motor when the output value from the position sensor is within the neutral deadband, drive the drive motor at a maximum forward level when the output value from the position sensor is within the maximum forward deadband, and drive the drive motor at a maximum reverse level when the output value from the position sensor is within the maximum reverse deadband. In some embodiments, to identify the neutral set parameter, the electronic controller is configured to average output values from the position sensor over a period while the control arm is in the neutral position, wherein, to identify the forward set parameter, the electronic controller is configured to detect the output value from the position sensor that has the greatest difference from the neutral set parameter while the control arm is in the forward range, and wherein, to identify the reverse set parameter, the electronic controller is configured to detect the output value from the position sensor that has the greatest difference from the neutral set parameter while the control arm is in the reverse range. In some embodiments, to identify the forward set parameter, the electronic controller is further configured to determine that the output value from the position sensor that has the greatest difference from the neutral set parameter while the control arm is in the forward range exceeds a minimum forward threshold value, and, to identify the reverse set parameter, the electronic controller is further configured to determine that the output value from the position sensor that has the greatest difference from the neutral set parameter while the control arm is in the reverse range exceeds a minimum reverse threshold value. In some embodiments, in the calibration mode, the electronic controller is configured to: provide a first prompt on a display of the user interface to release the control arm into the neutral position before identifying the neutral set parameter, provide a second prompt on the display of the user interface to move the control arm to the maximum forward position before identifying the forward set parameter, and provide a third prompt on the display of the user interface to move the control arm to the maximum reverse position, before identifying the reverse set parameter. In some embodiments, the position sensor has a position map that maps potential sensed angles of the control arm to respective output values, and wherein, in the calibration mode, the electronic controller is further configured to: update the position map of the position sensor to map a midpoint output value of the position sensor to the neutral position of the control arm, update the forward set parameter based on an offset from the neutral set parameter and the midpoint output value, update the reverse set parameter based on the offset, and update the neutral set parameter to be the midpoint output value. In some embodiment, in the calibration mode, the electronic controller is further configured to: determine a neutral deadband based on the neutral set parameter after the neutral set parameter is updated to be the midpoint output value, determine a maximum forward deadband based on the forward set parameter after the forward set parameter is updated based on the offset, and determine a maximum reverse deadband based on the reverse set parameter after the reverse set parameter is updated based on the offset; and wherein, in the drive mode, the electronic controller is further configured to control the drive motor in accordance with the angular position of the control arm indicated by the position sensor, the neutral deadband, the maximum forward deadband, and the maximum reverse dead band. In some embodiments, the control arm is a left control arm, drive motor is a left drive motor, and the drive wheel is a left drive wheel; and the electric vehicle further comprises: a right drive wheel supporting the frame above the ground surface; a right drive motor mounted to the frame and driving rotation of the right drive wheel to move the electric vehicle over the ground surface; a right control arm coupled to the frame at a second pivot joint enabling the right control arm to pivot about the second pivot joint through a range of motion that includes a second forward range of positions, a second neutral position, and a second reverse range of positions; a second position sensor configured to indicate an angular position of the right control arm in the range of motion; wherein the electronic controller is further configured to: while operating in the calibration mode: inhibit driving of the right drive motor, identify a second neutral set parameter based on a first output value from the second position sensor associated with a neutral position of the right control arm, identify a second forward set parameter based on a second output value from the second position sensor associated with a maximum forward position of the right control arm, identify a second reverse set parameter based on a third output value from the second position sensor associated with a maximum reverse position of the right control arm; and while operating in the drive mode: control the right drive motor in accordance with the angular position of the right control arm indicated by the second position sensor, the second neutral set parameter, the second forward set parameter; and the second reverse set parameter.

In another aspect, the invention provides a method of calibrating a drive control for an electric vehicle having a frame, a drive wheel supporting the frame above a ground surface, and a drive motor mounted to the frame and configured to drive rotation of the drive wheel to move the electric vehicle over the ground surface, the method comprising: operating in a calibration mode, by an electronic controller of the electric vehicle, in response to a request received via a user interface of the electric vehicle; while in the calibration mode: inhibiting driving of the drive motor; identifying a neutral set parameter based on a first output value from a position sensor associated with a neutral position of a control arm, wherein the control arm is coupled to the frame at a pivot joint enabling the control arm to pivot about the pivot joint through a range of motion that includes a forward range of positions, a neutral position, and a reverse range of positions, and wherein the position sensor is configured to indicate an angular position of the control arm in the range of motion; identifying a forward set parameter based on a second output value from the position sensor associated with a maximum forward position of the control arm, identify a reverse set parameter based on a third output value from the position sensor associated with a maximum reverse position of the control arm; and operating in a drive mode, by the electronic controller; while in the drive mode: determining, by the electronic controller, an angular position of the control arm indicated by the position sensor; and controlling the drive motor in accordance with the angular position of the control arm indicated by the position sensor, the neutral set parameter, the forward set parameter, and the reverse set parameter.

In some embodiments, the method further comprises while in the calibration mode: determining a neutral deadband based on the neutral set parameter, determining a maximum forward deadband based on the forward set parameter, and determining a maximum reverse deadband based on the reverse set parameter; and while in the drive mode: controlling the drive motor in accordance with the angular position of the control arm indicated by the position sensor, the neutral deadband, the maximum forward deadband, and the maximum reverse deadband. In some embodiments, controlling the drive motor in accordance with the angular position of the control arm indicated by the position sensor, the neutral deadband, the maximum forward deadband, and the maximum reverse deadband further comprises: not driving the drive motor when the output value from the position sensor is within the neutral deadband, driving the drive motor at a maximum forward level when the output value from the position sensor is within the maximum forward deadband, and driving the drive motor at a maximum reverse level when the output value from the position sensor is within the maximum reverse deadband. In some embodiments, identifying the neutral set parameter further includes averaging output values from the position sensor over a period while the control arm is in the neutral position, wherein identifying the forward set parameter further includes detecting the output value from the position sensor that has a greatest difference from the neutral set parameter while the control arm is in the forward range, and wherein identifying the reverse set parameter further includes detecting the output value from the position sensor that has a greatest difference from the neutral set parameter while the control arm is in the reverse range. In some embodiments, identifying the forward set parameter further includes determining that the output value from the position sensor that has the greatest difference from the neutral set parameter while the control arm is in the forward range exceeds a minimum forward threshold value, and wherein identifying the reverse set parameter further includes determining that the output value from the position sensor that has the greatest difference from the neutral set parameter while the control arm is in the reverse range exceeds a minimum reverse threshold value. In some embodiments, the method further comprises, while in the calibration mode: providing a first prompt on a display of the user interface to release the control arm into the neutral position before identifying the neutral set parameter, providing a second prompt on the display of the user interface to move the control arm to the maximum forward position before identifying the forward set parameter, and providing a third prompt on the display of the user interface to move the control arm to the maximum reverse position, before identifying the reverse set parameter. In some embodiments, the position sensor has a position map that maps potential sensed angles of the control arm to respective output values, and the method further comprises, while in the calibration mode: updating the position map of the position sensor to map a midpoint output value of the position sensor to the neutral position of the control arm, updating the forward set parameter based on an offset from the first output value and the midpoint output value, updating the reverse set parameter based on the offset, and updating the neutral set parameter to be the midpoint output value. In some embodiments, the method further comprises while in the calibration mode: determining a neutral deadband based on the neutral set parameter after the neutral set parameter is updated to be the midpoint output value, determining a maximum forward deadband based on the forward set parameter after the forward set parameter is updated based on the offset, and determining a maximum reverse deadband based on the reverse set parameter after the reverse set parameter is updated based on the offset; and while in the drive mode: controlling the drive motor in accordance with the angular position of the control arm indicated by the position sensor, the neutral deadband, the maximum forward deadband, and the maximum reverse deadband. In some embodiments, the control arm is a left control arm, drive motor is a left drive motor, and the drive wheel is a left drive wheel, and the electric vehicle further includes a right control arm coupled to the frame at a second pivot joint enabling the right control arm to pivot about the second pivot joint through a second range of motion that includes a second forward range of positions, a second neutral position, and a second reverse range of positions, and a second position sensor configured to indicate an angular position of the right control arm in the second range of motion, the method further comprising, while in the calibration mode: inhibiting driving of the right drive motor; identifying a second neutral set parameter based on a first output value from the second position sensor associated with a second neutral position of the right control arm, identifying a second forward set parameter based on a second output value from the second position sensor associated with a maximum forward position of the right control arm, identify a second reverse set parameter based on a third output value from the second position sensor associated with a maximum reverse position of the right control arm; while in the drive mode: determining, by the electronic controller, an angular position of the right control arm indicated by the second position sensor; and controlling the right drive motor in accordance with the angular position of the right control arm indicated by the second position sensor, the second neutral set parameter, the second forward set parameter, and the second reverse set parameter.

Other aspects of the invention will become apparent by consideration of the detailed description and accompanying drawings.

BRIEF DESCRIPTION OF THE DRAWINGS

FIG. 8 is a perspective view of a battery of the bank of batteries.

FIG. 9 is a bottom perspective view of the battery.

FIG. 4 is a flow chart for the proportional integral control loop of the mower electronic controller.

FIG. 42A is an angular encoding diagram that illustrates a position map of a maneuvering control sensor.

FIG. 42B is a partial angular encoding diagram.

FIG. 42C is a partial angular encoding diagram.

DETAILED DESCRIPTION

Figure 1:
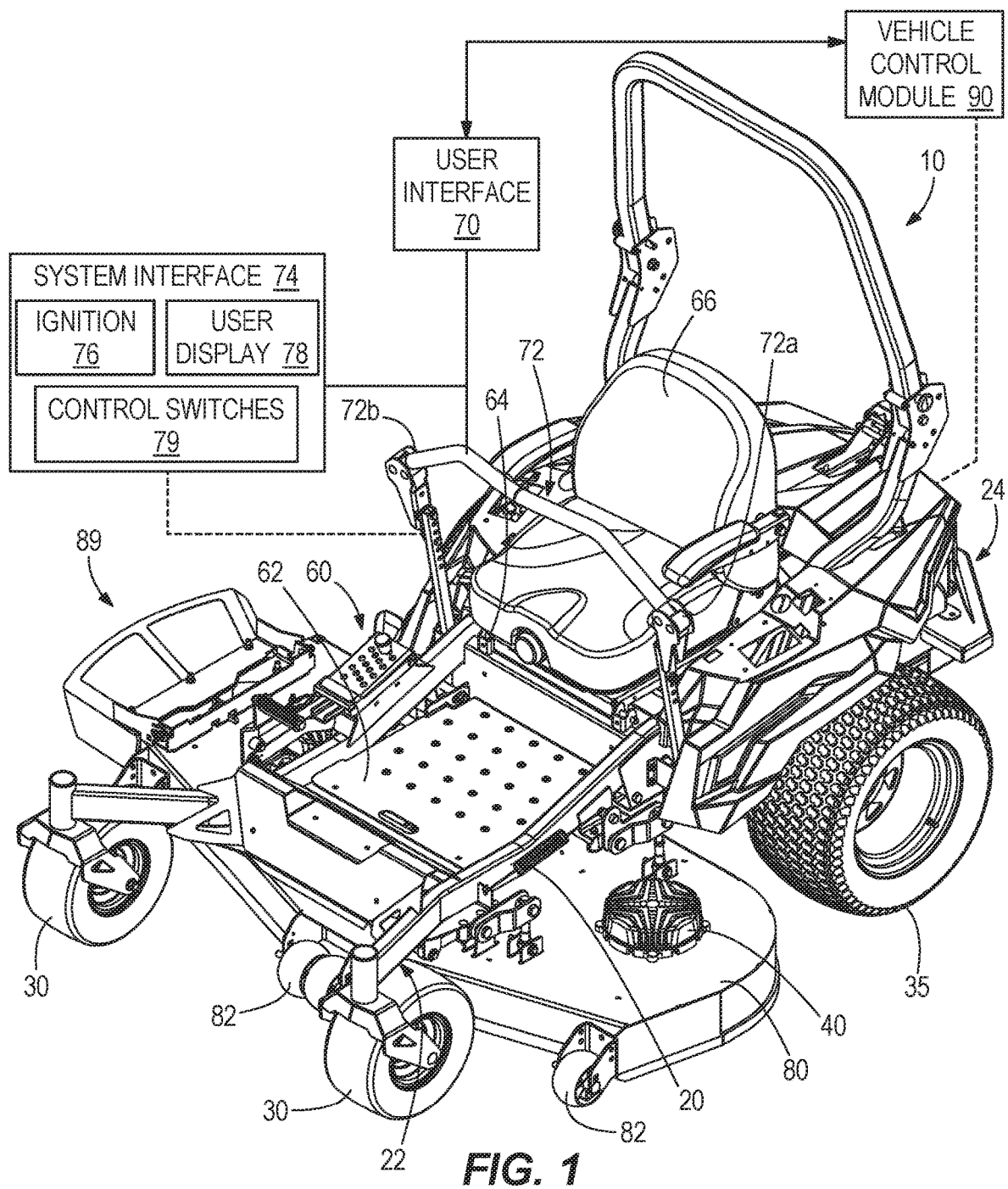
FIG. 1 is a perspective view of an electric zero turn lawn mower according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. As used herein, terms relating to position (e.g., front, rear, left, right, etc.) are relative to an operator situated on a utility vehicle during normal operation of the utility vehicle.

One problem addressed with the present invention arises from the nature of a connection interface to allow a power source to be removed from a battery compartment of a lawn mower. Such a power source includes, among other elements as will be explained below, a plurality of battery packs that form a gravity-biased connection with a battery interface. The gravity biased connection ensures that the batteries are always biased into contact during ordinary operation of the lawn mower. The gravity-biased connection of the battery packs also facilitates relatively easy removal the battery packs from the lawn mower.

Another problem addressed with the present invention arises from the nature of managing a priority charging method of the plurality of battery pack with an electronic control module (e.g., a vehicle control module, battery control module, etc.). When battery packs are at a low state of charge, lawn mowers typically cannot operate at a desired performance level (e.g., cutting or driving speed). This poses problems when a user desires to quickly charge the lawn mower. To improve the performance of the lawn mower, the electronic control module manages the priority charging method to charge the battery packs having a state of charge above a predetermined threshold first. As a result, the lawn mower may be operated at the desired performance level for a longer time.

Another problem addressed with the present invention arises from the nature of electric vehicles being very quiet during operation. As a result, the likelihood that the user is unaware that the vehicle has started or is in an operational state increases. The vehicle control module manages a live to drive system that includes an audible element and a user display. When the lawn mower is being started, the live to dive system alerts the user with a visual alert using the user display and audible alert using the audible element. As a result, the user is alerted that the vehicle is in an operational state.

Another problem addressed with the present invention arises from navigating the lawn mower in a tight area (e.g., between obstacles such as trees, rocks, etc.). The lawn mower includes an adjustment mechanism that interacts with the vehicle control module and maneuvering controls of the lawn mower to variably limit the maximum speed of the lawn mower. The adjustment mechanism may, for example be a dial that is adjustable between a plurality of positions. When the dial is adjusted to a desired position, the maximum speed of the lawn mower is adjusted to a desired maximum speed. The precision of the maneuvering controls increases as the maximum speed is decreased to allow the user to perform a precise maneuver in the tight area.

FIGS. 1-6 illustrate a lawn mower 10. The lawn mower 10 may be, for example, an electric lawn mower, or a hybrid lawn mower. The illustrated lawn mower 10 includes a frame 20, ground engaging elements 30, 35, a prime mover 40, 45 (FIGS. 1 and 3), a power source 50 (FIG. 4), an operator platform 60, a user interface 70 (illustrated schematically in FIG. 1), a cutting deck 80, and a vehicle control module 90 (illustrated schematically in FIG. 1).

The frame 20 includes a first or front portion 22 (extending to the center of the frame) and a second or rear portion 24 (meeting the front portion at the center of the frame) opposite the front portion 22. The frame 20 defines the basic body structure or chassis of the lawn mower 10 and supports the other components of the lawn mower 10. The frame 20 is supported by the ground engaging elements 30, 35 and in turn supports the other components of the lawn mower 10.

The ground-engaging elements 30, 35 are movably (e.g., rotatably) coupled to the frame 20. The illustrated ground-engaging elements 30, 35 include two first or front ground-engaging elements 30 coupled to the front portion 22 of the frame 20, and two second or rear ground-engaging elements 35 coupled to the rear portion 24 of the frame 20. In the illustrated embodiment, the ground-engaging elements 30, 35 are rotatable wheels but in other embodiments could be tracks for example. In the illustrated embodiment, the first (front) ground-engaging elements 30 are passive (i.e., rotating in response to movement of the lawn mower) caster wheels and the second (rear) ground-engaging elements 35 are the driven (i.e., rotating to cause movement of the lawn mower) wheels rotating under the influence of the prime mover 45. The second (rear) ground-engaging elements 35 may be referred to in the illustrated embodiment as the drive wheels or the left and right drive wheels 35, it being understood that the terms "left" and "right" are from the perspective of an operator in an ordinary operating position on the lawn mower. The drive wheels 35 are rotated by the prime mover 45 at a selected speed and direction to effect movement and steering of the lawn mower 10 in the well-known manner of a zero turn radius lawn mower. In other embodiments, similar prime movers 45 may also or alternatively be coupled to the two first ground-engaging elements 30 for the same purpose as the prime movers 45. In other embodiments, the lawn mower may take the form of a stand-on mower or a tractor-style mower with steerable wheels.

Figure 2:
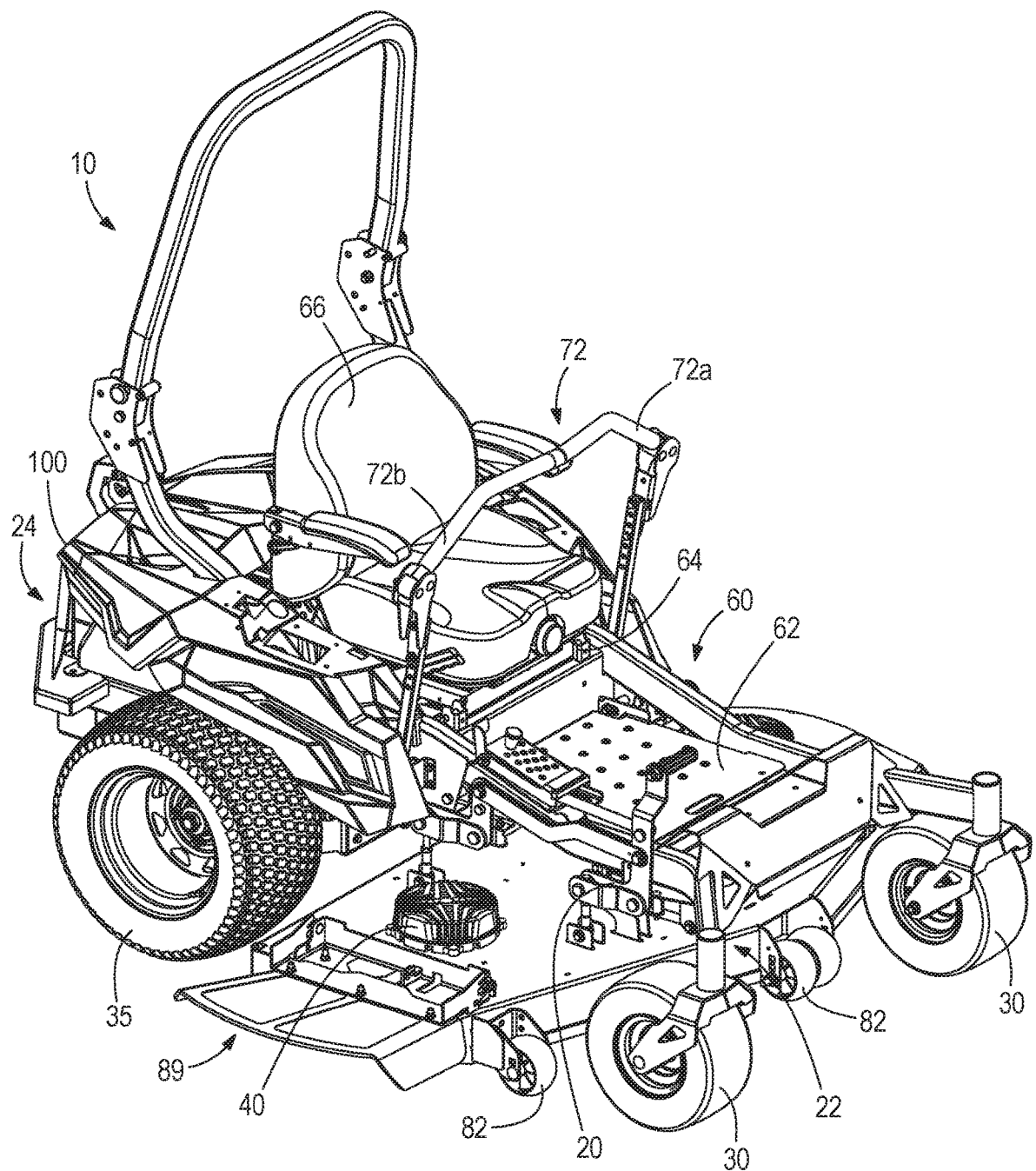
FIG. 2 is another perspective view of the lawn mower of FIG. 1.
Figure 3:
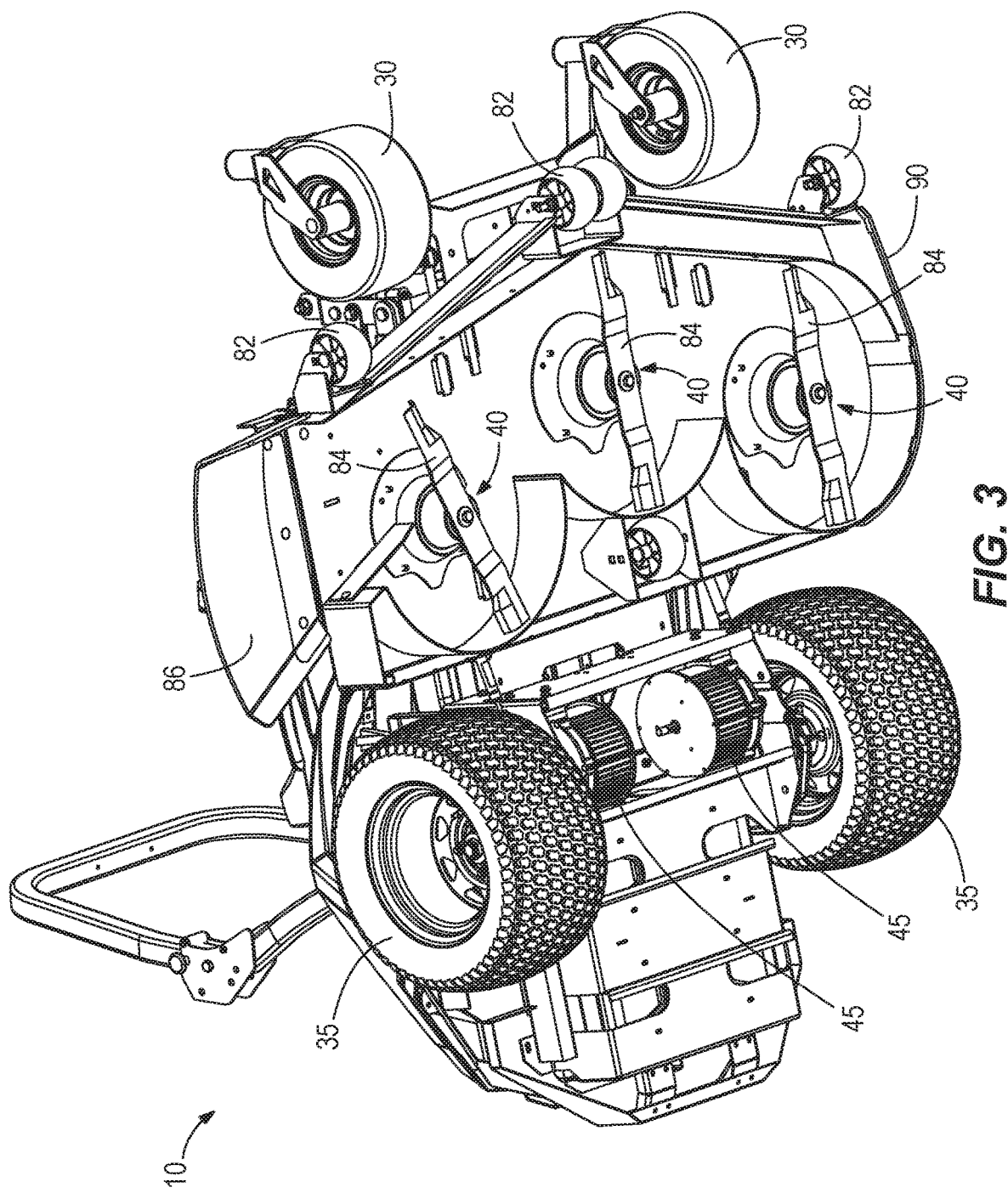
FIG. 3 is a bottom perspective view of the lawn mower FIG. 1.

The prime mover 40, 45 may, for example, be an internal combustion engine, one or more electric motors, hybrid gas/electric, etc. With reference to FIGS. 1-3, the prime mover 40, 45 of the illustrated embodiment comprises a plurality of prime movers in the form of dedicated drive motors 45 (FIG. 3) and deck motors 40. The drive motors 45 are supported by the frame 20, and are interconnected to the drive wheels 35 through a transmission or gear train to increase speed or torque delivered to the drive wheels 35. In an alternative embodiment, the drive motors 45 may each include an output shaft that is directly coupled to one of the drive wheels 35 to independently drive rotation of the associated drive wheel 35 at a selected speed and direction. The drive wheels 35 may therefore be characterized as direct-drive wheels with dedicated drive motors 45. Speed and steering of the mower in the illustrated embodiment are effected by the direction and relative speeds of the drive wheels 35. To elaborate further on the point made earlier, the deck motors 40 and drive motors 45 together comprise what is referred to as the prime mover of the illustrated lawn mower 10. In the illustrated embodiment a deck motor 40 is dedicated to each blade and a drive motor 45 is dedicated to each drive wheel 35, but in other embodiments the work of some or all of these motors 40, 45 can be combined in a single motor that distributes torque to multiple blades and/or drive wheels through power transmissions.

Figure 4:
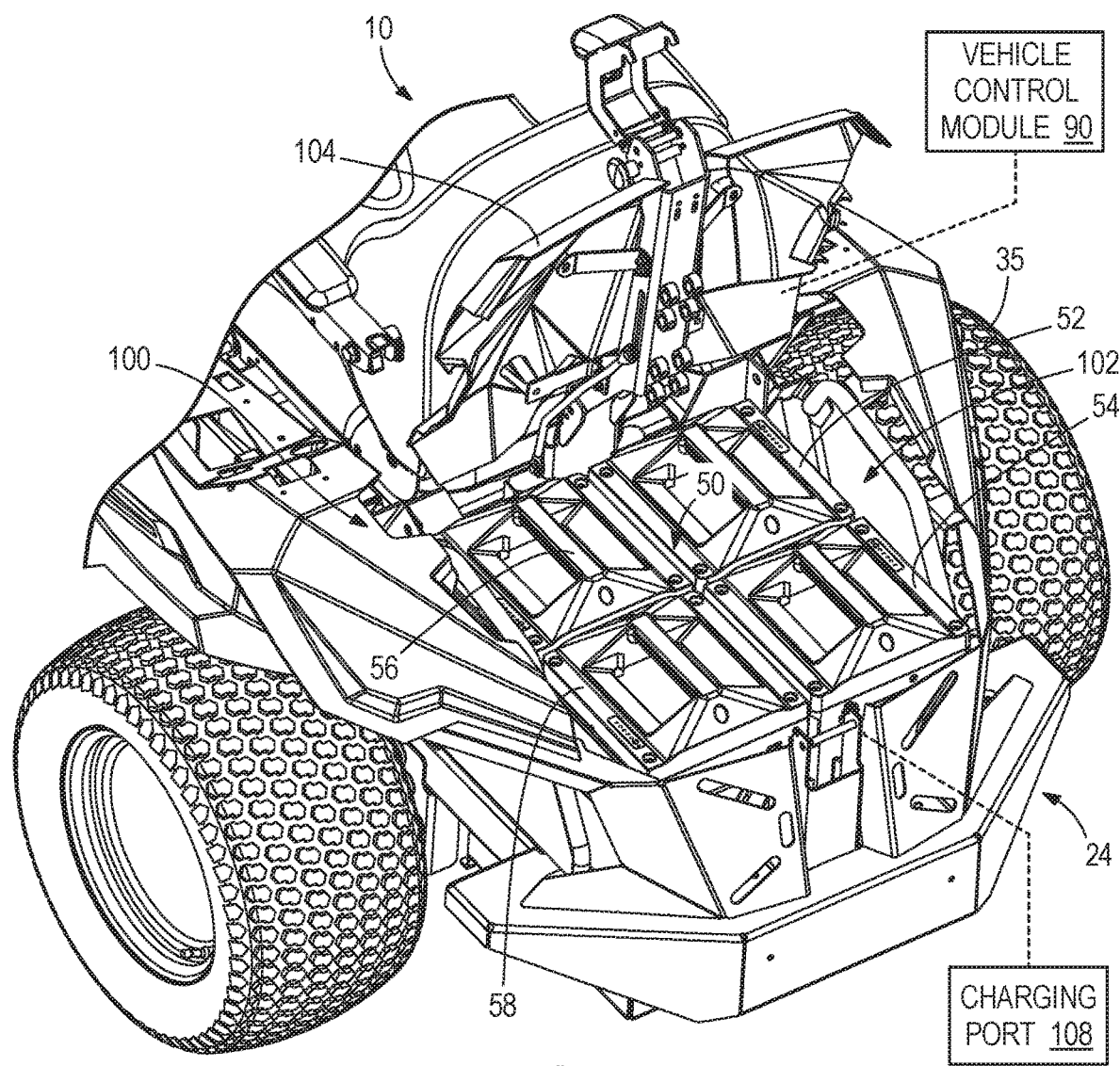
FIG. 4 is a perspective view of a battery compartment of the lawn mower having a bank of batteries positioned within the battery compartment.

Turning now to FIG. 4, the power source 50 in the illustrated embodiment is a bank (plurality) of battery packs 52, 54, 56, 58, as described in detail below. In other embodiments, the power source 50 may include a single relatively large battery, but one potential advantage of the present invention is that the battery packs 52, 54, 56, 58 are modular, lighter, and independently chargeable. As a result, the illustrated battery packs 52, 54, 56, 58 can be handled, carried, charged, replaced, and serviced more easily by a typical user than a single, much larger battery. For example, the illustrated batteries may weigh approximately 55 lbs or less apiece, as discussed below. In some embodiments, the batteries may weigh 53 lbs. The power source 50 is electrically coupled to the drive motors 45 and deck motors 40 to provide sufficient power for their operation. The power source 50 is illustrated as being supported in the rear portion 24 of the frame 20, but in other embodiments may be supported on the front portion 22 or in the center of the frame 20 (straddling the front and rear portions 22, 24 of the frame 20).

With reference to FIGS. 1 and 2, the operator platform 60 is supported by the frame 20 and straddles the front portion 22 and the rear portion 24 of the frame 20. The illustrated operator platform 60 includes a first or lower section 62 and a second or upper section 64. The lower section 62 is located forward of the upper section 64 and is configured to support a user's feet. The upper section 64 is located rearward of the lower section 62 and supports a seat 66. The seat 66 allows a user to sit during operation of the lawn mower 10 and access the user interface 70, In some embodiments, the operator platform 60 may only include the lower section 62 such that the lawn mower 10 is a standing vehicle. In further embodiments, the operator platform 60 may have other configurations. An operator zone is defined as the seat 66 and all of the controls and other elements of the lawn mower 10 that can be reached by or seen by the user while seated, such as the user interface 70 and the lower portion 62.

The user interface 70 (schematically illustrated in FIG. 1) includes maneuvering controls 72 and a system interface 74 supported by the frame 20 within the operator zone. The maneuvering controls 72 are operable to control the lawn mower 10, for example, by providing drive commands in response to user manipulation of the maneuvering controls 72. For example, the maneuvering controls 72 can be used to control the drive motors 45 to drive a desired speed and direction of rotation of the rear ground-engaging elements 35 to move and/or turn the lawn mower 10. In the illustrated embodiment, the maneuvering controls 72 include left and right control arms 72a, 72b used for a zero-turn radius (ZTR) lawn mower. The drive motors 45 are manipulated with the left and right control arms 72a, 72b, with the left control arm 72a controlling the direction and speed of rotation of the left drive wheel 35 and the right control arm 72b controlling the direction and speed of rotation of the right drive wheel 35. In the illustrated embodiment, the left control arm 72a is coupled to the frame 20 at a pivot joint 73a and the right control arm 72b is coupled to the frame 20 at a pivot joint 73b. In other embodiments, the maneuvering controls 72 may include other suitable actuators, such as a steering wheel, joystick(s), and the like.

The system interface 74 may include an ignition 76, a user display 78, and control switches 79 (e.g., adjustment switches in the form of dials, push buttons, etc., which will be described in more detail below). The ignition 76 communicates with the vehicle control module 90 to allow the user to selectively provide power to (i.e., activate) the drive motors 45 and the deck motors 40. In some embodiments, ignition 76 include separate switches that activate the drive motors 45 and the deck motors 40 independently or by group. In the illustrated embodiment, the battery packs 52, 54, 56, 58 communicate directly with the user display 78 (e.g., via CAN communication) to display battery-related information on the user display 78. In other embodiments, the user display 78 communicates with the vehicle control module 90 to display information to the user. For example, the user display 78 may display a state of charge of the power source 50, faults occurring on the mower (e.g., battery pack faults), an operational state of the lawn mower 10, etc. The control switches 79 and the user display 78 may interact with the vehicle control module 90 to control functions of the mower 10 (e.g., activation of deck motor 40, drive motors 45, maximum variable speed, etc.).

With reference to FIG. 3, the cutting deck 80 is supported underneath the frame 20 mainly in the front portion 22 in the illustrated embodiment, but in other embodiments might be moved rearward to the center or even fully to the rear portion 24, for example. The cutting deck 80 includes one or more ground-engaging elements 82 (e.g., anti-scalping rollers) that support the cutting deck 80 on the ground. As illustrated in FIGS. 1 and 2, the deck motors 40 are mounted to the cutting deck 80. In the illustrated embodiment, the cutting deck 80 includes three deck motors 40. In other embodiments, the cutting deck 80 may include fewer deck motors 40 (e.g., one or two) or more deck motors 40 (e.g., three, four, etc.). Referring back to FIG. 3, each deck motor 40 is mounted at least partially above the cutting deck 80 to provide access to cooling ambient air and includes an output shaft under the cutting deck 80. A blade 84 is mounted under the cutting deck 80 to each output shaft and rotates under the influence of the deck motor 40 to cut grass under the cutting deck 80. In the illustrated embodiment, the cutting deck 80 includes a side discharge opening 86 to discharge mown grass. In other embodiments, the cutting deck 80 may include a rear discharge, a collection bag, etc. to collect or discharge mown grass from under the cutting deck 80. In other embodiments, the blades 84 may be configured to mulch the grass clippings in which case there may be no discharge opening 86 or the discharge opening 86 may include an mechanism for opening and closing to selectively provide discharge and mulching functionality. Each of the deck motors 40 directly drives a single blade 84 and can therefore be termed a direct-drive, dedicated deck motor 40.

The vehicle control module 90 may interact with the user interface 70, the drive motors 45 (e.g., via a drive motor controller), and the deck motors 40 (e.g., via a deck motor controller) during operation of the mower 10. More specifically, the vehicle control module 90 may take input from the system interface 74 and relay instructions to the drive motors 45 and the deck motors 40. The vehicle control module 90 may also receive information from the power source 50, such as state of charge of the batteries and other battery-related information, and relay this information to the user interface 70. The user display 78 may display information to the user such as state of charge of the power source 50, operation mode of mower 10, etc., as described in more detail below. While lawn mower 10 is described above as an electric zero turn lawn mower, it should be appreciated that the battery assembly and/or control systems described below may be used with any utility device that is operable to cut grass.

Power Source

Figure 5:
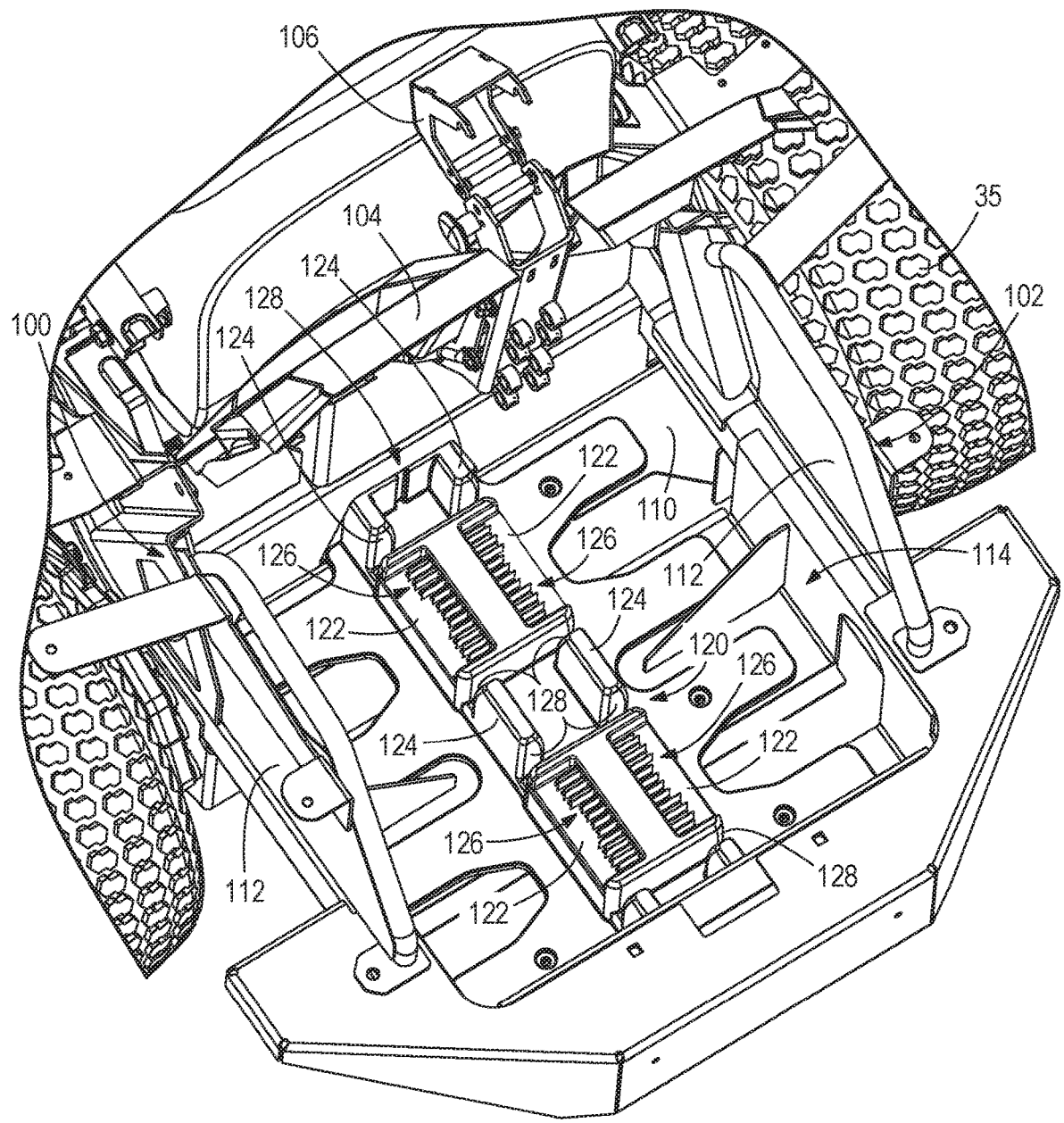
FIG. 5 is a perspective view of the battery compartment of the lawn mower having the bank of batteries removed from the battery compartment to illustrate a battery attachment structure.

Now referring to FIGS. 4 and 5, a battery compartment 100 is supported by the frame 20. The battery compartment 100 includes a housing 102, a lid 104, a latch 106 and a charging port 108 (illustrated schematically). The housing 102 has a bottom wall 110 and side walls 112 and defines an opening 114. The lid 104 is coupled to the housing 102 and is movable between a closed condition (FIGS. 1-2) in which it covers the opening 114 (i.e., closes the housing 102) and an open condition (FIGS. 4-5) in which it provides access to the opening 114 (i.e., opens the housing 102). In the illustrated embodiment, the lid 104 is pivotally (more specifically, hingedly) coupled to the forward end of the housing 102. The latch 106 selectively secures the lid 104 in the closed condition. Although illustrated schematically, the charging port 108 may, for example, be mounted to or integrated into the housing 102 of the battery compartment 100. In other embodiments the charging port 108 can be provided separately from the housing 102.

Figure 6:
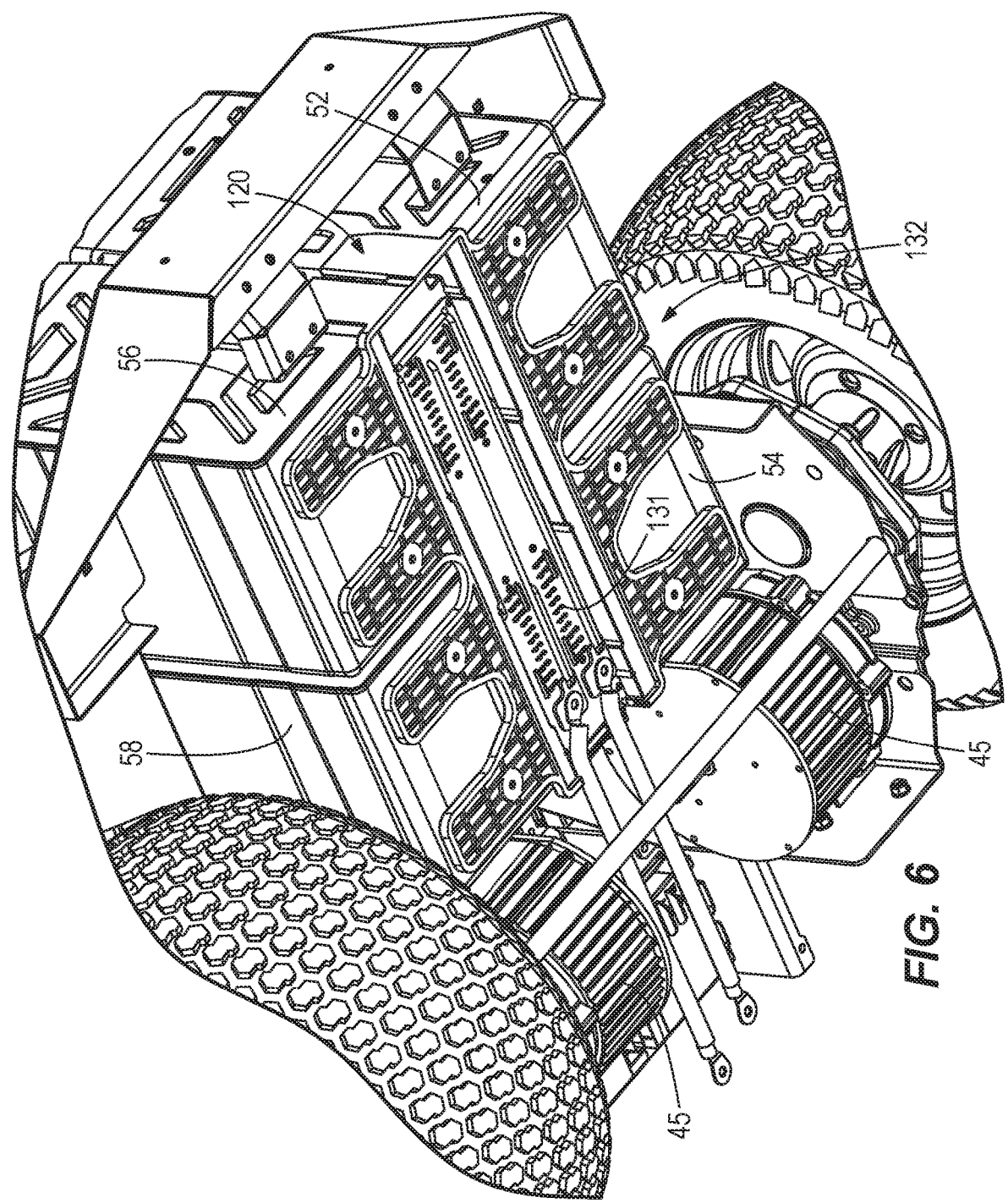
FIG. 6 is a bottom perspective view of the battery compartment illustrating the bus bar.
Figure 7:
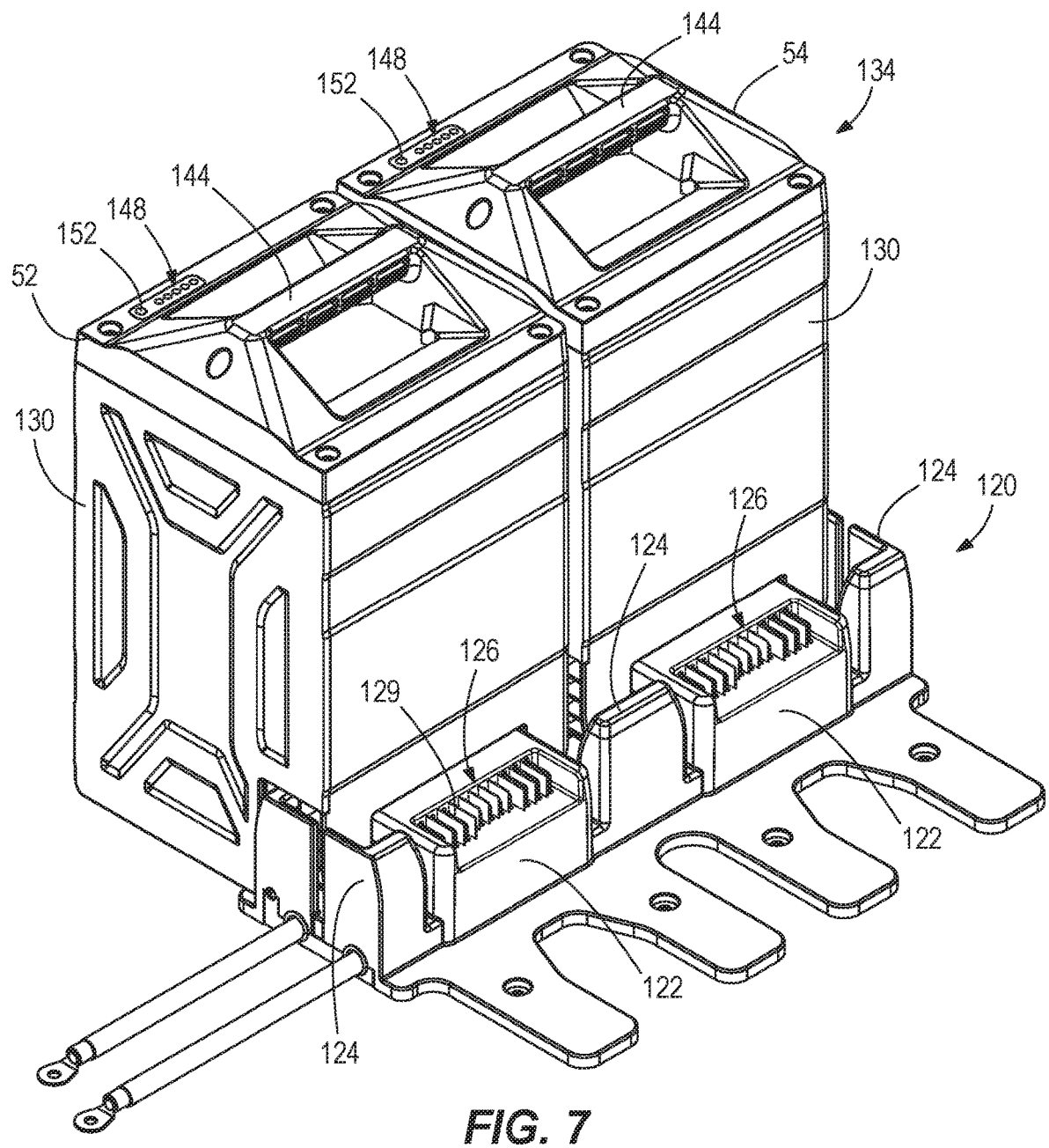
FIG. 7 is a perspective view of two batteries of the bank of batteries attached to the battery attachment structure.

Referring now to FIGS. 5-6, a battery interface 120 is mounted to the bottom wall 110 of the battery compartment 100. The battery interface 120 includes four docking stations 122, each including alignment structures 124 and electrical connectors 126. The alignment structures 124 extend vertically from the bottom wall 110 of the battery compartment 100. The alignment structures 124 are structural elements that are relatively rigid and able to withstand impact loading that may arise as batteries are installed on the electrical connectors 126 so that the batteries are properly aligned with the electrical connectors 126 before the batteries engage the electrical connectors 126. The electrical connectors 126 are between alignment structures 124, Within (e.g., between the alignment structures 124 and electrical connectors 126) and between each docking station 122 are slits 128 to allow debris to exit the battery compartment 100 to reduce the likelihood of debris buildup. In other embodiments, the battery interface 120 may include more docking stations 122 (e.g., five, six, etc.) or fewer docking stations 122 (e.g., three, two, one). In the illustrated embodiment, the electrical connectors 126 are male contacts 129 (e.g., blades). It will be appreciated that an external charging station may be formed with a similar battery interface structure as illustrated in FIGS. 5 and 7.

As illustrated in FIG. 6, a bus bar 131 is mounted to a bottom side 132 of the battery interface 120 and electrically communicates the electrical connectors 126 with the vehicle control module 90 and with the charging port 108.

Figure 10:
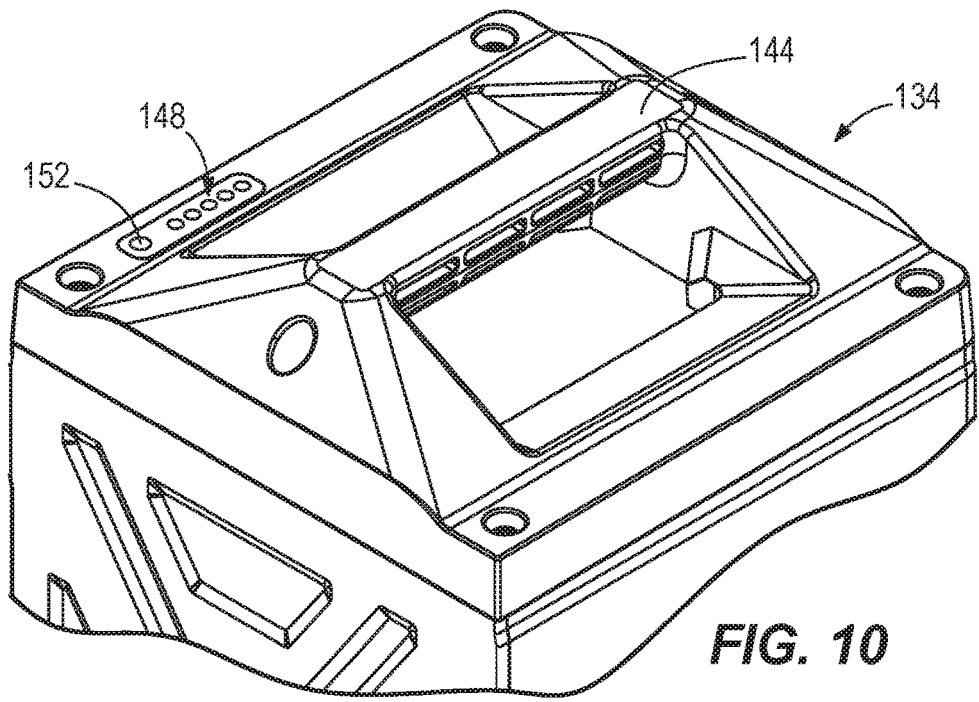
FIG. 10 is a top perspective view of the battery.

The battery interface 120 is adapted to receive a plurality of battery packs 52, 54, 56, 58, which together are referred to as a bank of battery packs 50. In the illustrated embodiment, the bank of battery packs 50 includes four battery packs 52, 54, 56, 58 to match the four docking stations 122 of the battery interface 120. FIGS. 8-10 illustrate one of the battery packs 52, although the description and discussion may also be applied to the other battery packs 54, 56, 58. The battery pack 52 includes a housing, case or enclosure 130 having a plurality of cells arranged in series to provide a desired voltage (e.g., 48 volts). In other embodiments, the battery pack 52 may have a higher or lower voltage rating. In the illustrated embodiment, the enclosure 130 has a rectangular geometry having an upper portion 134, a lower portion 136, sidewalls 138 extending between the upper 134 and lower portion 136, and vents 140 positioned on the sidewalls 138 to reduce the internal pressure of the battery pack 52.

The illustrated enclosure 130 has a height of approximately sixteen inches and a width and depth of approximately nine inches. The size of the enclosure 130 allows each battery pack 52, 54, 56, 58 to have a weight under approximately 55 pounds. The weight of the battery pack 52, 54, 56, 58 and vertical orientation of the battery pack 52, 54, 56, 58 in the battery compartment 100 ensure a gravity-biased connection is formed between the battery pack 52, 54, 56, 58 and the docking station 122. As used herein, "gravity-biased" means that the influence of gravity holds or urges the battery pack 52, 54, 56, 58 into engagement with the docking station 122 during loading of the battery pack 52, 54, 56, 58 or during ordinary operation of the lawn mower. The battery pack 52, 54, 56, 58 may also be secured with another mechanism such as the latch 106 discussed above, but the latch 106 does not work against gravity (and may, indeed work with gravity) when the battery pack 52, 54, 56, 58 is gravity-biased into engagement with the docking station 122. For example, the engagement of the latch 106 secures the lid 104 in the closed condition such that the lid 104 engages the battery pack 52, 54, 56, 58 to form a gravity-assisted connection force that works with the gravity-biased connection of the battery packs 52, 54, 56, 58 to urge the battery packs 52, 54, 56, 58 into engagement with the docking station 122. In some embodiments, the lid 104 may not contact the battery packs 52, 54, 56, 58 when the latch 106 is secured and the gravity-biased connection of the battery packs 52, 54, 56, 58 may secure the battery packs 52, 54, 56, 58 to the docking station 122 (i.e., without the gravity-assisted force).

Additionally, interference and frictional engagements between the battery packs 52, 54, 56, 58 and portions of the battery compartment 100 and docking stations 122 may arise as the battery packs 52, 54, 56, 58 are lowered or dropped into position under the influence of gravity. Such engagements are deemed part of the gravity-biased connection because they are incidental and no other positive action must be taken or other securing mechanism actuated to secure the battery packs 52, 54, 56, 58 into position other than lowering them onto the docking stations 122. In some embodiments, the battery pack 52, 54, 56, 58 may receive an additional force (i.e., a gravity assisted connection force) from the operator to overcome the frictional engagement between the battery pack 52, 54, 56, 58 and the docking station 122.

Referring now to FIGS. 7 and 10, the upper portion 134 of the battery pack 52, 54, 56, 58 includes a handle 144, a set of light emitting diodes (LEDs) 148, and a button 152 (illustrated schematically). The handle 144 is embedded within or formed integrally as part of the upper portion 134 of the enclosure 130 and is graspable by the user to allow for removal of the battery pack 52, 54, 56, 58 from the battery compartment 100. As a result, the user may remove the battery pack 52, 54, 56, 58 from the docking station 122 without the need for tools or an additional lifting aid.

The button 152 interacts with the set of LEDs 148 to indicate the state of charge of each battery pack 52, 54, 56, 58 and whether there is a fault occurring within the battery pack 52, 54, 56, 58. For example, the set of LEDs 148 may include five LEDs that illustrate various charge levels (e.g., 80-100 percent when all 5 LED's are lit, 60-80 percent when four LED's are lit, etc.) when the LED's illuminate a first color (e.g., green, blue, etc.). Additionally, the one or more of the LEDs 148 may illuminate in a second color (e.g., red) when the battery pack has a low charge level (e.g., under 10 percent) or if a fault occurs (e.g., the cells are under-temperature, the cells are over-temperature, a fuse is blown, etc.).

Referring now to FIGS. 8 and 9, the lower portion of the battery pack includes a flat bottom 156, a recessed portion 160 formed in one or the sidewalls 138, opposing alignment structures 164, and female contacts 168. The recessed portion 160 has a height that is larger than the height of the docking station 122. The opposing alignment structures 164 surround the recessed portion 160. The female contacts 168 are positioned within the recessed portion 160 and extend downward towards the flat bottom surface 156.

When the battery pack 52, 54, 56, 58 is secured to the docking station 122 (FIG. 7), the flat bottom 156 engages with the bottom wall 110 of the battery compartment 100. The recessed portion 160, the opposing alignment structures 164, and the female contacts 168 are aligned with the docking station 122. The weight of the battery pack 52, 54, 56, 58 forms a gravity-biased connection between the female contacts 168 of the battery pack 52, 54, 56, 58 and male contacts 129 of the docking station 122. In some embodiments, the battery pack 52, 54, 56, 58 may receive an additional force (i.e., a gravity assisted connection force) from the operator to overcome a frictional force between the female contacts 168 of the battery pack 52, 54, 56, 58 and the male contacts 129 of the docking station 122. The opposing alignment structures 164 of the battery pack 52, 54, 56, 58 engage with the alignment structure 124 of the battery interface to restrict movement of the battery pack 52, 54, 56, 58.

Figure 11:
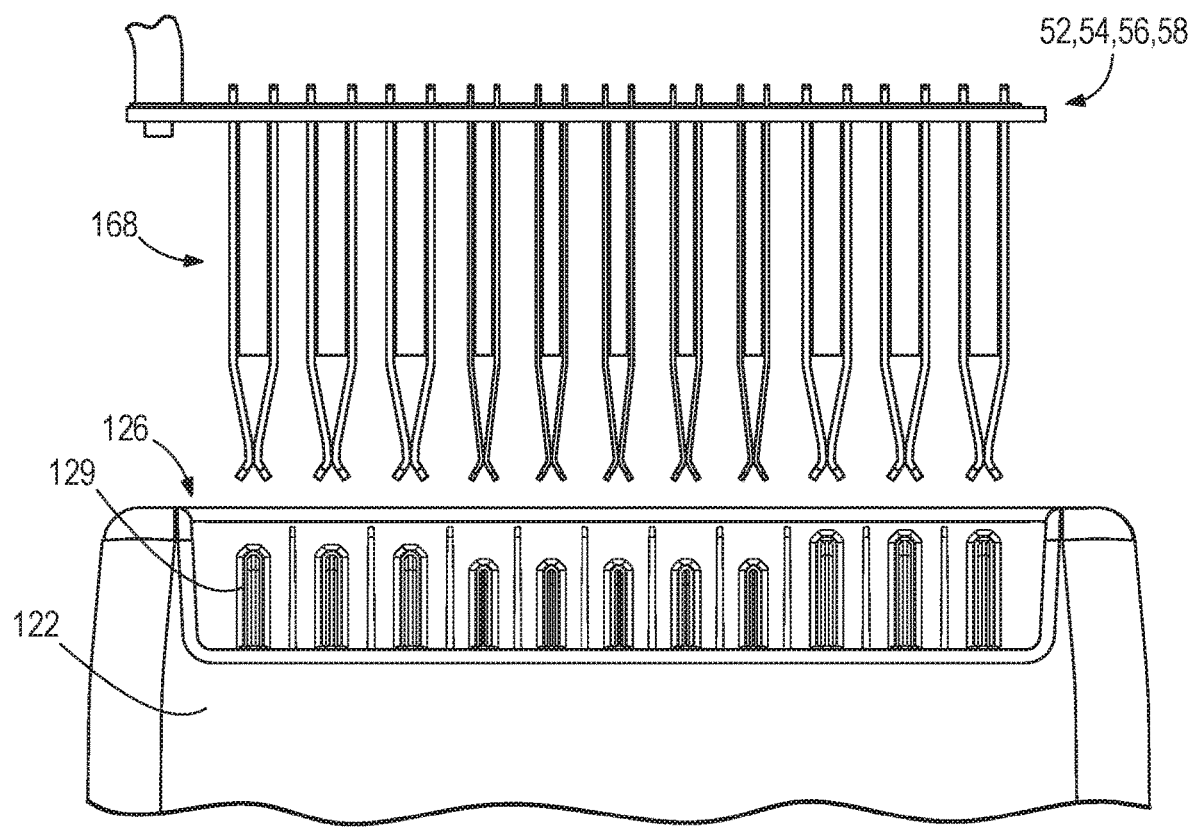
FIG. 11 is a cross sectional side view of a connection interface between the battery and a docking station positioned within the battery compartment.

Referring now to FIG. 11, a cross-section view of a connection interface between the male contacts 129 of the docking station 122 and the female contacts 168 of the battery pack 52, 54, 56, 58 is illustrated. The female contacts 168 each have an equal height. The male contacts 129 have differing heights (e.g., three separate heights) that allow for safe connection and disconnection of the male contacts 129 of the docking station 122 and the female contacts 168 of the battery pack 52, 54, 56, 58. The construction of the female and male contacts 129, 168 allows the battery pack 52, 54, 56, 58 to form the gravity-biased connection with the docking station 122 while reducing the amount of arcing or bending that occurs between the male and female contacts 129, 168. As a result, the amount of wear or damage on the male and female contacts 129, 168 is limited.

Vehicle Control Systems

The lawn mower 10 includes a priority charging method, a live to drive system, and a variable speed control system. The bank of battery packs 50 coupled to the bus bar 131 may communicate directly with a charger 210 to determine the priority charge method. In other embodiments, the bank of battery packs may communication with the vehicle control module 90 to determine the priority charging method. In other embodiments, the vehicle control module 90 communicates with the live to drive system 300 to alert the user when the lawn mower 10 is in an operable state. In yet another embodiment, the vehicle control module 90 communicates with the variable speed control system 400 to control the sensitivity of the maneuvering controls allow the user of the lawn mower to navigate the lawn mower in a tight area (e.g., between obstacles such as trees, rocks, etc.).

Priority Charging Method

Figure 12A:
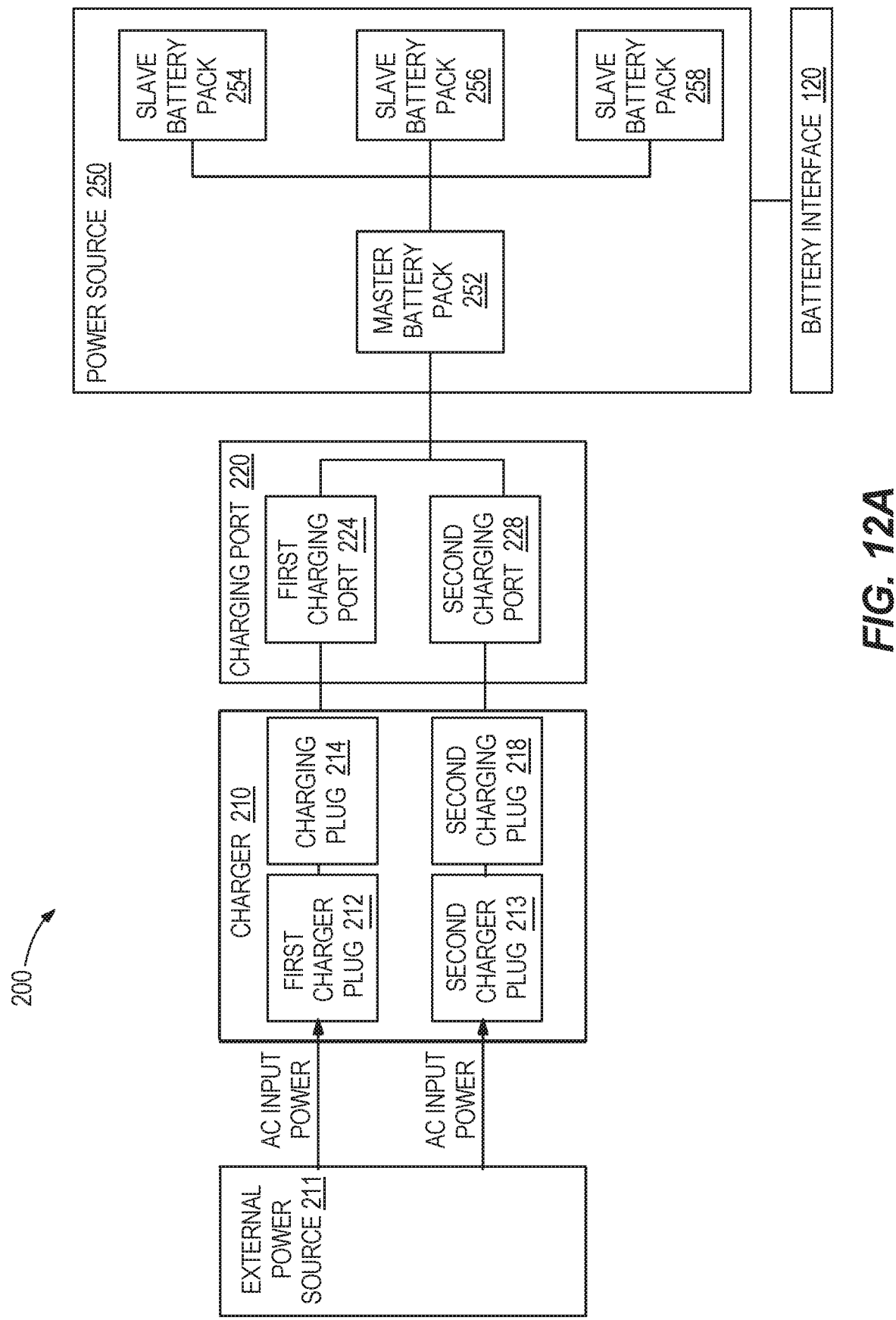
FIG. 12A is a schematic view of a charging system.
Figure 12B:
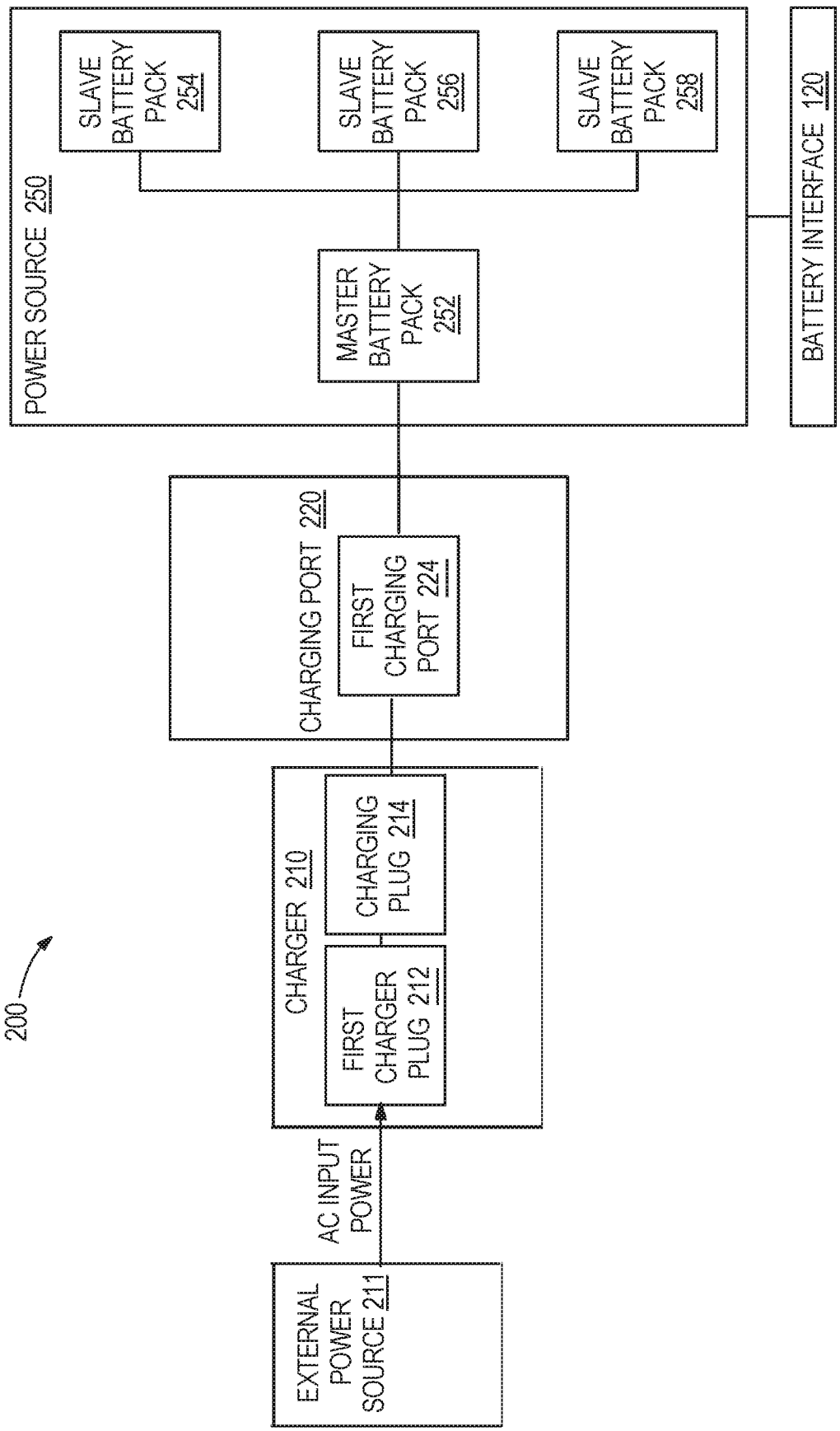
FIG. 12B is a schematic view of a charging system, according to another embodiment.

FIGS. 12A and 12B illustrate a charging system 200 for the power source 50 as described above. The charging system 200 includes a charger configuration 210 (e.g., including one or more battery chargers), charging port 220, a power source 250 coupled to the battery interface 120, and the vehicle control module 90. The charger configuration 210 is coupled to an external power source 211, which may be an alternating current (AC) power grid or generator. In one embodiment, as shown in FIG. 12A, the charger configuration 210 includes a first charger 212 and a second charger 213 respectively coupled to a first charging plug 214 and a second charging plug 218. The first charger 212 and the second charger 213 each include an independent connection to the external power source 211 to receive AC input power, a rectifier circuit to convert received AC input power to direct current (DC) power (not shown), and switching circuitry (now shown) that may be selectively controlled to provide charging current to the first charging plug 214 and second charging plug 218, respectively.

In some embodiments, the AC input power for each charger 212, 213 is provided from an independent circuit of the external power source 211. Accordingly, the overall current that the charger configuration 210 may draw from the external power source 211 without tripping a circuit breaker may be larger (e.g., at 30 or 40 Amps) than if a single connection was provided to the external power source 211 for both chargers 212, 213. Additionally, because each charger 212, 213 is connected to an independent circuit, even if one circuit breaker trips for one of the circuits, the other circuit may still be providing power and the charger configuration 210 may be able to continue to provide charging current.

The charging port 220 includes a first charging port 224 and a second charging port 228. The first and second charging plugs 214, 218 are selectively coupled (e.g. plugged in) by a user to the first and second charging port 224, 228 to provide charging power to the charging port 220. The first and second charging plugs 214, 218 may also be selectively removed (e.g., unplugged) by a user when, for example, the respective first and second chargers 212, 213 are not providing charging current to the charging port 220.

In some embodiments, the charger configuration 210 may include a charger housing (not shown) that houses the first charger 212 and the second charger 213. In such embodiments, the first charging plug 214 and the second charging plug 218 may each have a first end respectively coupled to the first and second chargers 212, 213 within the housing, and a second end that extends away from the housing to enable respective coupling to the first and second charging ports 224, 228. In some embodiments, the charger housing is mounted onto the mower 10, while in other embodiments, the charger housing is separate from the mower 10. In some embodiments, the first charger 212 and second charger 213 have separate housings, rather than a shared housing, which may either be mounted onto the mower 10 or separate from the mower 10.

In some embodiments, as shown in FIG. 12B, the charger configuration 210 includes the first charger 212 (but not the second charger 213) or the second charger 213 (but not the first charger 212). Additionally, in some embodiments, the charger configuration 210 has additional independent chargers each with an associated charging plug and charging port and each provided with power from an independent circuit of the external power source 211. In other embodiments, the lawn mower 10 may include a single charger, a single charging plug, and a single charging port or more than two of each depending on the nature and size of the power source 250. In some embodiments, the two chargers 212 and 213 may be coupled to a single charging port 224 through a Y-charging cable having two inputs respectively coupled to the charging plugs 214 and 218 of the chargers 212 and 213, and one output coupled to the charging plug 224). When only the first charger 212 is operably coupled to the first charging port 224 (via the first charging plug 214), the power source 250 is charged in a "standard charging mode". When multiple chargers (e.g., both the first and second chargers 212, 213) are operably coupled to the charging port 220 (e.g., connected via the first and second charging plugs 214, 218 to the first and second charging ports 224, 228, or connected via a Y-charging cable to the first charging port 224), the power source 250 is charged in a "fast charging mode".

As noted, the power source 250 includes a hank of one or more batteries (e.g., the battery packs 52, 54, 56, 58), one of which may be identified as a master battery pack 252 and the remaining ones of which may be identified as a plurality of slave battery packs 254, 256, 258 (e.g., three in the illustrated embodiment). In other embodiments, the power source 250 may include more (e.g., five, six, seven, etc.) or fewer battery packs (e.g., two, three, one).

In order to determine which battery pack 252, 254, 256, 258 is the master battery pack 252, an identification number is assigned to each battery pack 252, 254, 256, 258 (e.g., one, two, three, four, etc.). The battery pack 252, 254, 256, 258 with the lowest identification number, as identified by the vehicle control module 90, is selected as the master battery pack 252 and the remaining battery packs are slave battery packs 254, 256, 258. If the master battery pack 252 is removed from the battery interface, the vehicle control module 90 may automatically reassign the slave battery pack 254, 256, 258 with the lowest identification number to be the master battery pack 252. At the same time, if an additional battery pack is attached to the battery interface 120 with a lower identification number, the vehicle control module 90 may automatically assign the additional battery pack to be the master battery pack 252. Although the vehicle control module 90 is described as identifying the master and slave battery packs, in some embodiments, the battery packs themselves (without a separate controller such as the vehicle control module 90) perform the arbitration through communications to determine the master and slave battery packs. For example, each battery pack 252, 254, 256, and 258 may broadcast their own respective identification number, which is received by the other battery packs, and each battery pack 252, 254, 256, 258 determines whether its own identification number is the lowest of the numbers that were broadcast and, if so, designates itself as the master battery pack.

The master battery pack 252 communicates with the first and second charging ports 224, 228, the vehicle control module 90, and the slave battery modules 254, 256, 258 to determine the priority charging method. It should be appreciated that each of the battery packs 252, 254, 256, 258 has a state of charge. The master battery pack 252 may communicate with the first and second charging plugs 214, 218 to charge a single battery pack or a plurality of battery packs (e.g., two, three, four, etc.) in parallel.

The master battery pack 252 determines the priority charging method based on the state of charge level of the battery packs 252, 254, 256, 258. The master battery pack 252 automatically manages the priority charging method of the battery packs 252, 254, 256, 258 based on the state of charge of each battery pack 252, 254, 256, 258. The priority charging method includes: (1) determining the state of charge of the plurality of battery packs 252, 254, 256, 258, (2) comparing the state of charge of each of the plurality of battery packs 252, 254, 256, 258 to a predetermined threshold (e.g., in the exemplary embodiments 81 percent state of charge), (3) determining a first set of one or more battery packs with the state of charge above the predetermined threshold and a second set of one or more battery packs with the state of charge under the predetermined threshold, (4) charging the first set of one or more battery packs before charging the second set of one or more battery packs. The steps of priority charging method may be implemented by an electronic controller, such as the vehicle control module 90 or a battery controller of the master battery pack 252.

Exemplary state of charge arrangements of the bank of battery pack 250 are described below. It should be appreciated that while the bank of battery packs 250 is described as having first, second, third and fourth battery packs 252, 254, 256, 258, fewer or more battery packs may be charged.

In a first exemplary embodiment, the first, second, third and fourth battery packs 252, 254, 256, 258 each have a low state of charge (e.g., approximately 15 percent charge). When the charging commences, each of the first, second, third and fourth battery packs 252, 254, 256, 258 are charged concurrently.

In a second exemplary embodiment, the master battery pack 252 determines that the first, second, third and fourth battery packs 252, 254, 256, 258 each have various state of charges under a predetermined state of charge threshold. The predetermined threshold may be a state of charge of equal to or more than 81 percent. For example, the first, second, third, and fourth battery packs 252, 254, 256, 258 may have state of charge levels of 60 percent, 65 percent, 70 percent, and 75 percent, respectively.

In this example, the master battery pack 252 determines that the first battery pack 252 has the lowest state of charge level (60 percent). As a result, the first battery pack 252 is charged alone until the state of charge matches the second battery pack 254 (e.g., the second lowest state of charge). Once the first battery pack 252 has the same state of charge as the second battery pack 254, the first and second battery packs 252, 254 are charged concurrently. The first and second battery packs 252, 254 are charged concurrently until the state of the first and second battery packs 252, 254 matches the state of charge of the third battery pack 256. The first, second, and third battery packs 252, 254, 256 are charged concurrently until the state of the first, second, and third battery packs 252, 254, 256 matches the state of charge of the fourth battery pack 258. This sequence will continue until all the battery packs in the power source 250 are at the same state of charge.

In a third exemplary embodiment, the master battery pack 252 determines that one or more of the first, second, third and fourth battery packs 252, 254, 256, 258 has a state of charge level above the predetermined threshold (e.g., 81 percent). For example, the first, second, third, and fourth battery pack 252, 254, 256, 258 may include state of charge levels of 60 percent, 65 percent, 70 percent, and 85 percent, respectively. In this example, the master battery pack 252 determines the fourth battery pack 258 is above the predetermined threshold and causes charging of the fourth battery pack 258 until the battery pack 258 fully charged. Once the fourth battery pack 258, is fully charged, the first second, and third battery packs 252, 254, 256 are charged in the same fashion as described in the second exemplary state of charge of arrangement described above. In other embodiments, once the first, second, and third battery packs 252, 254, 256 reach the predetermined threshold, the master battery pack 252 may cause charging of a single battery pack at a time until each battery pack reaches a full charge.

In some embodiments, a user may remove or insert battery packs as the battery packs are being charged. The charging system 200 remains uninterrupted (e.g., continues to charge the battery packs) during the removal or insertion of the battery pack. In some embodiments, the removal or insertion of the slave battery pack 254, 256, 258 may change the priority charging method depending on the state of charge of the slave battery pack 254, 256, 258 being removed or inserted. However, removal or insertion of a new master battery pack 252 (e.g., a battery pack with a lower identification number) may momentarily stop charging until the new master battery module 252 assumes control of the priority charging method.

It should be appreciated that while the predetermined threshold is described above as a state of charge above 81 percent, that the predetermined threshold may be any state of charge that is determined to be close to fully charged. For example, the predetermined threshold may include a state of charge in a range from 70 percent to 99 percent. In other embodiments, the range may be from 75 percent to 90 percent. In other embodiments the range may be from 80 percent to 85 percent.

Live to Drive

Figure 13:
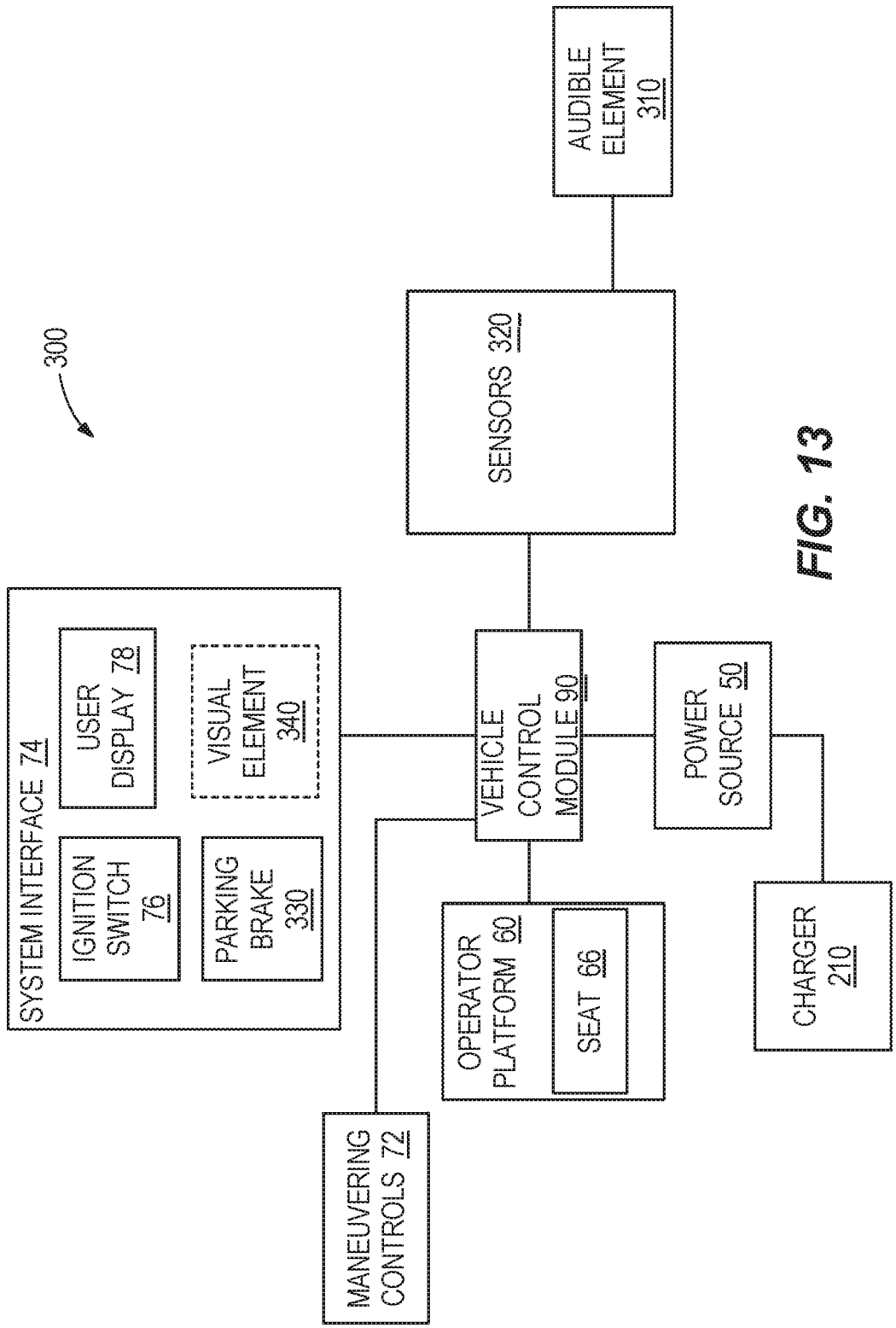
FIG. 13 is a schematic view of a live to drive alert system.

FIG. 13 illustrates a schematic view a live to drive system 300 of the lawn mower that provides a visual and/or an audible alert to the user when the lawn mower 10 is ready to be started or is in an operable state. Although described as alerting the user, it will be understood that the live to drive system 300 may also alert non-users around the lawn mower 10 or in the immediate vicinity of the lawn mower 10 that the lawn mower 10 as well. The live to drive system 300 includes the lawn mower 10 having the power source 50, the system interface 74, the maneuvering controls 72, the operator platform 60 having the seat 66, an audible element 310, a plurality of sensors 320, and the vehicle control module 90. The power source 50 may be the bank of battery packs 52, 54, 56, 58 and is charged by the charger configuration 210.

The system interface 74, the maneuvering controls 72, and the audible element 310 are positioned within an operator zone of the lawn mower 10 so they can be reached by, seen by, or heard by the user while operating the lawn mower 10. The system interface 74 includes the ignition 76 having an ignition switch, a parking brake 330 (which may be one of the above-mentioned control switches 79), and the user display 78. In the illustrated embodiment, the maneuvering controls 72 in the form of left and right control arms 72a, 72b. The parking brake may include a parking sensor that is configured to indicate to the vehicle control module 90 whether the parking brake is activated. For example, the parking brake sensor may be a push-button style switch that is actuated when the parking brake is activated, and that is de-actuated when the parking brake is deactivated.

In the illustrated embodiment, the user display 78 communicates with the vehicle control module 90 to provide the visual alert to the user. For example, an indicator may be displayed on the user display 78 to alert the user of the operational state of the lawn mower. The indicator may be a LED, a message (e.g., text, an icon indicator, etc.), etc. Additionally, or alternatively, the system interface 74 may include an additional visual element 340 (e.g., a flashing light supported by the frame, etc.) that communicates with the vehicle control module 90 to provide the visual alert to the user. It should be appreciated that the broken lines of the additional visual element 340 illustrates the optimality of the additional visual element 340.

The audible element 310 communicates with the vehicle control module 90 to provide an audible alert to the user of the lawn mower 10. The audible element 310 may, for example, be one or more of a speaker supported by the lawn mower and a headset used by the user. The headset may communicate with the vehicle control module through a short-range wireless communication protocol (e.g., BLUETOOTH), a wired connection etc. As a result, the audible alert may be provided to the user in through any combination of the speaker and the headset. While the audible element 310 is described as a speaker and a headset, it will be appreciated that the audible element 310 may be any element that can communicate with the vehicle control module 90 to provide an audible alert to the user.

The plurality of sensors 320 determines operational states with the system interface 74, the maneuvering controls 72, the operator platform 60, and the power source 50. The vehicle control module 90 communicates with the plurality of sensors 320 to determine whether the operational states determined by the plurality of sensors 320 satisfy a set of predetermined conditions. When the set of predetermined conditions is satisfied, the vehicle control module 90 communicates with the user display 78 and an audible element 310 to alert the user with the visual alert (e.g., on the user display) and an audible alert (e.g., from the audible element) that the lawn mower 10 is in an operable state. In some embodiments, the vehicle control module 90 may communicate the visual alert with the additional visual element 340.

Figure 14A:
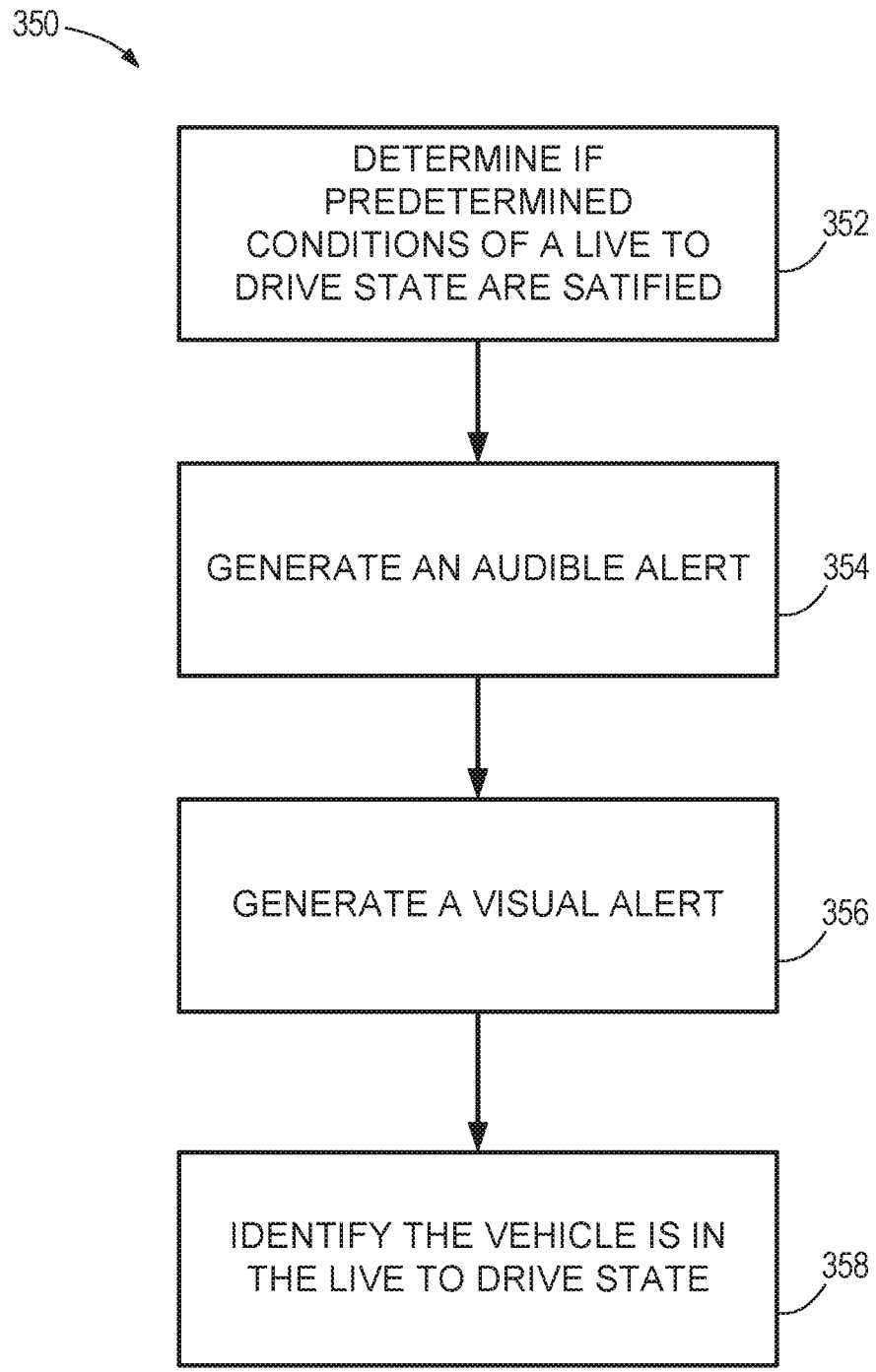
FIG. 14A is a flow chart illustrating a control logic of the live to drive alert system in the form of a method.

FIG. 14a illustrates the control logic of the live to drive system 300 in the form of a method 350. In step 352, the vehicle control module of the live to drive system 300 determines that a set of predetermined conditions of the live to drive state are satisfied. In response to the predetermined conditions of the live to drive state being satisfied, an audible alert is generated in step 354, and a visual alert is generated in step 356. Additionally, in step 358, based on determining that the set of predetermined conditions of the live to drive state are satisfied, the vehicle control module 90 identifies that the vehicle (e.g., the lawn mower 10) is in the live to drive state. When the vehicle is in the live to drive state, the vehicle can be moved by operation of the maneuver controls 72. Although steps 354, 356, and 358 are illustrated as occurring in series and in a particular order, in some embodiments, one or more of the steps 354, 356, and 358 are implemented in parallel, implemented in a different order than shown, or a combination thereof.

Figure 14B:
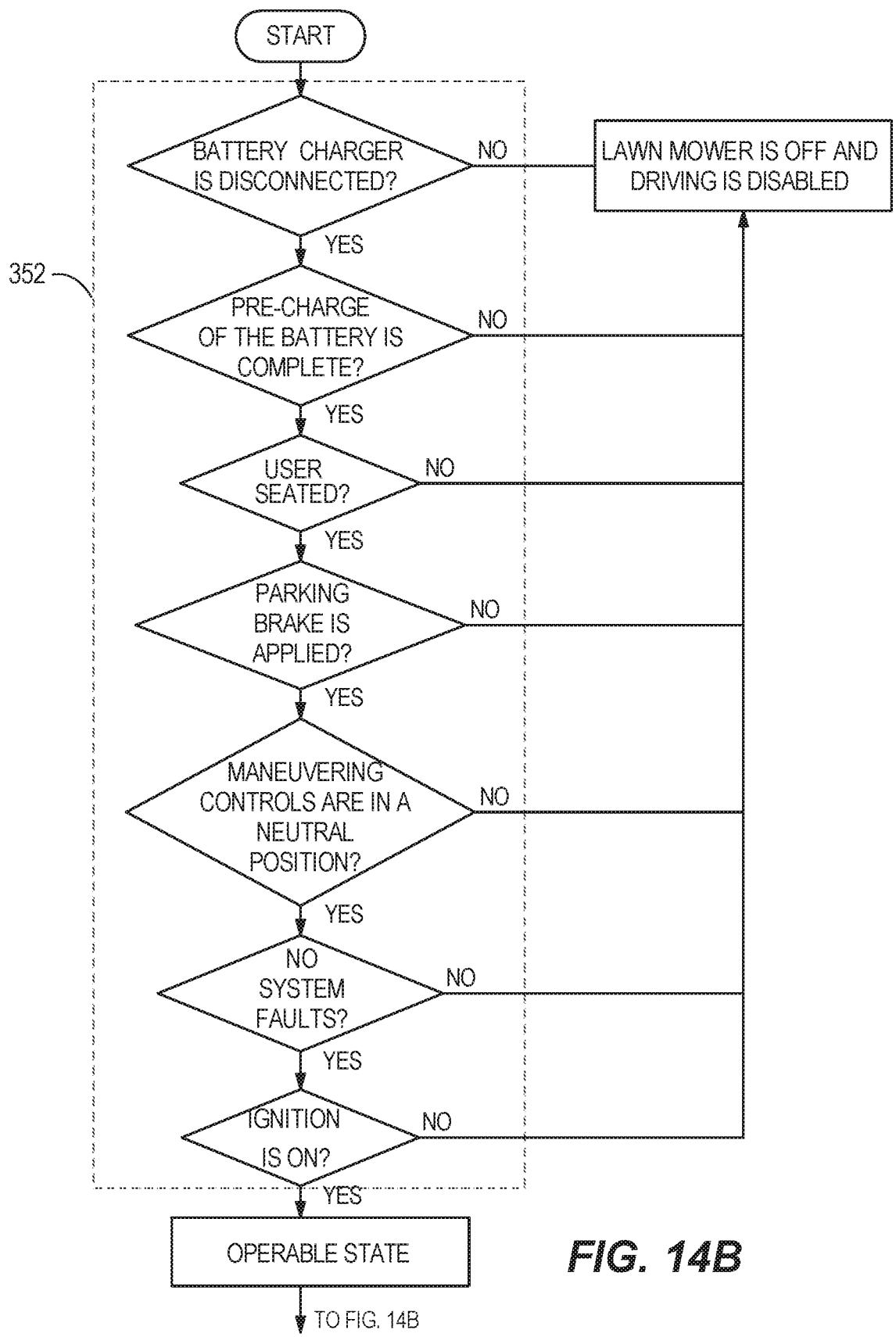
FIG. 14b is a flow chart illustrating aspects of the method of FIG. 14A.
Figure 14C:
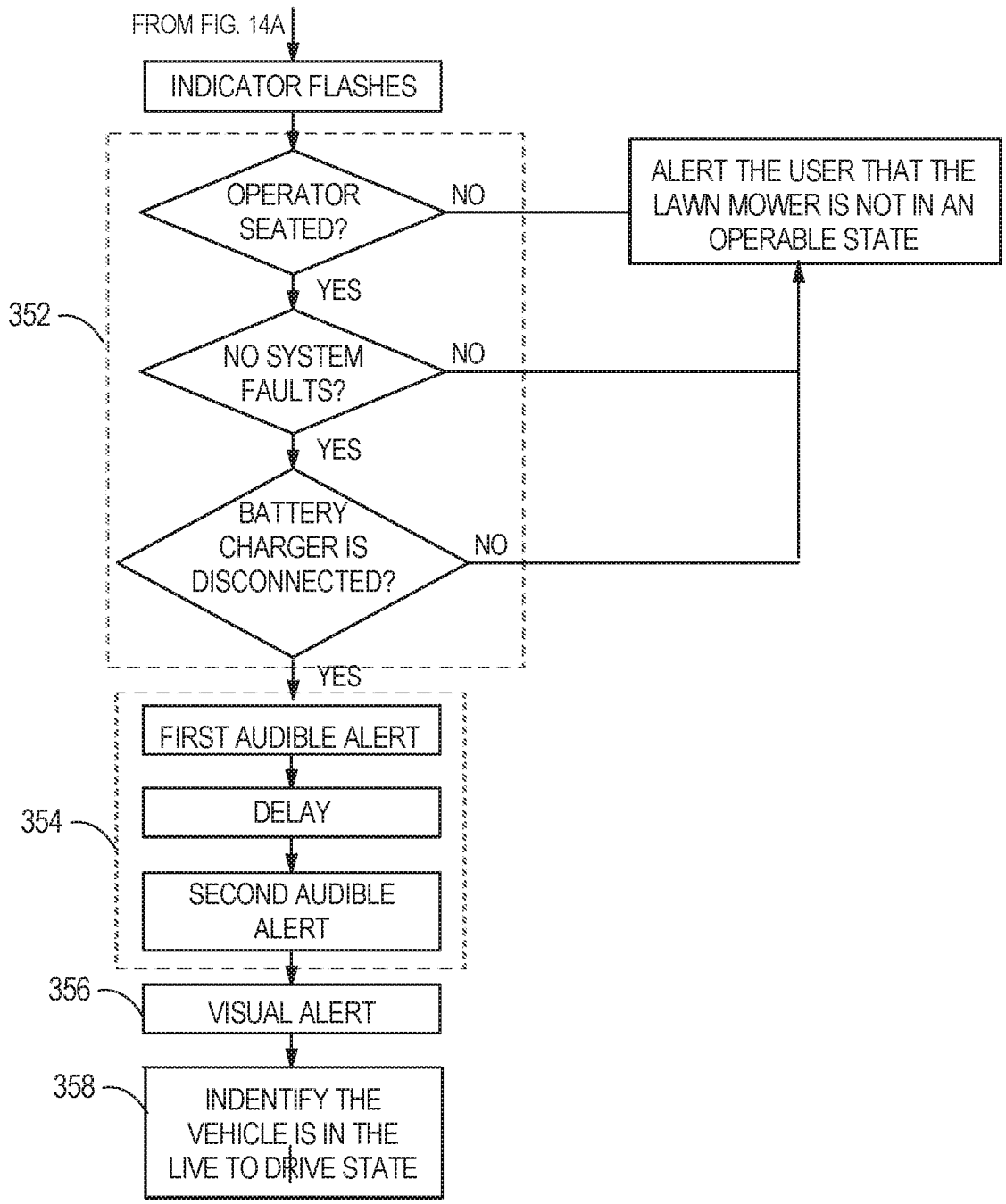
FIG. 14c is a flow chart illustrating aspects of the method of FIG. 14A.

FIGS. 14b and 14c illustrate aspects of the method 350 in further detail and includes additional steps implemented in some embodiments of the method. For example, FIGS. 14b and 14c illustrates an example of several of the determinations performed by the vehicle control module 90 to implement step 352 to determine Whether predetermined conditions are satisfied. For example, a first subset of the predetermined conditions determined by the vehicle control module 90 in step 352 include whether: (1) the charger configuration 210 is disconnected from the lawn mower 10, (2) a pre-charge of the power source 50 is complete, (3) the user is seated in the seat 66, (4) the parking brake 330 is applied, (5) the maneuvering controls 72 are in a neutral position, (6) there are no system faults, and (7) the ignition 76 is in an on position. While the following conditions are outlined in sequential order, it should be appreciated that the vehicle control module 90 may determine the above conditions in any order.

If any of the first subset of the predetermined conditions are not satisfied, the lawn mower 10 is off and driving is disabled (i.e., the lawn mower 10 is not in the live to drive state). As a result, the user display 78 is off and does not provide the visual alert to the user. In some embodiments, if the user attempts to drive the lawn mower (e.g., by adjusting the position of the maneuvering controls 72), the user display 78 may display a message relating to the reason the lawn mower 10 cannot be driven (e.g., parking brake is off, system fault occurred, etc.).

When the first subset of the predetermined conditions are satisfied, the vehicle control module 90, alerts the user that the lawn mower 10 is in an operable state. For example, the indicator on the user display 78 may flash (e.g., a flashing LED or message) that the lawn mower 10 is in the operable state, which is an intermediate state before reaching a live to drive state. In some embodiments, the indicator may flash at a rate of approximately 1 hertz. It should be appreciated that when the mower 10 is in the operable state, the power source 50 of the mower 10 is in electrical communication with the vehicle control module 90 and the drive controllers (e.g., of the deck and the drive motor 40, 45, etc.). However, further yet-to-be-satisfied predetermined conditions and safety features such as the parking brake 330, a power-take off switch (e.g., to control the deck motors 40) may restrict activation of the drive motors 45 or the deck motors 40.

Turning to FIG. 14c, the vehicle control module 90 may perform redundant system checks to determine whether a second subset of the predetermined conditions are satisfied, such as determining whether the user remained seated on the seat 66, the charger configuration 210 is disconnected from the lawn mower 10, and there are no system faults. If any of the second subset of the predetermined conditions are not satisfied, the user display 78 may alert the user of the error and that the lawn mower 10 is not in an operable state (e.g., the lawn mower 10 driving is disabled and is therefore not live to drive). In other embodiments, the user display 78 may turn off, which indicates the lawn mower is not in an operable state.

If all the second subset of the predetermined conditions of the redundant system check are satisfied, the vehicle control module 90 provides a series of alerts to the user. As noted, in step 354, the vehicle control module 90 controls the audible element 310 to provide an audible alert to the user. In FIG. 14c, an example of the audible alert of step 354 is provided. More particularly, in step 354 of FIG. 14c, the vehicle control module 90 controls the audible element 310 to provide a first audible alert to the user. Following the first audible alert, still in step 354, the vehicle control module 90 may provide a delay. In the illustrated embodiment, the delay is approximately one second. In other embodiments, the delay may be greater than or less than one second. After the delay, still in step 354, the audible element 310 provides a second audible alert to alert the user that the lawn mower is ready to be operated.

After the second audible alert, the user display 78 may provide the visual alert (in step 356). In the illustrated embodiment, the user display 78 displays a message saying the lawn mower is ready to be operated or is in the live to drive state. In step 358, as previously described with respect to FIG. 14a, the vehicle control module 90 identifies that the vehicle (e.g., the lawn mower 10) is in the live to drive state.

Once in the live to drive state, the vehicle control module 90 is configured to enable control of the deck motors 40 by the user (e.g., via the power-take off switch), the drive motors 45 (e.g., via disabling of the parking brake and operation of the maneuver controls 72) to drive a desired speed and direction, the headlights, and other features of the vehicle. In other words, the vehicle control module 90 is configured to cause the vehicle to enter the live to drive state and, thereby, to enable control of one or more of these noted features based on determining that the predetermined conditions are satisfied. In contrast, before the vehicle is in the live to drive state (before the predetermined conditions are satisfied), the vehicle control module 90 may prohibit control of the deck motors 40 and the drive motors 45, as well as other features (e.g., the headlights). For example, to prohibit control of these features, the vehicle control module 90 may effectively ignore signals received from the power take-off switch and maneuver controls 72, whereas, after entering the live to drive state, the vehicle control module 90 may receive such signals and send corresponding control signals to the deck motors 40 and drive motors 45 in response to signals received from the power take-off switch and maneuver controls 72.

In some embodiments, a sub-state of the live to drive state is a ready to drive state, which is entered by the vehicle after the parking brake 330 is disabled. For example, after providing the alerts in steps 354 and 356 and entering the live to drive state while in step 358, the parking brake 330 may still prevent driving of the vehicle via the drive motors 45 despite receiving signals from the maneuver controls 72 in response to user movement of the maneuver controls 72. Accordingly, while in the live to drive state, the vehicle control module 90 may determine that the parking brake 330 is disabled by the user and, in response, identify the vehicle as in the ready to drive state. In the ready to drive state, with the parking brake 330 disabled, the vehicle control module 90 controls the drive motors 45 in response to the maneuver controls 72 (i.e., to drive a desired speed and direction of rotation of the rear ground-engaging elements 35 to move and/or turn the lawn motor 10). In some embodiments, the parking brake 330 is a predetermined condition of step 352 that is determined to be satisfied before the vehicle control module 90 advances to steps 354, 356, and 358.

While the live to drive system 300 is described above as having two audible alerts and a delay. It should be appreciated that the live to drive system 300 may provide additional audible alerts or a continuous audible alert that is on until the user operates the lawn mower 10. Additionally, if the lawn mower 10 is in an operable state and the user is not operating the lawn mower 10 (e.g., the maneuvering controls 72 are in the neutral position), the vehicle control module 90 may alert the user after a predetermined time that the lawn mower 10 is still in the operable state. For example, this may occur when the user stops the mower 10 (e.g., to talk to someone, etc.) after operating the lawn mower 10.

Variable Speed Control System

Figure 15:
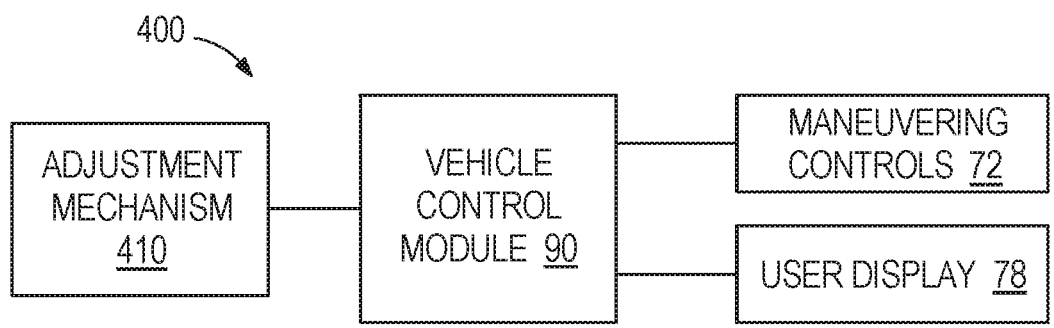
FIG. 15 is a schematic view of a variable speed control system.

Referring now to FIG. 15, the variable speed control system 400 includes the lawn mower 10 having an adjustment mechanism 410, the user display 78, the vehicle control module 90, and the maneuvering controls 72. Through the variable speed control system 400, maximum motor RPM is set in the motor controller for the right and left traction controller. This sets maximum vehicle speed based on the gear ratio for the mower. The vehicle control module (VCM) will send a percent speed to motor controller 505 (FIG. 18) based on the position of the maneuvering controls 72 (e.g., detected by maneuvering control sensors 510) and the allowable range of movement set in the form of a percentage (+100% to −100%) from left and right steering sensors. The communication between maneuvering control sensors 510 and the motor controller 505 is described in more detail below. The adjustment mechanism 410 (e.g., a dial or the like) communicates with the vehicle control module 90 and the maneuvering controls 72 to adjust the gain or correction factor applied to relative throttle percentage. In other words, depending on the setting of the adjustment mechanism 410, movement of the maneuvering controls 72 through an entire range of motion (e.g. +100 to −100©) will result in different speeds of the lawn mower 10, including a maximum speed of the lawn mower 10.

Figure 16:
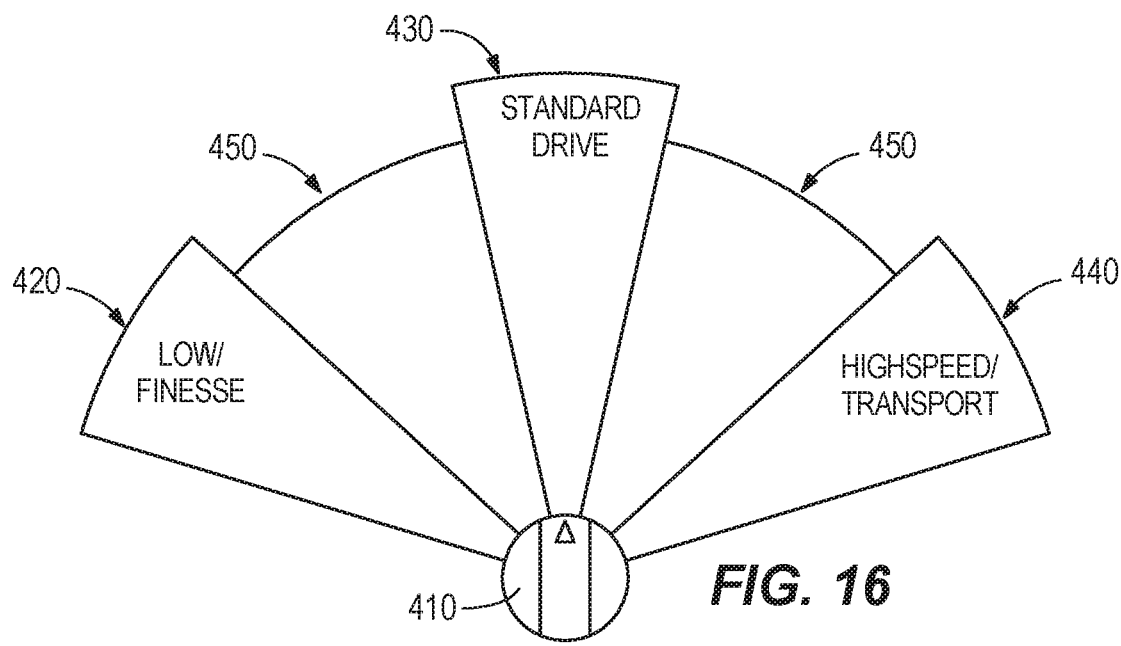
FIG. 16 is a schematic view of an adjustment mechanism of the variable speed control system of FIG. 15.

Referring to FIG. 16, in the illustrated embodiment, the adjustment mechanism 410 is an analog mechanism in the form of a button or dial switch. The adjustment mechanism 410 may be positioned within the operator zone (e.g., proximate the operator seat 66 and within reach of the seated operator) to allow the user to access the adjustment mechanism. In an exemplary embodiment, the adjust mechanism 410 is positioned on or integrated within the maneuvering controls 72 (e.g., operable with the user's thumb or fingers or by twisting a handle of the maneuvering controls 72). As a result, during operation of the lawn mower 10, the user may easily access the adjustment mechanism 410 without removing their hands from the maneuvering controls 72. This allows the user to safely switch between the different selections.

The adjustment mechanism 410 is movable between a plurality of positions to allow the maximum speed of the lawn mower 10 to be variably adjusted to define an adjusted maximum speed. In a first exemplary embodiment, the adjustment mechanism 410 may include three positions such as a low maximum speed mode 420, a standard maximum speed mode 430 (e.g., referred to as standard operation), and a high maximum speed mode 440. For example, the adjustment mechanism 410 may move between detents that define fixed positions of the adjustment mechanism 410 related to the low, standard, or high maximum speed modes 420, 430, 440. In this embodiment, the adjusted maximum speed of the lawn mower 10 is fixed to three preset adjusted maximum speed modes.

In a second exemplary embodiment, the adjustment mechanism 410 may be variably moved between to any position from the low maximum speed mode 420 and the high maximum speed mode 440 (e.g., as the user turns the dial, the maximum speed setting goes up and down as a function of the amount the dial is rotated). In some constructions, the adjustment mechanism 410 may not include the preset adjusted maximum speed modes. In other constructions, the adjustment mechanism 410 may include detents (defining the fixed positions of the adjustment mechanism 410), similar to the first embodiment. As a result, the adjustment mechanism 410 may be positioned within any of the three preset adjusted maximum speed modes or moved within a variable speed zones 450 (e.g., between the detents that define the preset adjusted maximum speed modes) to select the adjusted maximum speed. As a result, the user is able to variably control the maximum speed of the lawn mower 10.

Figure 17A:
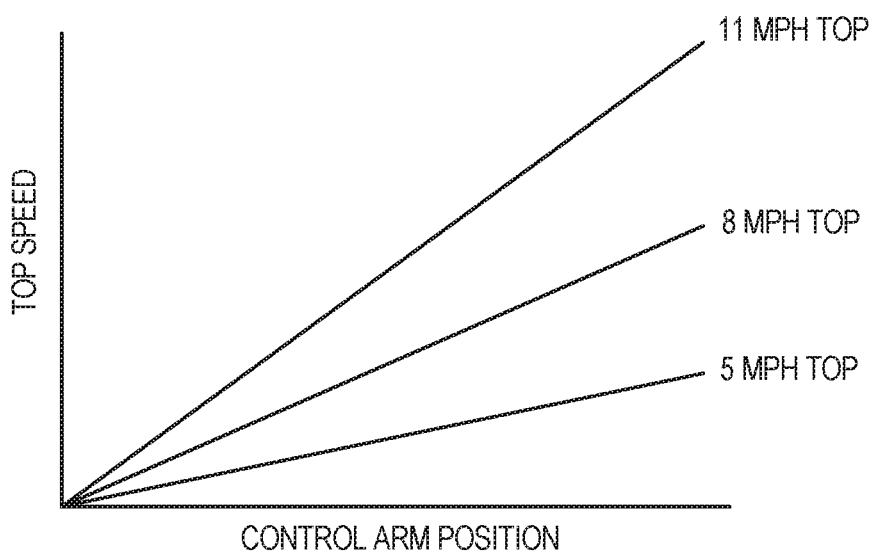
FIG. 17A is a graph illustrating the relationship between an adjusted maximum speed and maneuver controls of the lawn mower.

Referring to FIG. 17A, when the user selects the adjusted maximum speed, the vehicle control module 90 communicates with the maneuvering controls 72 to adjust the sensitivity of the maneuvering controls 72 in response to the adjusted maximum speed. Adjusting the sensitivity of the maneuvering controls 72 is defined as proportionally adjusting the speed the maneuvering controls 72 control the drive wheels 35 in response to the adjustment mechanism 410. For example, when the adjustment mechanism 410 is adjusted to define the adjusted maximum speed, the maneuvering controls 72 have the same range of motion as standard operation. However, movement of the maneuvering controls 72 in the adjusted maximum speed results in a lower or higher overall speed of the lawn mower 10 compared to the same movement of the maneuvering controls 72 during standard operation of the lawn mower 10. When the adjusted maximum speed is lower than standard operation, the user gains greater control of the lawn mower 10 during precise maneuver.

The vehicle control module 90 may communicate with the user display 78 to provide a visual alert to the user relating to the adjusted maximum speed. For example, the visual alert may be a message or indicator displaying the adjusted maximum speed mode of the lawn mower 10 or a variable indicator (e.g., a bar, dial, etc. that corresponds position of adjustment mechanism).

In an exemplary embodiment, the lawn mower 10 is a zero turn lawn mower having maneuvering controls 72 in the form of left and right control arms 72a, 72b that are operably coupled to left and right drive wheels 35 (as described above with reference to FIG. 1-4). The user of the lawn mower 10 controls the speed and direction of the lawn mower by moving the left and right control arms 72a, 72b forward. The further the user pushes the left and right control arms 72a, 72b forward, the faster the drive wheels 35 turn.

In one non-limiting example, the standard operation maximum speed (i.e., the left and right control arms 72a, 72b pushed fully forward) is eight miles per hour. When the user operates the mower in a precise maneuver (e.g., mowing around a tree or along a curved border), the user may use the adjustment mechanism 410 to set the maximum speed to the desired adjusted maximum speed. The adjusted maximum speed, for example may be five miles per hour. As a result, the vehicle control module 90 communicates with the left and right control arms 72a, 72b so when the control arms 72a, 72b are pushed halfway forward, the mower 10 travels at a speed of 2.5 miles per hour (half of the desired maximum speed). Alternatively, the mower 10 may travel at a speed that is non-linear as a function of the position of the control arms 72a, 72b, For example, the speed may increase more rapidly as the control arms 72a, 72b approach the end of their range of motion. The variable speed control system 400 therefore gives the user more precise control of the lawn mower 10 via manipulation of the control arms 72a, 72b during the precise maneuvers. Alternatively, the user may set the adjusted maximum speed to eleven miles per hour (e.g., the highest speed the lawn mower 10 may travel). In some instants, the user may be traveling substantially straight for a long distance or traveling without the deck motors 40 activated. As a result, the user may increase the adjusted maximum speed relative to standard operation.

Figure 17B:
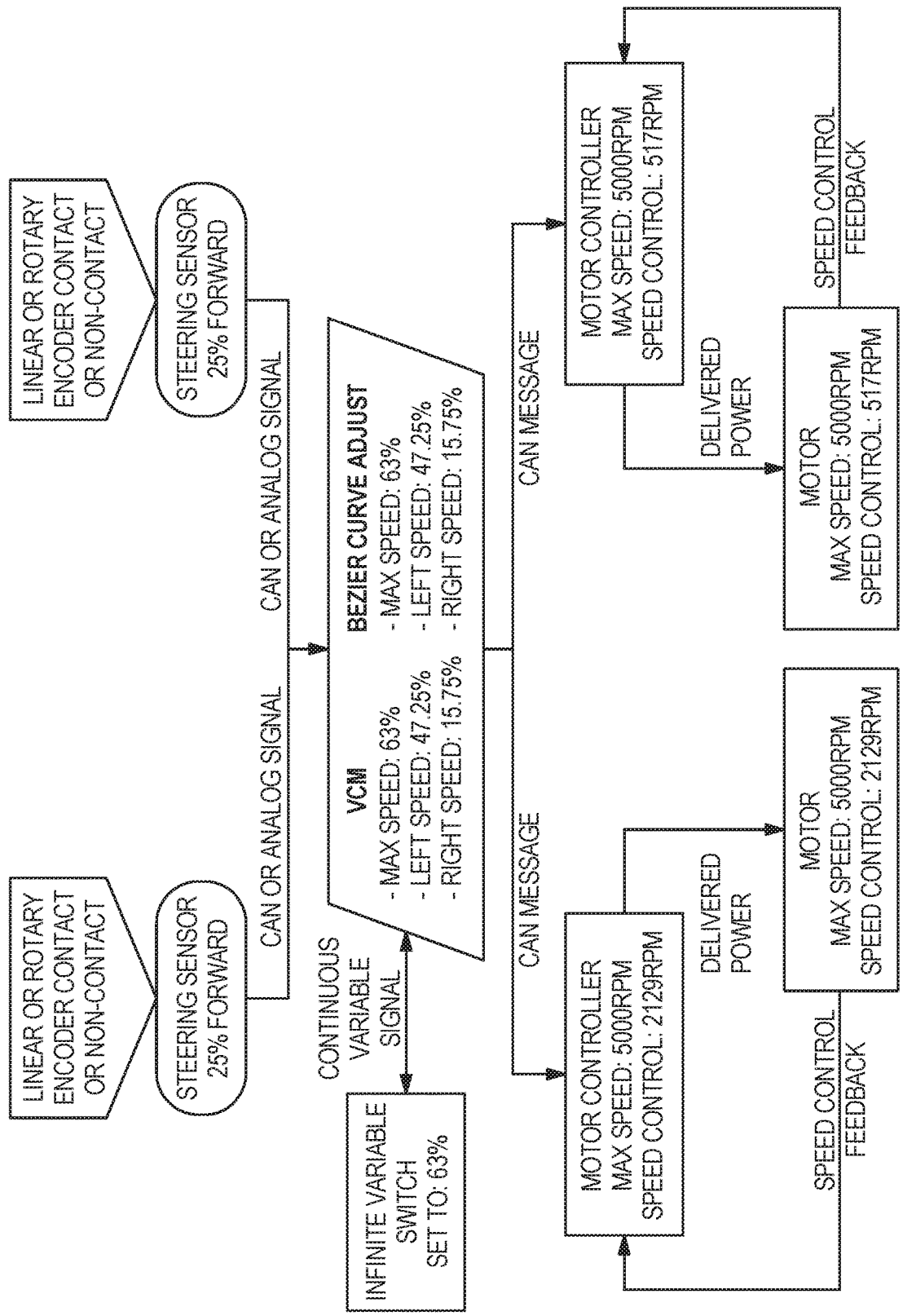
FIG. 17B is illustrates an exemplary operation flow diagram for an embodiment of the variable speed control system.

FIG. 17B illustrates an exemplary operation flow diagram for an embodiment of the variable speed control system 400. To maximize operator control, a larger range of the maneuvering controls 72 movement is desired to provide the user with significantly more adjustment in variable speed based on maneuvering controls 72 position. In an effort to keep maneuvering controls 72 movement similar at any operational speed range the invention provides a continuously variable input speed compensation factor that would allow for maximum maneuvering controls 72 movement at lower speeds. The arm positions are still covering the maximum range and the steering sensors read from −100% to 100% and transmit this data to the vehicle control module 90. A correction factor based on an analog or digital signal is received by the vehicle control module 90 and is applied to the relative throttle percentage transmitted by the steering sensor. This calculated value is the new maximum speed that goes into the developed Bezier curve adjustment equation. The purpose of the Bezier curve adjustment equation is to make the throttle acceleration feel smoother throughout the operational range. This final calculated adjustment is then transmitted to the traction controllers. The traction controllers have predefined maximum RPM to which the modified percent throttle is applied setting maximum traction motor RPM. The motor control then creates and delivers power for the electric motor and has feedback on motor speed through hall effect sensors to ensure the desired RPM is met.

Power Distribution

Figure 18:
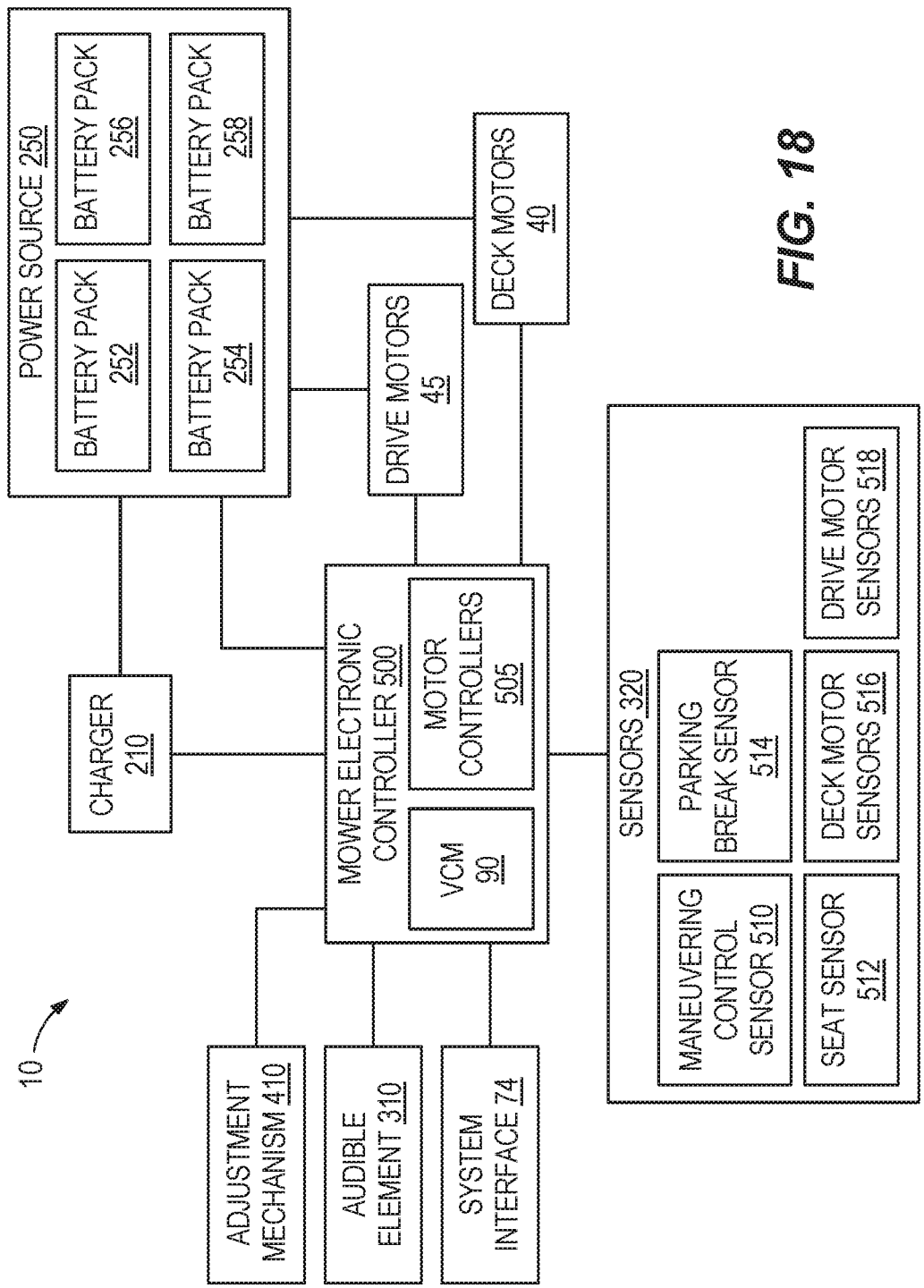
FIG. 18 is a block diagram of the lawn mower.

FIG. 18 illustrates a block diagram of the lawn mower 10, according to some embodiments. The mower 10 includes a mower electronic controller 500 including the vehicle control module 90 and motor controllers 505. The mower electronic controller 500 is in communication with the previously described deck motors 40, drive motors 45, system interface 74, charger configuration 210, power source 250 (including battery packs 252, 254, 256, 258), the audible element 310, the sensors 320, and the adjustment mechanism 410. In some embodiments, the mower electronic controller 500 includes an electronic processor and a memory storing instructions executed by the electronic processor to implement the functionality of the vehicle control module 90 and motor controllers 505 discussed herein. In other embodiments, the mower electronic controller 500 includes a distributed processing system with a plurality of electronic processors and memories to implement the functionality. For example, with reference to FIG. 19, in some embodiments the vehicle control module 90 includes an electronic processor 506 and a memory 507 and each of the motor controllers 505 includes a respective electronic processor and memory, with each memory storing instructions executed by the associated electronic processor to implement the functionality of the respective device described herein. Although the power source 250 is illustrated with four battery packs 252, 254, 256, 258, as previously described, these battery packs may be selectively inserted and removed from the mower such that, in some instances, only one, two, or three battery packs are coupled to the mower 10. Additionally, in some embodiments, the power source 250 includes fewer or more than four battery pack connection points (docking stations 122) such that the maximum number of battery packs that may be coupled to the mower may be more or fewer than four.

With reference again to FIG. 18, the sensors 320 include a maneuvering control sensor 510, a seat sensor 512, a parking brake sensor 514, deck motor sensors 516, and drive motor sensors 518. In some embodiments, additional sensors are also provided. The maneuvering control sensor 510 includes one or more sensors that are configured to sense and provide to the mower electronic controller 500 an indication of a position of the maneuvering controls 72. For example, the maneuvering control sensor 510 may include a rotary encoder, a Hall sensor, a potentiometer, or the like, positioned near the pivot joint 73a, 73b of each maneuvering control arm 72a, 72b to indicate an angle of each respective maneuvering control arm 72a, 72h to the mower electronic controller 500. As one example, the signal from each sensor of the maneuvering control sensor 510 may indicate to the mower electronic controller 500 the angular position of the respective maneuvering control arm 72a, 72b within the range between full reverse and full forward position (e.g., between −100% to +100%) in various increments (e.g., 0.5%, 1%, or 5%), In some embodiments, the angular position is indicated in another encoding, such as described in further detail with respect to FIGS. 42A-42C.

The seat sensor 512 is configured to indicate to the mower electronic controller 500 whether an operator is in the seat 66. For example, the seat sensor 512 may be a push-button style switch that is actuated when a weight above a threshold amount is on the seat 66 (e.g., providing a signal to the mower electronic controller 500) and that is de-actuated when a weight less than the threshold amount is on the seat 66 (e.g., providing no signal to the mower electronic controller 500). The parking brake sensor 514 is configured to indicate to the mower electronic controller 500 whether the parking brake is activated. For example, the parking brake sensor 514 may be a push-button style switch that is actuated when the parking brake is activated, and that is de-actuated when the parking brake is deactivated. In some embodiments, other sensors types are used to implement one or both of the seat sensor 512 and the parking brake sensor 514.

The drive motor sensors 518 include one or more sensors to sense characteristics of an associated one of the drive motors 45. For example, and with reference to FIG. 19, the drive motor sensors 518 may include a current sensor 520 and speed sensor 522 for each drive motor 45. Similarly, the deck motor sensors 516 include one or more sensors to sense characteristics of an associated one of the deck motors 40. For example, and with reference to FIG. 19, the deck motor sensors 516 may include a current sensor 524 and speed sensor 526 for each deck motor 40. The speed sensors 522 and 526 may be, for example, a rotary encoder, a Hall sensor configured to detect passing rotor magnets of the respective motors, or another sensor type.

Figure 19:
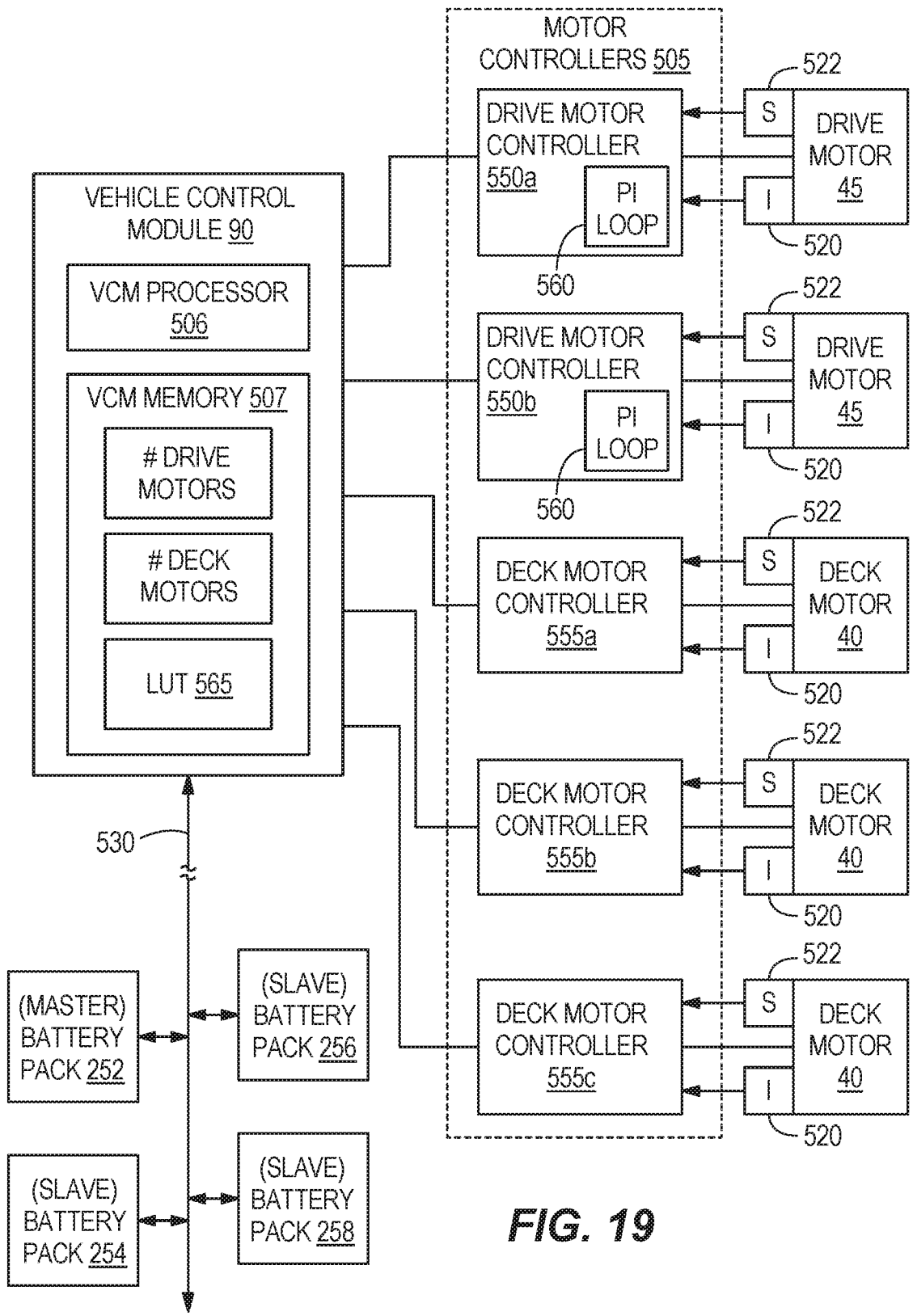
FIG. 19 is a block diagram of a control module of the lawn mower in communication with motor controllers and battery packs.

With continued reference to FIG. 19, the vehicle control module 90 and motor controllers 505 of the mower electronic controller 500 are illustrated in further detail. The vehicle control module 90 is coupled to the one or more battery packs 252, 254, 256, and 258 coupled to the mower 10 via a communication bus 530. The communication bus 530 may be a CAN bus, or another communication bus, and may be part of the bus bar 131. The communication bus 530 also enables communication among the coupled battery packs 252, 254, 256, and 258. As discussed above, one of the battery packs 252, 254, 256, and 258 is selected as a master battery pack, while the other battery packs are slave battery packs (see, e.g., FIG. 12). For example, this selection may be performed in response to the addition or removal of a battery pack, and the battery pack having a lowest identifier number may be the battery pack selected as the master battery pack. For purposes of discussion, we will assume battery pack 252 is selected as the master battery pack but, as noted, in other scenarios one of the other battery packs 254, 256, or 258 may be the master battery pack.

The motor controllers 505 include a drive motor controller 550a, a drive motor controller 550b, a deck motor controller 555a, a deck motor controller 555b, and a deck motor controller 555c. Each drive motor controller 550a and 550b is associated with a respective drive motor 45. Each deck motor controller 555a, 555b, and 555c is associated with a respective deck motor 40. The drive motor controllers 550a, 550b may also be referred to collectively as the drive motor controllers 550 and generically as the drive motor controller 550. The deck motor controllers 555a, 555b may also be referred to collectively as the deck motor controllers 555 and generically as the deck motor controller 555. In some embodiments, one or more of the drive motor controllers 550 and deck motor controllers 555 are combined into a single motor controller, such that the ratio of motor controllers to motors is less than one-to-one.

Each of the drive motor controllers 550 and the deck motor controllers 555 includes a respective electronic processor and a memory storing instructions that, when executed by the respective electronic processor, implement the functionality of the respective motor controllers described herein.

The drive motor controllers 550 are configured to receive a reference command from the vehicle control module 90 and, in response, control their respective drive motor 45 in accordance with the command. The reference command may indicate a desired speed, such as rotations per minute (RPM) or a percentage of a maximum speed (e.g., that is stored on a memory of the respective motor controller 550). In some embodiments, the reference command is an enable signal that causes the drive motor controller 550 to control the drive motor 45 (e.g., at a predetermined speed) or a disable signal that causes the drive motor controller 550 to control the drive motor 45 to stop. In some embodiments, the drive motor controllers 550 each include a proportional integral (PI) control loop 560. The PI control loop 560 may be, for example, implemented in software instructions stored on the memory and executed by the processor of each of the drive motor controllers 550. The PI control loop 560 is described in further detail with respect to FIGS. 23-25.

Similarly, the deck motor controllers 555 are configured to receive a reference command from the vehicle control module 90 and, in response, control their respective deck motor 40 in accordance with the command. The reference command may indicate a desired speed, such as rotations per minute (RPM) or a percentage of a maximum speed (e.g., that is stored on a memory of the respective motor controller 555). In some embodiments, the reference command is an enable signal that causes the deck motor controller 555 to control the deck motor 40 (e.g., at a predetermined speed) or a disable signal that causes the deck motor controller 555 to control the deck motor 40 to stop.

Figure 21:
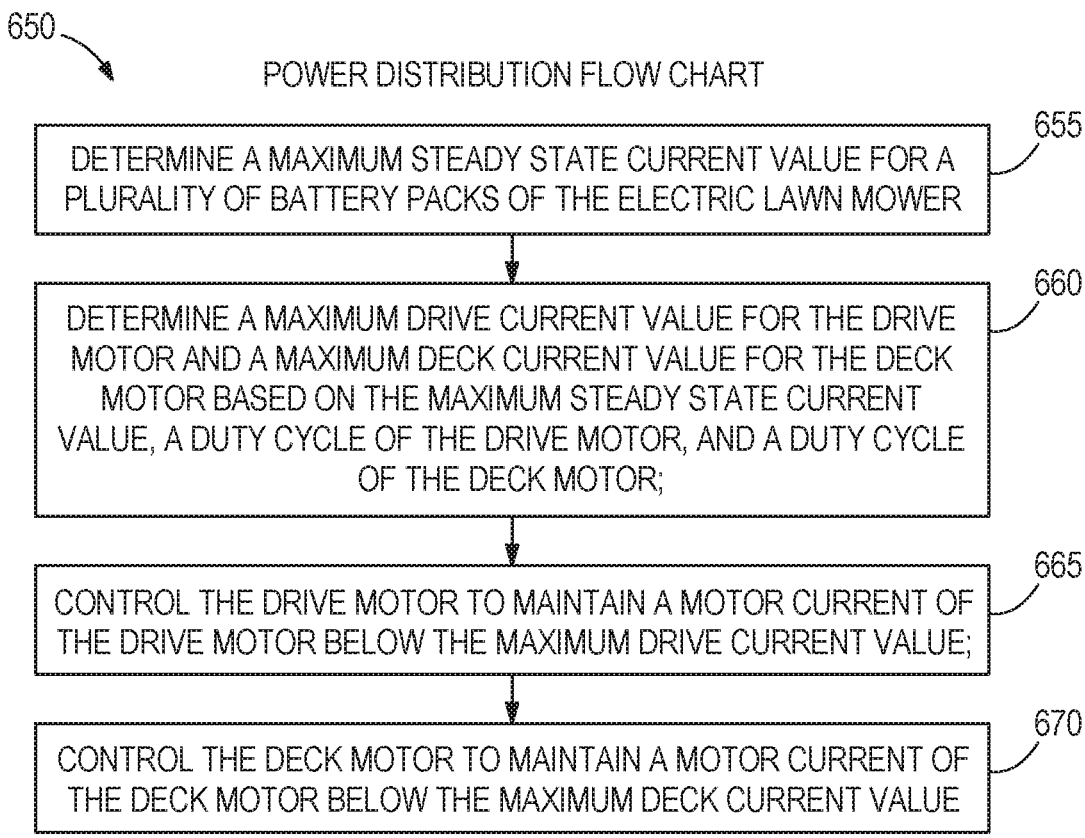
FIG. 21 is a flow chart of power distribution method for the battery packs of the lawn mower.

In some embodiments, the vehicle control module 90 is also configured to determine and communication maximum current levels for the deck motors 40 and drive motors 45, as described in further detail with respect to FIG. 21. To determine the maximum current levels, the vehicle control module 90 uses a lookup table 565 and a total number of deck motors 40 and drive motors 45, which may be known and stored within the memory 507.

Figure 20A:
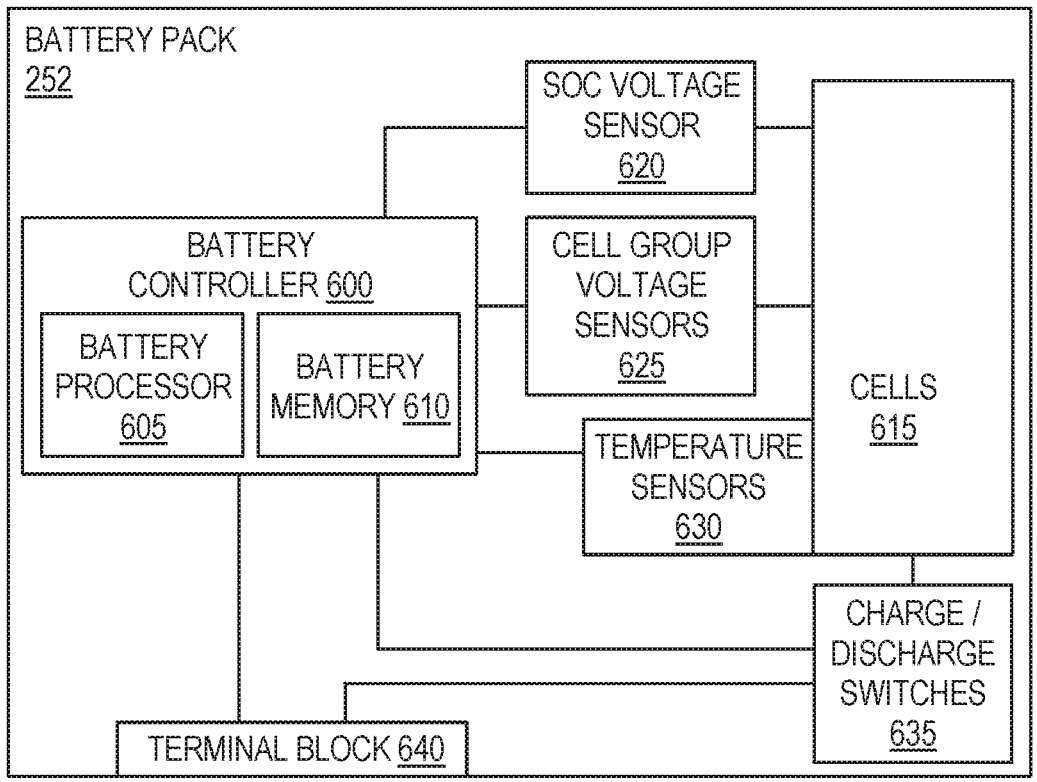
FIG. 20A is a block diagram of a battery pack.
Figure 20B:
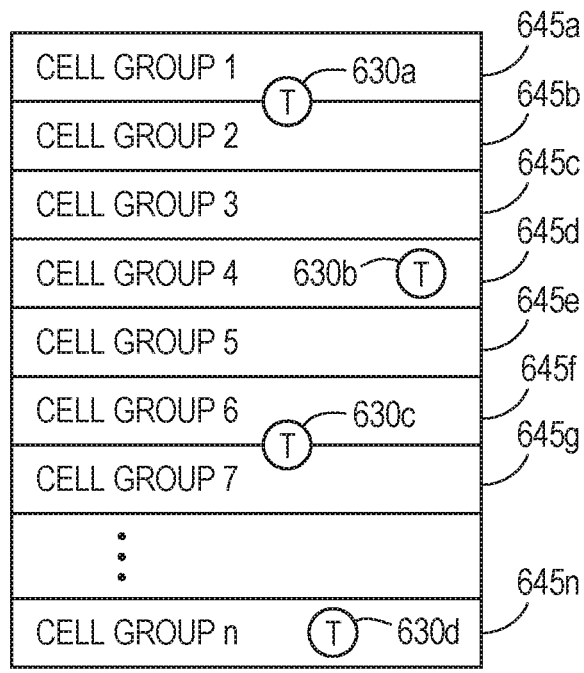
FIG. 20B is a schematic view of cells of the battery pack of FIG. 20A.

FIGS. 20A and 20B illustrate an embodiment of the battery pack 252 in further detail. Although described with respect to the battery pack 252, the illustration and description similarly applies to the battery packs 254, 256, and 258 (and to other battery packs described within the application). The battery pack 252 includes a battery controller 600 including a battery electronic processor 605 and battery memory 610. The battery pack 252 further includes battery cells 615, a state-of-charge (SOC) voltage sensor 620, cell group voltage sensors 625, temperature sensors 630, charge-discharge switches 635, and a terminal block 640.

The battery memory 610 stores instructions that, when executed by the battery electronic processor 605, implement the functionality of the battery controller 600 described herein. The SOC voltage sensor 620 is configured to measure the voltage across the cells 615 (e.g., at a positive and negative terminal point for the entire set of the cells 615) and to provide the voltage measurement to the battery controller 600, which is indicative of the state of charge of the cells 615 (and, thus, of the battery pack 252). The cell group voltage sensors 625 include a plurality of voltage sensors that each are configured to measure the voltage across a cell group of parallelly connected cells. For example, with reference to FIG. 20B, the cells 615 may be separated into groups of parallelly connected cells 645a-n, where the groups are then connected in series. The cell group voltage sensors 625 may include a voltage sensor for each group of parallelly connected cells 645a-n such that a voltage measurement is provided to the battery controller 600 for each of the groups of parallelly connected cells 645*a-n*.

Returning to FIG. 20A, the temperature sensors 630 include one or more temperature sensors arranged about the cells 615 to provide internal temperature measurements of the battery pack 252 to the battery controller 600. For example, with reference again to FIG. 20B, the temperature sensors 630 include temperature sensors 630*a*, 630*b*, 630*c*, and 630*d* positioned at different locations among the cells 615 to provide multiple internal temperature measurements of the battery pack 252.

Returning to FIG. 20A, the terminal block 640 includes the electrical connectors for the battery pack 252, including the female contacts 168 (see FIG. 11), which includes terminals for communication over the communication bus 630 (see FIG. 19), for providing discharge power from the cells 615, and for receiving charging power for the cells 615.

FIG. 21 illustrates a flow chart for a power distribution method 650 according to some embodiments. Although the method 650 is described with respect to the mower 10 as shown herein, the method 650 may also be implemented on other mowers (e.g., having more or fewer drive motors, more or fewer deck motors, and more or fewer battery packs) or on other electric vehicles.

In block 655, the mower electronic controller 500 determines a maximum steady state current value for the battery packs of the power source 250. For example, to determine the maximum steady state current value, the vehicle control module 90 of the mower electronic controller 500 may receive the maximum steady state current value from the master battery pack 252 of the power source 250. In some embodiments, each of the battery packs 252, 254, 256, and 258 is configured to calculate its own maximum steady state current value and communicate this calculated value on the communication bus 530. The master battery pack 252, in turn, is configured to sum these calculated maximum steady state current values received from the other packs 254, 256, and 258 along with the maximum steady state current value that the master battery pack 252 calculated for itself. The sum of these calculated values may be provided by the master battery pack 252 to the vehicle control module 90 as the maximum steady state current value for the battery packs of the power source 250.

With reference to FIGS. 20A and 20B, the battery controller 600 of each battery pack 252, 254, 256, and 258 is configured to calculate its own maximum steady state current value based on one or more of a minimum cell voltage, a state of charge of the pack, and an internal temperature of the pack. For example, the battery controller 600, of each pack, is configured to detect the voltage levels of each of the cell groups of the cells 615 and determine a minimum cell voltage from these detected levels (e.g., the lowest sensed voltage level from the cell group voltage sensors 625). Additionally, the battery controller 600 is configured to determine a pack state of charge from the SOC voltage sensor 620, and to determine an internal temperature of the battery pack from the temperature sensors 630 (for example, the maximum or average detected temperature from the temperature sensors 630 may be used as the internal temperature).

The battery controller 600 may use the minimum cell voltage, state of charge, and internal temperature for the pack in one or more lookup tables and state machines (of the battery controller 600) to determine the maximum steady state current value for the pack.

As one example, when the minimum cell voltage of the pack is above a voltage threshold, the state of charge is above a charge threshold, and the internal pack temperature is below a temperature threshold, the battery controller 600 may output a default maximum steady state current value ($I_{max\_default}$). However, the battery controller 600 may output a reduced maximum steady state current value (e.g., 50%, 60%, 75% of $I_{max\_default}$) if any of the following occur: (i) the minimum cell voltage of the pack drops below the voltage threshold, (ii) the state of charge drops below a charge threshold, or (iii) the internal pack temperature rises above a temperature threshold. Each characteristic may have multiple thresholds to cause the maximum steady state current value to be successively reduced or increased as the thresholds are crossed.

Figure 22:
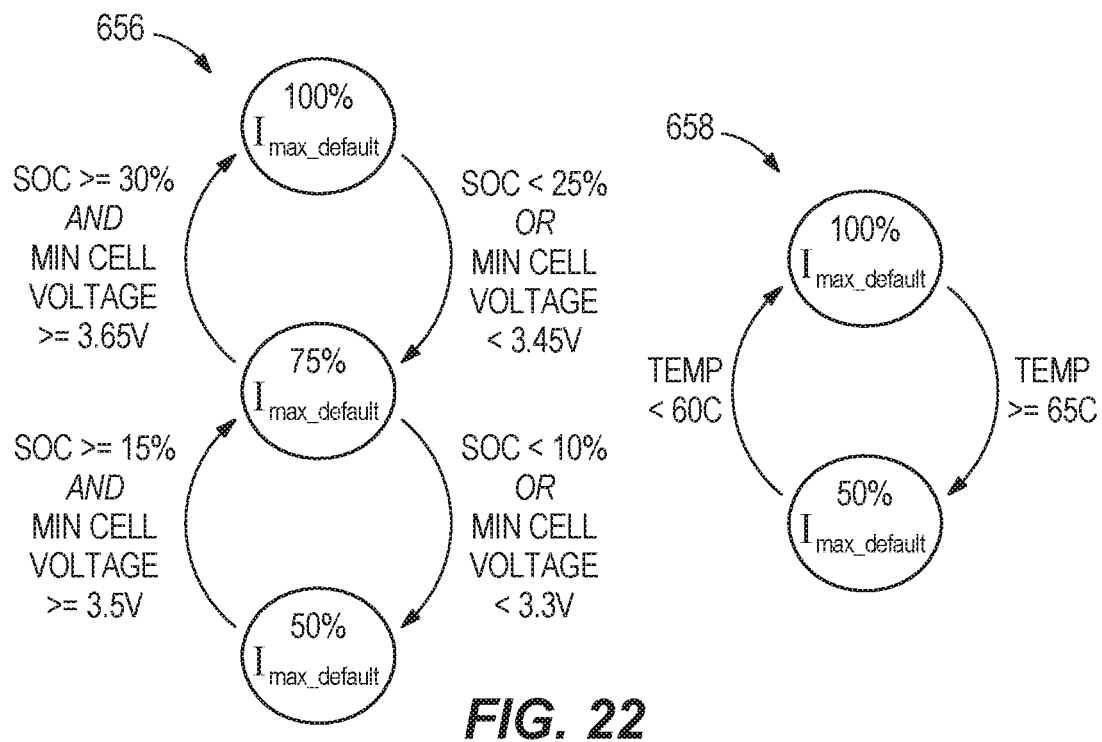
FIG. 22 illustrate current state diagrams that are executed by a battery controller of the lawn mower.

FIG. 22 illustrates two state diagrams that may be implemented by the battery controller 600 to determine a maximum steady state current value ($I_{max}$). A first state diagram 656 relates the minimum cell voltage and state of charge to the maximum steady state current value ($I_{max\_default}$), while the second state diagram 658 relates the internal pack temperature to the maximum steady state current value ($I_{max\_default}$). The diagrams may be independently executed by the battery controller 600, with the lower of the two calculated $I_{max}$ values being selected as the maximum steady state current value for the battery pack. With reference to the first state diagram 656, when the state of charge is at or greater than 30% of a maximum state of charge, and the minimum cell voltage is at or greater than 3.65 volts (V), $I_{max}$ is set to the maximum value (100% of $I_{max\_default}$), However, Imax is set to 75% of $I_{max\_default}$ if either of the following conditions are met: (i) the state of charge drops below 25% or (ii) the minimum cell voltage drops below 3.45 V. However, if the internal pack temperature increases above 65 degrees Celsius, Imax is set to 50% of $I_{max\_default}$, as the lower value of the two diagrams is selected (i.e., 50% from diagram 658 is lower than 75% from diagram 656). The various thresholds for moving between states are illustrated in FIG. 22. These thresholds are merely examples of thresholds, and the actual thresholds may be greater than or less than those shown. Additionally, the $I_{max}$ value for each state is an example value and the actual values for $I_{max}$ may be greater than or less than those shown. Furthermore, in some embodiments, additional states (each with one or more respective thresholds for entering and exiting the state) are provided to increase the granularity of the changes to the maximum steady state current value.

As can be seen from the above discussion, generally, the battery controller 600 reduces the maximum steady state current value for the pack based on one or more of the following: (i) the minimum cell voltage of the respective battery pack being below a voltage threshold, (ii) the pack state of charge of the respective battery pack being below a charge threshold, and (iii) the internal pack temperature of the respective battery pack being above a temperature threshold. Similarly, generally, the battery controller 600 increases the maximum steady state current value for the pack based on one or more of the following: (i) the minimum cell voltage of the respective battery pack being above a voltage threshold, (ii) the pack state of charge of the respective battery pack being above a charge threshold, and (iii) the internal pack temperature of the respective battery pack being below a temperature threshold.

Returning to the flow chart 650 of FIG. 21, in block 660, the mower electronic controller 500 determines a maximum drive current value for one or more of the drive motors 45 and a maximum deck current value for one or more of the deck motors 40 based on the maximum steady state current value. For example, in some embodiments, the mower electronic controller 500 calculates a maximum aggregate drive motor current for the one or more drive motors 45 and a maximum aggregate deck motor current for the one or more deck motors 40 based on the maximum steady state current value using the lookup table 565 (FIG. 19) that maps the maximum steady state current value from the master battery pack 252 to the maximum aggregate drive motor current and the maximum aggregate deck motor current. In general, the sum of the maximum aggregate drive motor current and the maximum aggregate deck motor current equals or approximately equals the maximum steady state current value received from the master battery pack 252. Also, in some embodiments, the maximum aggregate deck motor current is assigned a value that is greater than a value assigned to the maximum aggregate drive motor current. In some embodiments, the maximum aggregate deck motor current is approximately 55-60% of the maximum steady state current value, while the maximum aggregate drive current is 40-45% of the maximum steady state current value.

In some embodiments, the mower electronic controller 500 divides the maximum aggregate drive motor current by a total number of the plurality of drive motors (e.g., by two, in the mower 10 that is illustrated) to determine the maximum drive current value for each of the one or more drive motors 45.

In some embodiments, the mower electronic controller 500 divides the maximum aggregate deck motor current by a total number of the plurality of deck motors (e.g., by three, in the mower 10 that is illustrated) to determine the maximum deck current value for each of the one or more deck motors 40.

In some embodiments, the vehicle control module 90 of the mower electronic controller 500 performs the calculation of the maximum aggregate drive motor current, the maximum aggregate deck motor current, the maximum drive current value for each of the one or more drive motors 45, and the maximum deck current value for each of the one or more deck motors 40. In some embodiments, the vehicle control module 90 provides the determined maximum drive current value for each of the one or more drive motors 45 to each of the drive motor controllers 550 and provides the determined maximum deck current value for each of the one or more deck motors 40 to each of the deck motor controllers 555.

In block 665, the mower electronic controller 500 controls the one or more drive motors 45 to maintain a respective motor current of the one or more drive motors 45 below the maximum drive current value. For example, each of the drive motor controllers 550 may determine motor current for a respective one of the drive motors 45 from respective current sensors 520. When one of the drive motor controllers 550 determines that the motor current for a drive motor 45 reaches the maximum drive current value, the drive motor controller 550 provides control signals to reduce the current of the drive motor 45. For example, to reduce the current of the drive motor 45, the drive motor controller 550 may reduce the duty cycle of a pulse width modulated (PWM) control signal being provided to the drive motor 45.

In block 670, the mower electronic controller 500 controls the one or more deck motors 40 to maintain a respective motor current of the one or more deck motors 40 below the maximum drive current value. For example, each of the deck motor controllers 555 may determine motor current for a respective one of the deck motors 40 from respective current sensors 524. When one of the deck motor controllers 555 determines that the motor current for a deck motor 40 reaches the maximum drive current value, the deck motor controller 555 provides control signals to reduce the current of the deck motor 40. For example, to reduce the current of the deck motor 40, the deck motor controller 555 may reduce the duty cycle of a pulse width modulated (PWM) control signal being provided to the deck motor 40.

In some embodiments, each deck motor 40 and drive motor 45 may be a brushless motor with a permanent magnet rotor and with stator coils selective energized with power from the power source 250 (i.e., the battery packs) by a switch bridge. The switch bridge may include one or more power switching elements, such as field effect transistors (FETs), that are selectively activated and deactivated by PWM signals provided by the associated motor controller 550 or 555. By increasing the duty cycle of the PWM signals, the stator coils are energized for longer periods, generally increasing the current drawn by the motor, the motor torque, and/or the motor speed. By decreasing the duty cycle of the PWM signals, the stator coils are energized for shorter periods, generally decreasing the current drawn by the motor, the motor torque, and/or the motor speed. In some embodiments, one or more of the deck motors 40 and drive motors 45 are brushed motors, which may also be controlled based on a PWM signal (from the motor controller 550 or 555) driving a power switching element connected in series with each respective brushed motor.

In some embodiments, the deck motor 40 and the drive motor 45 may also operate as generators and provide regenerative current back to the power source 250 (i.e., to charge one or more of the battery packs 252, 254, 256, and 258). For example, to brake the deck motor 40 or the drive motor 45, the one or more power switching elements may be selectively activated and deactivated such that induced current in the stator coils of the motors 40 and 45 caused by the rotating rotor magnets of the motor 40 or motor 45 is directed back towards the power source 250. In such examples, the maximum drive current value and maximum deck current value may be used by the respective deck and drive motor controllers 555, 550 to limit the regenerative current provided back to the power source 250. For example, to limit the regenerative current provided back to the power source 250, the deck and drive motor controllers 555, 550 may respectively reduce the PWM duty cycle for the power switching elements when regenerative current from the one or more of the motors 40, 45 reaches their respective maximum current values. Accordingly, in some embodiments, in addition to or instead of steps 665 and 670, one or more of the drive motor controllers 550 is configured to provide regenerative current from the respective drive motors 45 to the power source 250 while maintaining the regenerative current below the maximum drive current value, and one or more of the deck motor controller 555 is configured to provide regenerative current from the respective deck motors 40 to the power source 250 while maintaining the regenerative current below the maximum deck current value.

In some embodiments, a maximum deck charge current and maximum drive charge current value are determined separately from the maximum drive current value and maximum deck current value. In these embodiments, the maximum deck charge current and maximum drive charge current value are used to limit the regenerative current, rather than using the maximum drive and deck current values to limit the regenerative current. In these embodiments, a similar process as indicated in steps 655 and 660 may be used to determine the maximum deck and drive charge current values. For example, the vehicle control module 90 may determine a maximum steady state charge current value using a similar process as in step 655, where the vehicle control module 90 receives the maximum steady state charge current value from the master battery pack 252 of the power source 250. Further, the vehicle control module 90 may determine the maximum deck and drive charge current values based on the maximum steady state charge current value, using a similar apportionment scheme as described with respect to step 660.

PI Control Loop

Figure 23:
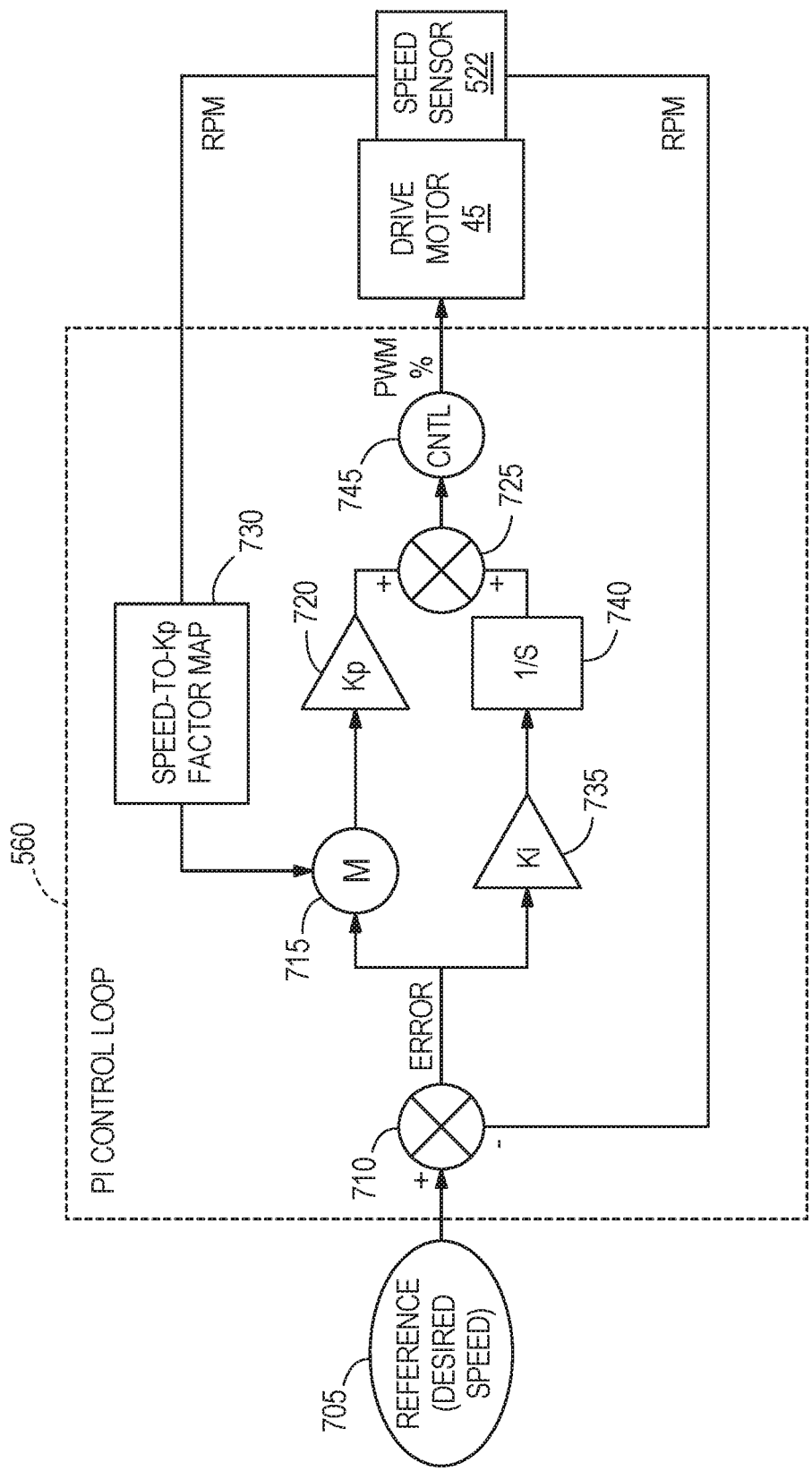
FIG. 23 illustrates a proportional integral control loop of a mower electronic controller.
Figure 24:
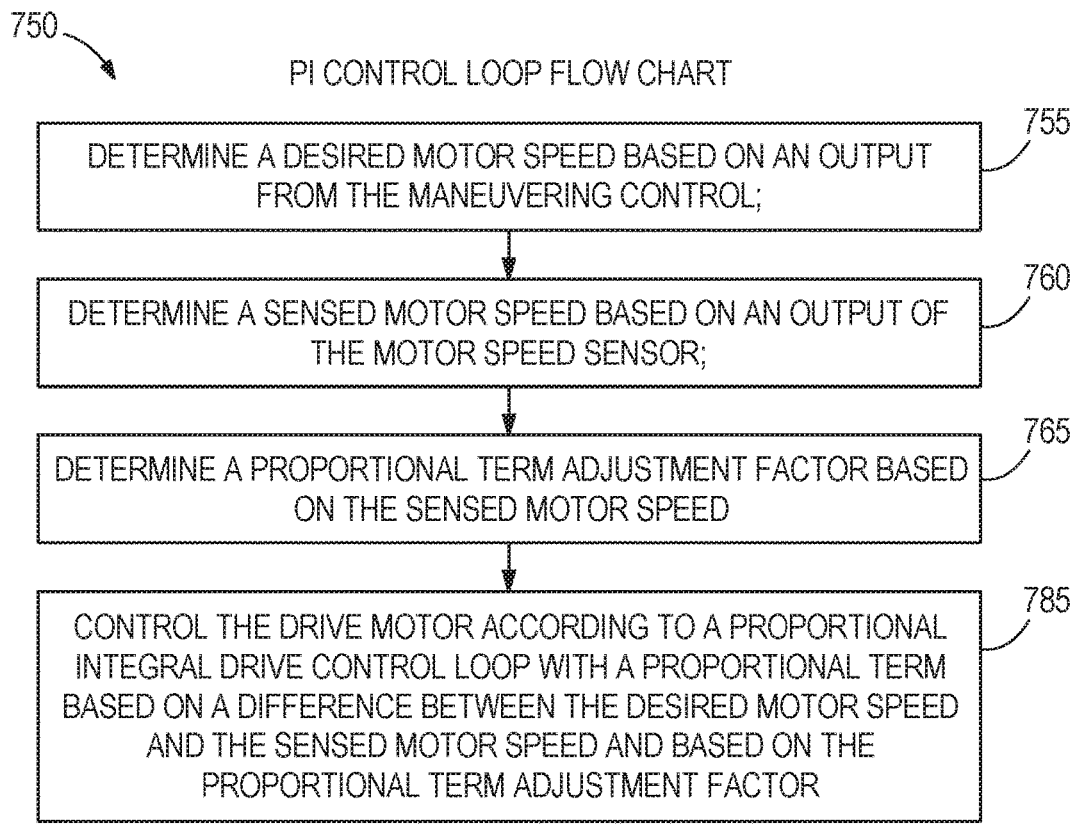

FIG. 23 illustrates the proportional integral (PI) control loop 560 of the mower electronic controller 500 and, more particularly, of the drive motor controllers 550, according to some embodiments. At least in some embodiments, the PT control loop 560 creates a highly responsive driving experience in the mower 10 that provides smoother operation of the mower 10 through its entire operating speed range using an adjustable proportional factor that varies based on drive speed of the mower 10. The PI control loop 560 results in low speed operation that is agile and responsive, allowing for easy maneuvering of the mower decks around obstacles, and results in high-speed control with smooth adjustments in maneuvers without spasmodic operation.

With reference to FIG. 23, the PI control loop 560 includes an error detector 710 that receives a desired speed value as a reference input 705 and a sensed speed value from the speed sensors 522 as a feedback input. The error detector 710 determines a difference between the reference input 705 and the feedback input (e.g., by subtracting the feedback input from the reference input 705), and outputs an error signal indicative of the difference. The error signal is then provided to a proportional term branch of the PI control loop 560 and to an integral term branch of the PI control loop 560. The proportional term branch includes a variable proportional multiplier 715 and proportional coefficient (Kp) 720. The variable proportional multiplier 715 multiplies the error signal by a proportional term adjustment factor (Kp factor) and provides the output (an intermediate proportional term) to the proportional coefficient Kp 720. The intermediate proportional term is multiplied by the proportional coefficient Kp 720 to adjust the value on the proportional term branch further, and the resulting output is provided to a summation block 725. The proportional term branch further includes a speed-to-Kp factor map 730 that receives the sensed speed value from the speed sensors 522. The map 730 maps the sensed speed value to a Kp factor 720 and provides the Kp factor 720 to the variable proportional multiplier 715.

The integral term branch includes an integral coefficient Ki 735. The error signal is multiplied by the integral coefficient Ki 735 and the resulting output is provided to the integrator 740. The integrator 740 integrates the output from the integral coefficient Ki 735, and the resulting output is provided to the summation block 725. The summation block 725 sums the outputs from the proportional term branch and the integral term branch and provides the sum to the control block 745. The control block 745 translates the output to a PWM duty cycle value and provides the PWM duty cycle value to the drive motor 45 to control the drive motor 45. The drive motor 45 may then be controlled in accordance with the PWM duty cycle value as previously described.

Although the values illustrated in the PI control loop 560 are labeled, such as with RPM, PWM, the actual values may be encoded version of such values and not have the particular units noted or shown. For example, the RPM speed sensor signal may be an analog signal between 0-5 volts that is proportional to an RPM value or may be a digitized version of the analog signal (e.g., in a 16-bit binary format).

FIG. 4 illustrates a flow chart for a PI control loop method 750 according to some embodiments. Although the method 750 is described with respect to the mower 10 as shown herein, the method 750 may also be implemented on other mowers (e.g., having more or fewer drive motors, more or fewer deck motors, and more or fewer battery packs) or on other electric vehicles. Further, for purposes of explanation, the method 750 will be described with respect to the (left) maneuvering control arm 72a, the drive motor controller 550a, and the (left) drive motor 45 associated with the drive motor controller 550a and (left) maneuvering control arm 72a, However, the method 750 is similarly applicable to the (right) maneuvering control arm 72b, the drive motor controller 550b, and the (right) drive motor 45 associated with the drive motor controller 550b and (right) maneuvering control arm 72b. That is, the method 750 may be executed independently to control the drive motor 45 on the left side of the mower 10 (the left drive motor 45) and to control the drive motor 45 on the right side of the mower 10 (the right drive motor 45).

In block 755, the mower electronic controller 500 determines a desired motor speed based on an output from the maneuvering control sensor 510. For example, as previously described, the maneuvering control sensor 510 may sense the angle of the associated maneuvering control arm 72a and provide an output to the mower electronic controller 500 indicative of the sensed angle. In some embodiments, the vehicle control module 90 may in turn translate the sensed angle to a desired motor speed (e.g., the desired motor speed 705 of FIG. 23) for the left drive motor 45. For example, the vehicle control module 90 may include a lookup table that maps each sensed angle to a desired motor speed. The vehicle control module 90 may then provide the desired motor speed to the drive motor controller 550a for the left drive motor 45. In some embodiments, the output from the maneuvering control arm 72a is provided directly to the drive motor controller 550a and translated to a desired motor speed locally by the drive motor controller 550a, rather than by way of the vehicle control module 90. Ultimately, the desired motor speed is provided to the PI control loop 560 of the drive motor controller 550a.

In block 760, the mower electronic controller 500 determines a sensed motor speed based on an output from the speed sensor 522 indicative of the motor speed of the left drive motor 45. For example, as previously described, the speed sensor 522 may be, for example, a rotary encoder, a Hall sensor configured to detect passing rotor magnets of the respective motors, or another sensor type. For example, in some embodiments, the speed sensor 522 outputs an analog or digital signal indicative of the rotations per minute (RPMs) of the left drive motor 45. The sensed motor speed is provided to the PI control loop 560 of the drive motor controller 550a.

In block 765, the mower electronic controller 500 determines a proportional term adjustment factor based on the sensed motor speed. For example, with reference to FIG. 23, the PI control loop 560 of the mower electronic controller 500 includes a speed-to-Kp factor map 730 that receives the sensed motor speed as an input and outputs the proportional term adjustment factor. The map 730 may include a lookup table at maps the sensed motor speed to an associated proportional term adjustment factor.

Figure 25:
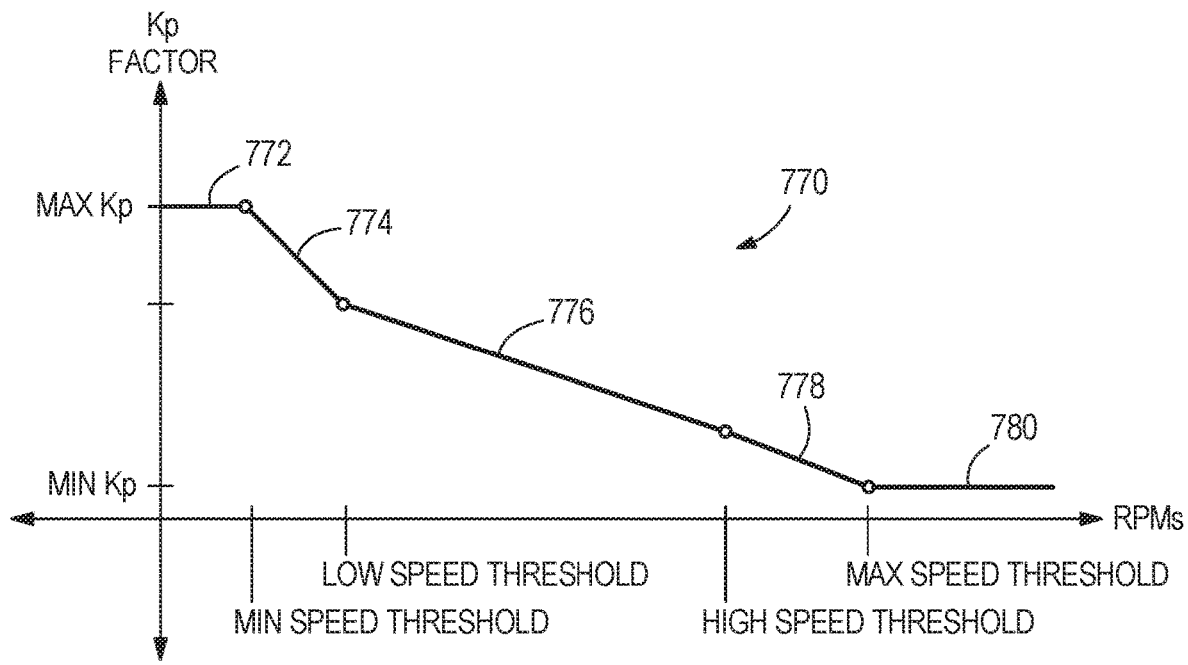
FIG. 25 is a graph illustrating a proportional coefficient of the control loop compared to the rotations per minute of a drive motor of the mower.
Figure 26:
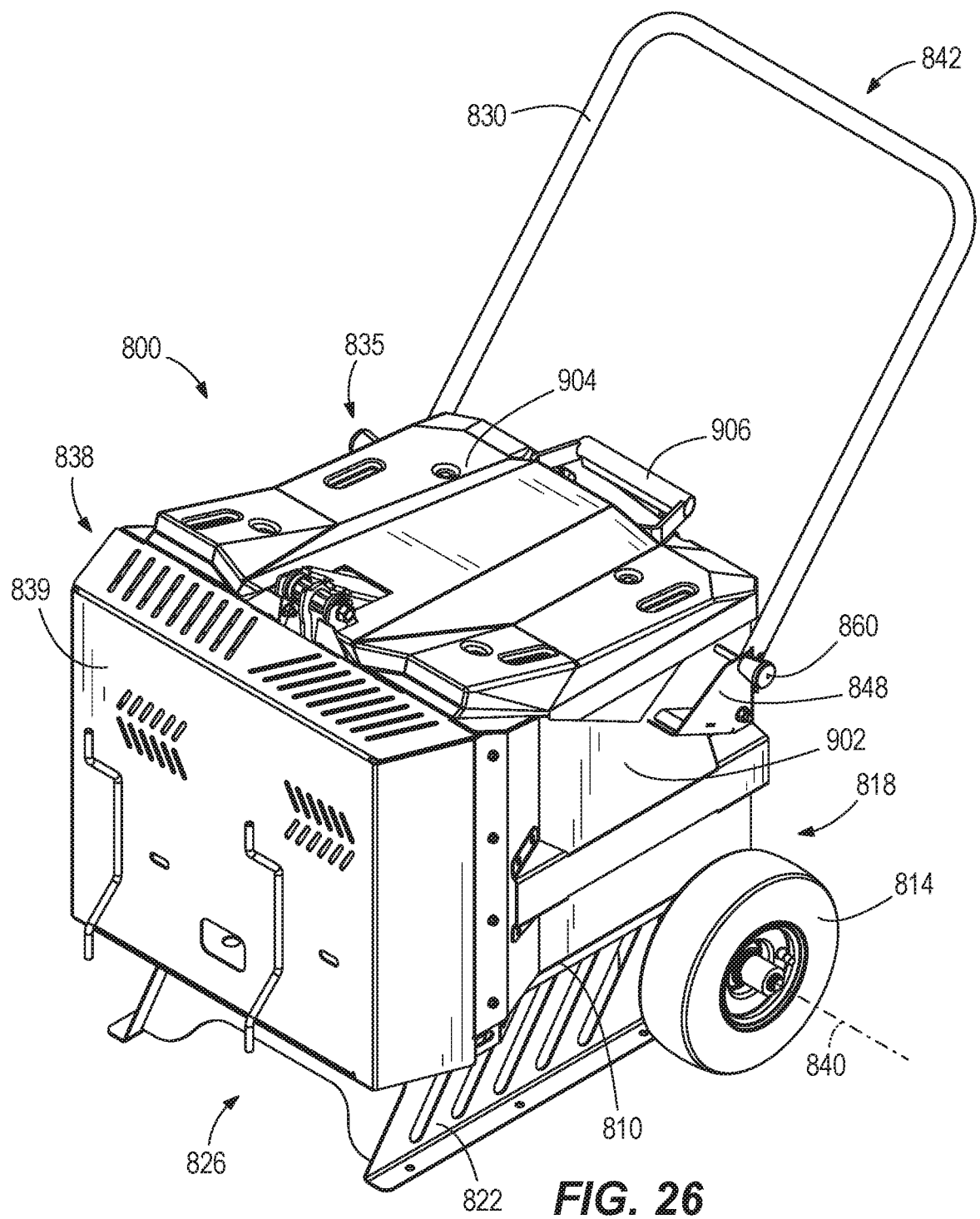
FIG. 26 is a perspective view of an off-board charger.

FIG. 25 illustrates a graph 770 of an example mapping that may be implemented by the map 730. The graph 770 illustrates that the mapping includes several regions including a maximum Kp region 772, a high Kp region 774, a linear region 776, a low KP region 778, and a minimum Kp region 780. When the speed sensor signal indicates that the motor speed is below a minimum speed threshold, the motor 45 is in the maximum Kp region 772 and the map 730 outputs a maximum Kp value. When the speed sensor signal indicates that the motor speed is between a minimum speed threshold and a low speed threshold, the motor 45 is in the high Kp region 774 and the map 730 outputs a Kp value according to a first linear relationship. When the speed sensor signal indicates that the motor speed is between a low speed threshold and a high speed threshold, the motor 45 is in the a linear region 776 and the map 730 outputs a Kp value according to a second linear relationship. When the speed sensor signal indicates that the motor speed is between a high speed threshold and a maximum speed threshold, the motor 45 is in the a linear region 776 and the map 730 outputs a Kp value according to a third linear relationship. Generally, the first linear relationship has a slope that is greater than a slope of the third linear relationship (in terms of absolute value), and the third linear relationship has a slope that is greater than a slope of the second linear relationship (in terms of absolute value). When the speed sensor signal indicates that the motor speed is above a maximum speed threshold, the map 730 is in the minimum Kp region 780 and outputs a minimum Kp value. The graph 770 is an example mapping of sped to Kp factors. In some embodiments, the thresholds and slopes of the regions 772-780 vary. In some embodiments, additional regions with additional associated thresholds and slopes are provided in the map 730.

Returning to FIG. 24, in block 785, the mower electronic controller 500 controls the drive motor 45 according to a proportional integral drive control loop having a proportional term and an integral term, wherein the proportional term is determined based on a difference between the desired motor speed and the sensed motor speed and based on the proportional term adjustment factor. For example, and with reference to FIG. 23, the PI control loop 560 sends a control signal (a PWM duty cycle value) from the control block 745 to the drive motor 45, where the control signal is generated according to the proportional term generated from the proportional term branch of the PI control loop 560 and the integral term is generated according to the integral term branch of the PI control loop 560. Further, the proportional term is determined based on the difference between the desired motor speed (reference desired speed 705) and the sensed motor speed (from speed sensor 522) and based on the proportional term adjustment factor (Kp factor) from the map 730. Additional details and description for generating the control signal by the PI control loop 560 are provided above with respect to FIG. 23.

Additionally, as noted, the method 750 may be executed by the mower electronic controller 500 independently for each drive motor 45 of the mower 10. Accordingly, the left drive motor 45 may be controlled by the mower electronic controller 500 by the PI control loop 560 of the drive motor controller 550a simultaneously with the right drive motor 45 being controlled by the mower electronic controller 500 by the PI control loop 560 of the drive motor controller 550b.

Off-Board Charger

FIGS. 26-32 illustrates an off-board charger 800. The off-board charger 800 includes a frame 810, a pair of ground engaging members 814 that support a first end 818 of the frame 810 relative to a ground surface 820 (FIG. 27), a resting support 822 that supports a second end 826 of the frame 810 above the ground surface 820, and a handle 830 supported by the frame 810. The off-board charger further defines a battery compartment 834 that is supported by the frame 810 and a charger compartment 838 that is supported by the frame 810 and positioned adjacent the battery compartment 834. The charger compartment 838 includes a cover 839. In the illustrated embodiment, the pair of ground engaging members 814 are wheels that rotate about an axis 840. The resting support 822 is coupled to the frame 810 and extends from the first end 818 of the off-board charger 800 to the second end 826. When the off-board charger 800 is in a resting position, the ground engaging members 814 and the resting support 822 engage the ground surface 820 to support the frame 810 of the off-board charger 800 relative to the ground surface 820.

Figure 27:
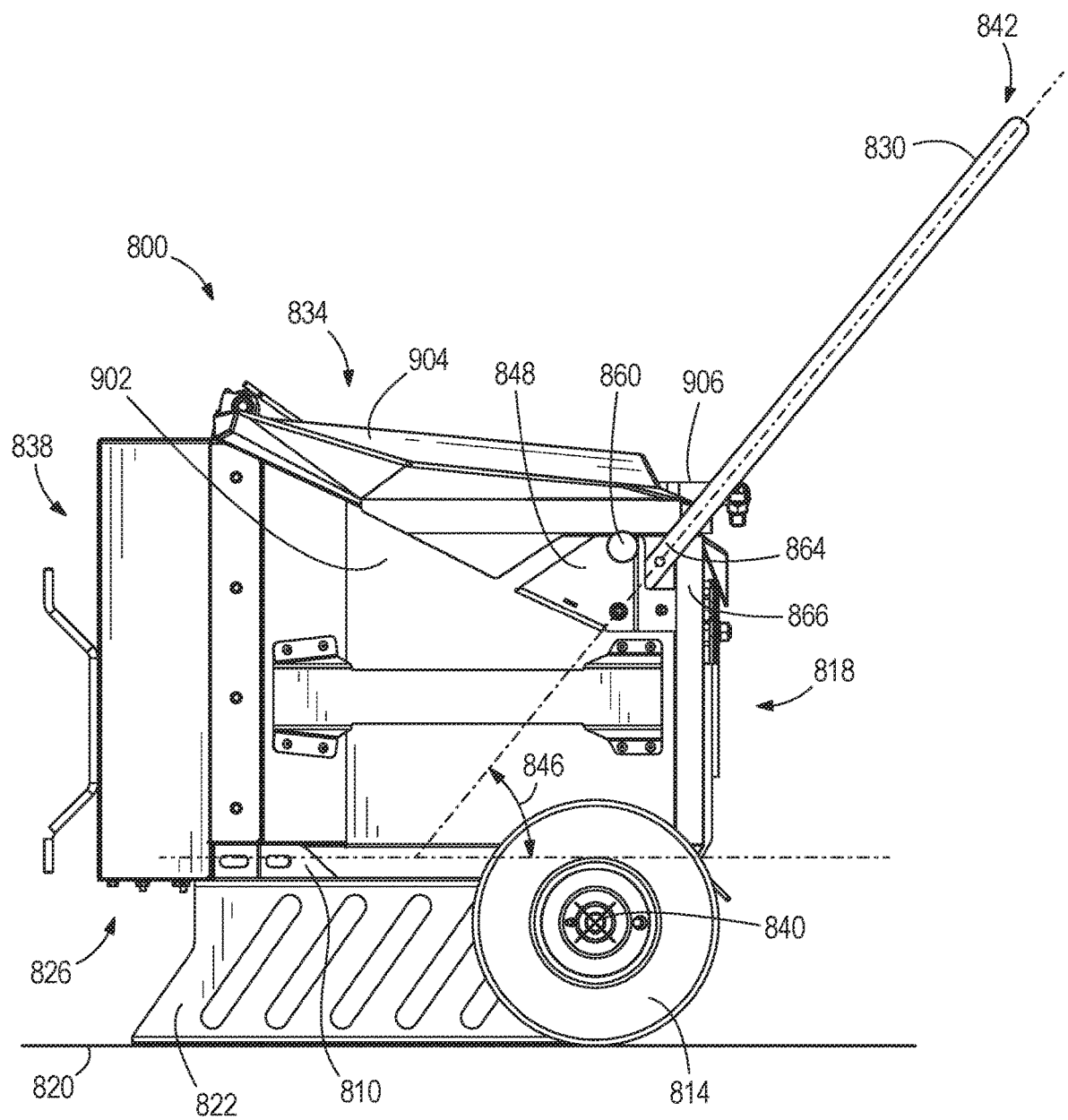
FIG. 27 is a side view of the off-board charger in a first position.
Figure 28:
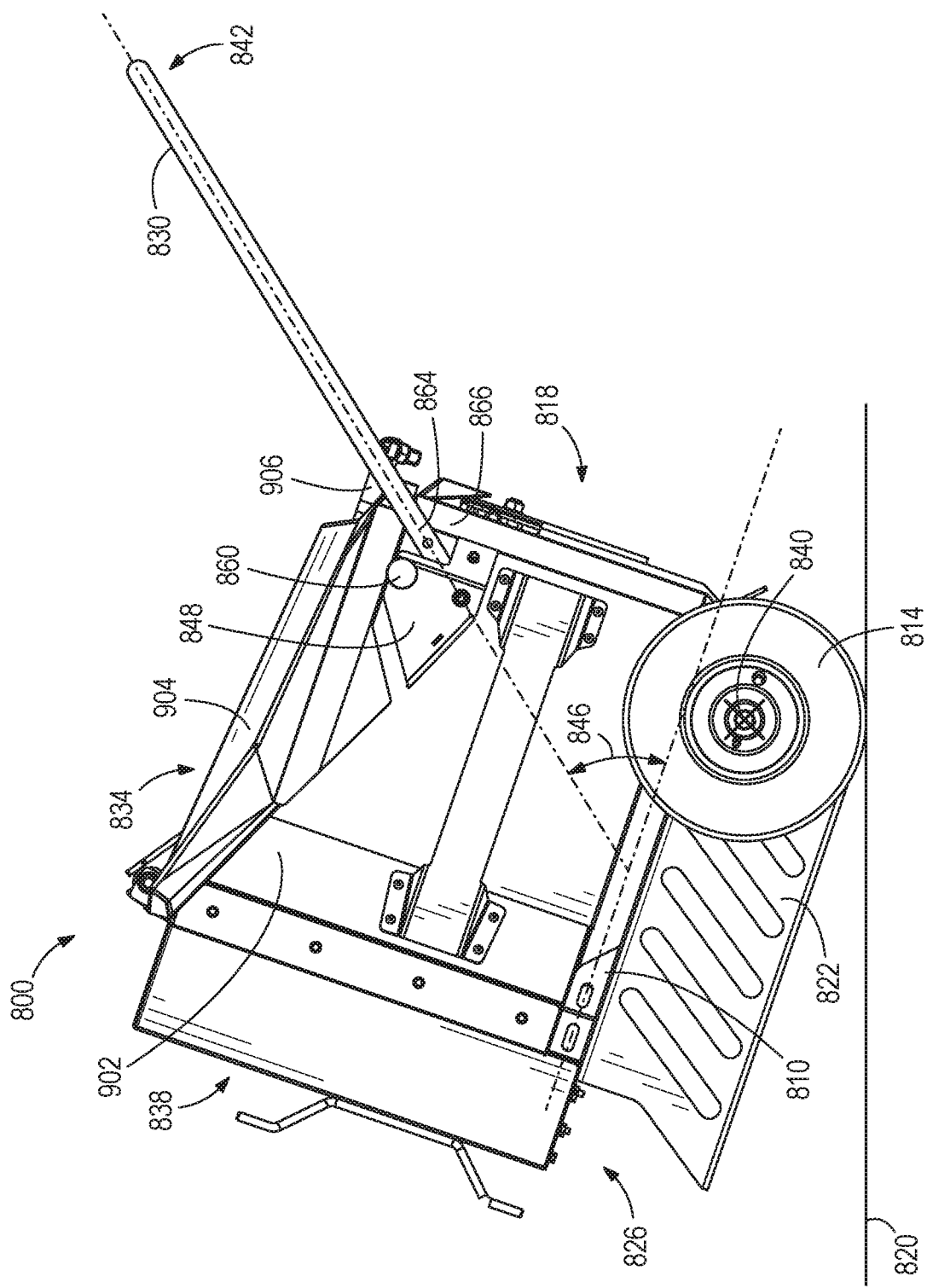
FIG. 28 is a side view of the off-board charger in a second position.

The handle 830 is coupled to the battery compartment 834 adjacent the first end 818 of the frame 810. As illustrated in FIGS. 27 and 28, the handle 830 is constructed to receive a first force 842 that is transverse to the handle 830 and the ground surface 820 to thereby pivot the frame 810 about the axis 840 of the ground engaging members 814 to lift the resting support 822 off of the ground surface 820 and enable wheeled transport of the off-board charger (FIG. 28). In other embodiments, the handle 830 may be directly coupled to the first end 818 of the frame 810. In yet another embodiment, the off-board charger 800 may include two handles (e.g., one on each side of the battery compartment 834). As such, it should be appreciated that any connection of a handle adjacent the first end 818 of the frame 810 couples the handle to the first end 818 of the frame 810.

Figure 29:
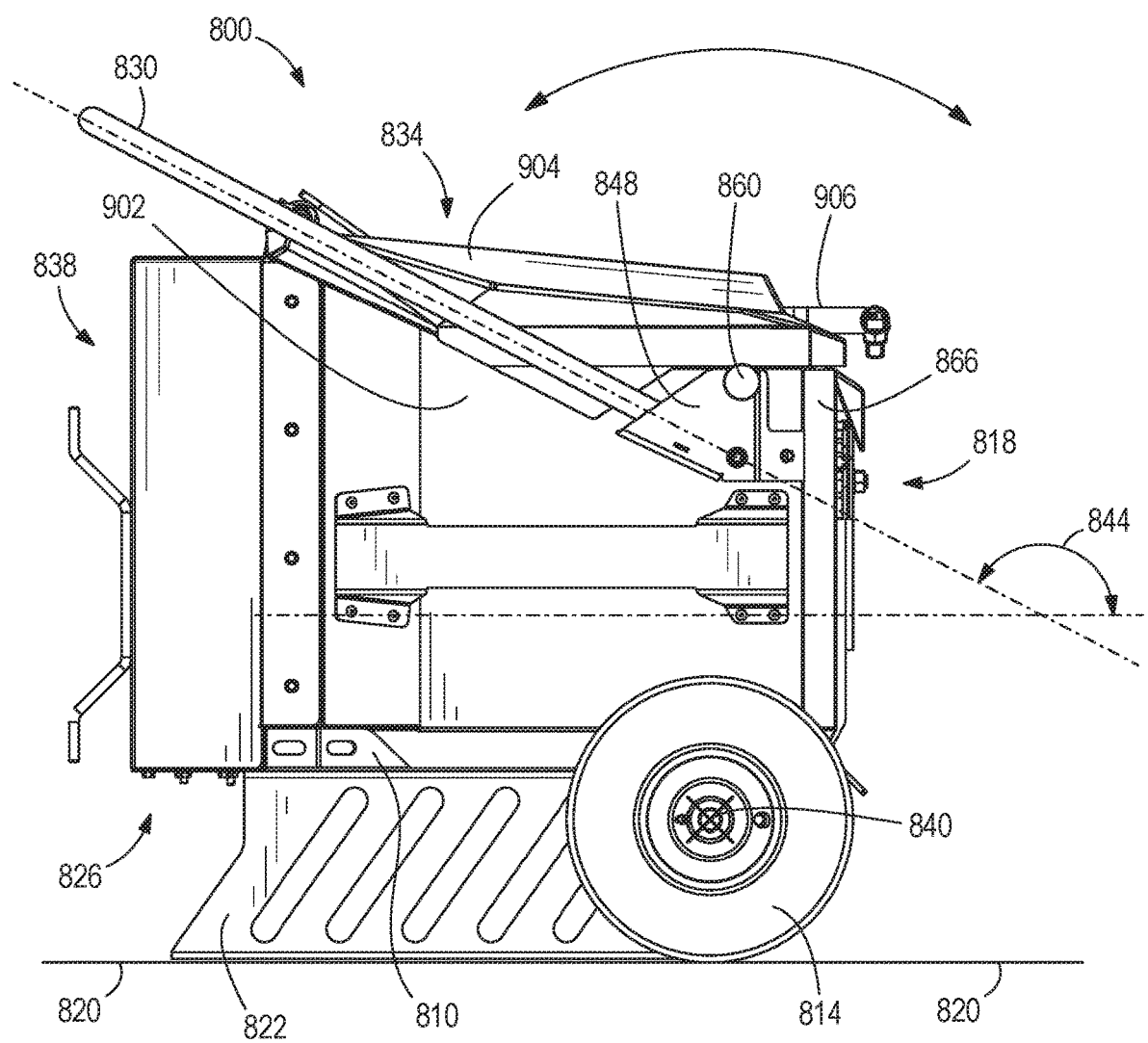
FIG. 29 is a side view of the off-board charger with a handle in a stowed position.

Now with reference to FIGS. 27-29, the handle 830 is pivotably supported by the frame 810. For example, a first end of the handle 830 is pivotably coupled to the battery compartment 834 (e.g., via a fastener) so the handle 830 is movable between a storage position (FIG. 29) where the handle 830 is at a first pivot angle 844 relative to the frame and a transport position (FIGS. 27 and 28) where the handle 830 is at a second pivot angle 846 relative to the frame 810. In the illustrated embodiment, the first pivot angle 844 is approximately 135 degrees and the second pivot angle 846 is approximately 45 degrees.

The off-board charger 800 may further include a handle support structure 848 coupled to the battery compartment 834 and an adjustment mechanism 860 that selectively restricts pivotable movement of the handle 830. In the illustrated embodiment, the adjustment mechanism 860 is a pin that extends between the handle support structure 848 and the battery compartment 834. In the transport position (FIG. 27), the adjustment mechanism 860 may engage with a slot 864 formed on the handle 830 to rigidly secure the handle 830 at the second pivot angle 846 relative to the frame 810. In some embodiments, the handle 830 may pivot freely between a stop surface 866 formed on the handle support structure 848 and the adjustment mechanism 860.

Figure 30:
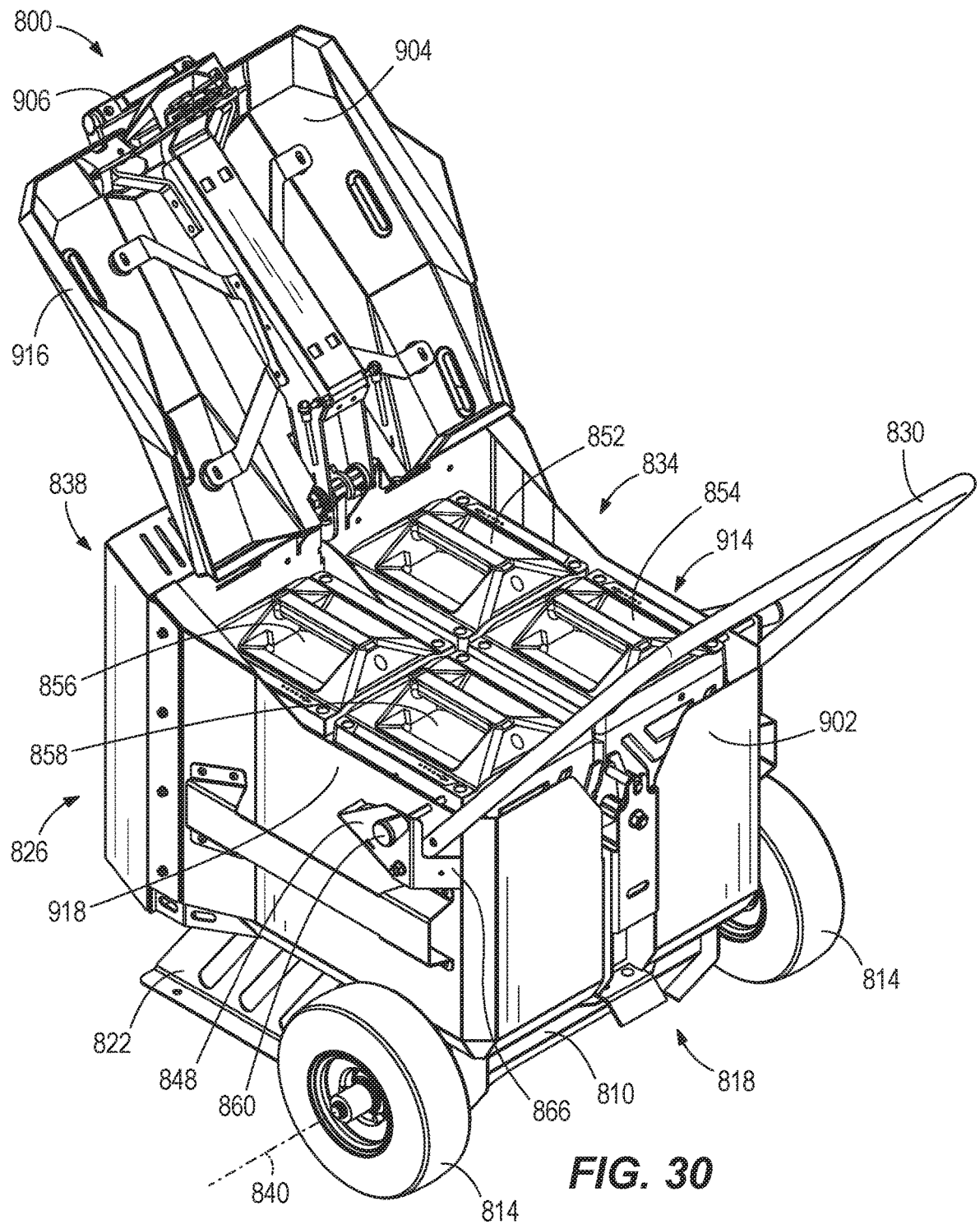
FIG. 30 is a perspective view of a battery compartment of the off-board charger having a hank of batteries positioned within the battery compartment.
Figure 31:
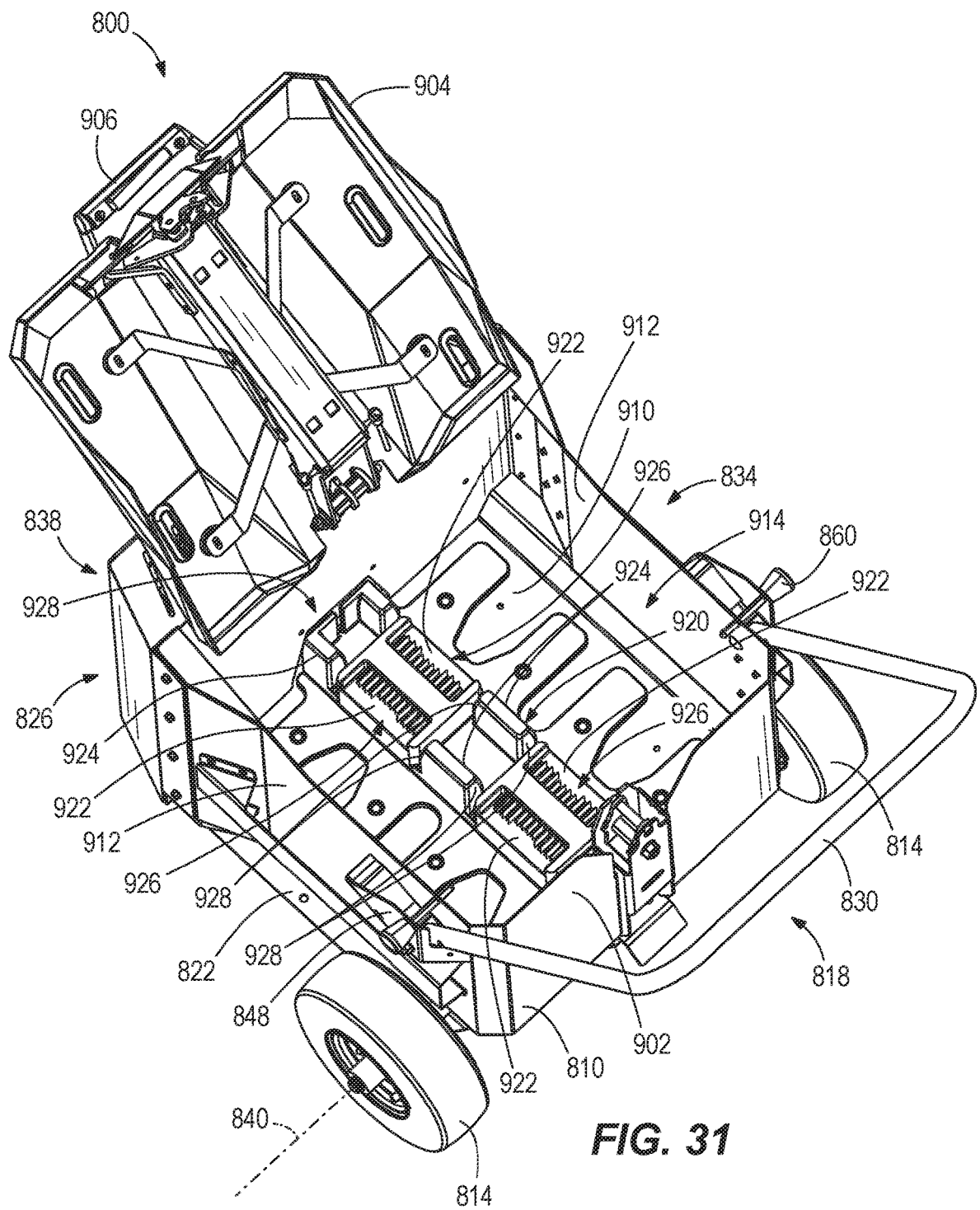
FIG. 31 is a perspective view of the battery compartment of the off-board charger having the bank of batteries removed from the battery compartment to illustrate a battery attachment structure.

Now with reference to FIG. 31, the battery compartment 834 includes a housing 902, a lid 904, and a latch 906. The housing has a bottom wall 910 and side walls 912 and defines an opening 914 and an inner space of the battery compartment 834. The lid 904 is coupled to the housing 902 and is movable between a closed condition (FIGS. 26-29) in which it covers the opening 914 (i.e., closes the housing 902) and an open condition (FIGS. 30 and 31) in which it provides access to the opening 914 (i.e., opens the housing 902). In the illustrated embodiment, the lid 904 is pivotally (more specifically, hingedly) coupled to a first end of the housing 902. The latch 906 selectively secures the lid 904 in the closed condition. Briefly referring to FIG. 30, in some embodiments, the lid 904 includes a magnet 916 and a lid sensor 918, where the lid sensor 918 is magnetically actuatable, as described in further detail below.

Referring now to FIGS. 30 and 31, a battery interface 920 is mounted to the bottom wall 910 of the battery compartment 834. The battery interface includes four docking stations 922, each including alignment structures 924 and electrical connectors 926. The inner space of the battery compartment 834 and the battery interface 920 is sized to receive battery packs 852, 854, 856, 858 (FIG. 30) through a gravity-biased connection. It should be appreciated that the battery packs 852, 854, 856, 858 are like battery packs 52, 54, 56, 58, described in detail above and, accordingly, the description of the battery packs 52, 54, 56, and 58 provided above similarly applies to the battery packs 852, 854, 856, and 858.

With continued reference to FIG. 31, the alignment structures 924 extend vertically from the bottom wall 910 of the battery compartment 834. The alignment structures 924 are structural elements that are relatively rigid and able to withstand impact loading that may arise as batteries are installed on the electrical connectors 926 so that the batteries are properly aligned with the electrical connectors 926 before the batteries engage the electrical connectors 926. The electrical connectors 926 are between alignment structures 924. Within (e.g., between the alignment structures 924 and electrical connectors 926) and between each docking station 922 are slits 928 to allow debris to exit the battery compartment 834 to reduce the likelihood of debris buildup.

In other embodiments, the battery interface 920 may include more docking stations 922 (e.g., five, six, etc.) or fewer docking stations 922 (e.g., one, two, three, or four). It should be appreciated that the battery interface 920 of the off-board charger 800 is similar to the battery interface 120 described above.

Figure 32:
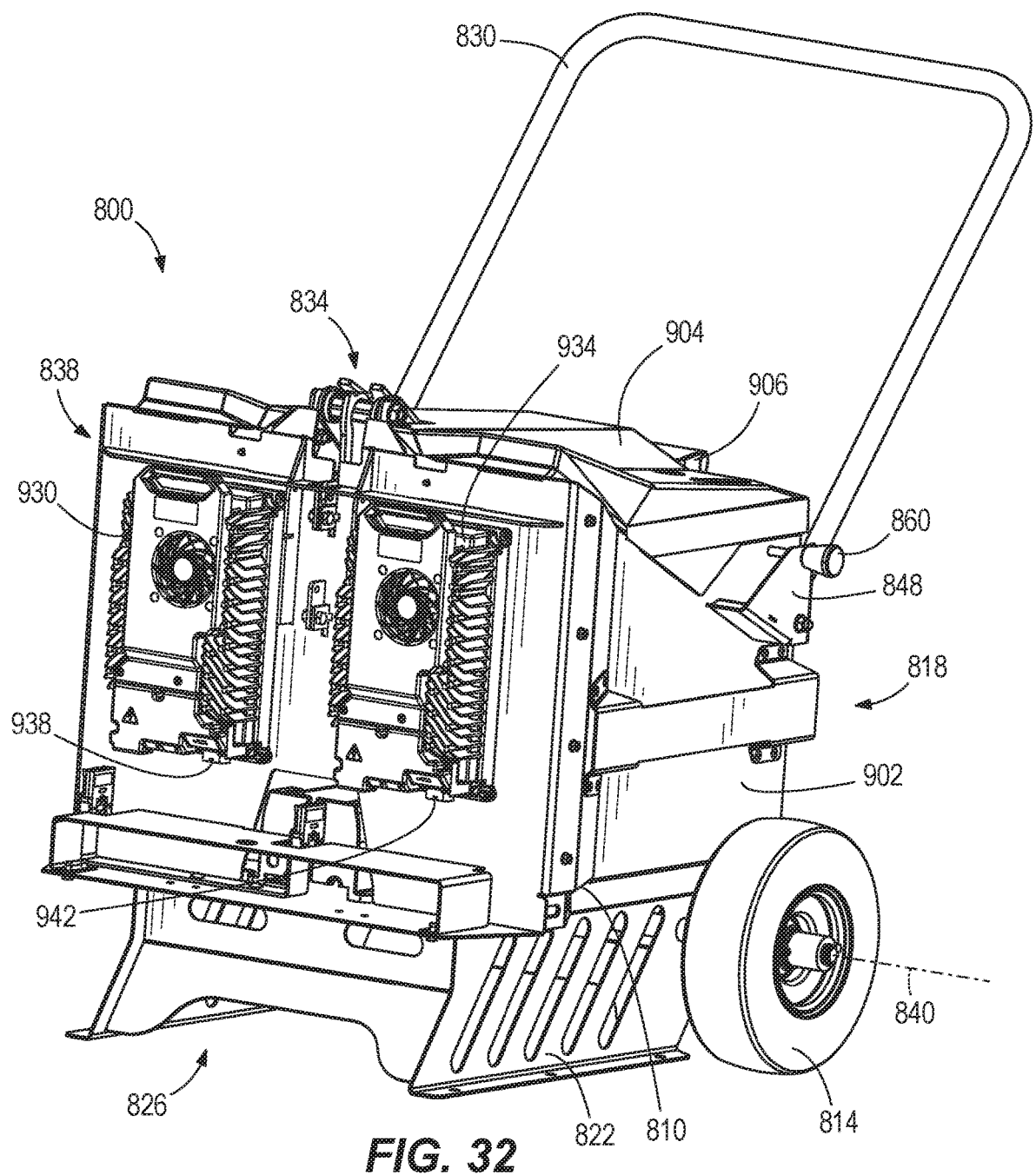
FIG. 32 is a perspective view of the off-board charger with a cover removed revealing chargers secured within a charger compartment.

Now with reference to FIG. 32, the charger 800 is illustrated with the cover 839 removed. As revealed, the charger compartment 838 encloses a first charger 930 and a second charger 934 that are supported by the frame 810 adjacent the battery compartment 834. In the illustrated embodiment, the first and second chargers 930, 934 are coupled to an outer portion of the housing 902 (e.g., via fasteners). The first and second chargers 930, 934 respectively include a first power input connector 938 and a second power input connector 942, which may be coupled to an external power source (e.g., as described in further detail with respect to FIGS. 36-37) to provide power to the off-board charger 800. While the illustrated embodiment of the off-board charger 800 includes two chargers 930, 934, it should be appreciated that additional chargers (e.g., three, four, five, six, seven, eight, etc.) may be supported by the frame 810. Additional chargers may increase the charging speed of the off-board charger (e.g., by increasing the available charging current) or allow more batteries to be charged (e.g., if the battery interface 920 includes more docking stations). Each of the chargers 930, 934 (and additional chargers) may be readily connected to the off-board charger 800 with a mechanical connection (e.g., bolts or other fasteners securing each charger within the charger compartment 838) and an electrical connection (e.g., plugging the chargers into connectors on the off-board charger 800).

Figure 33:
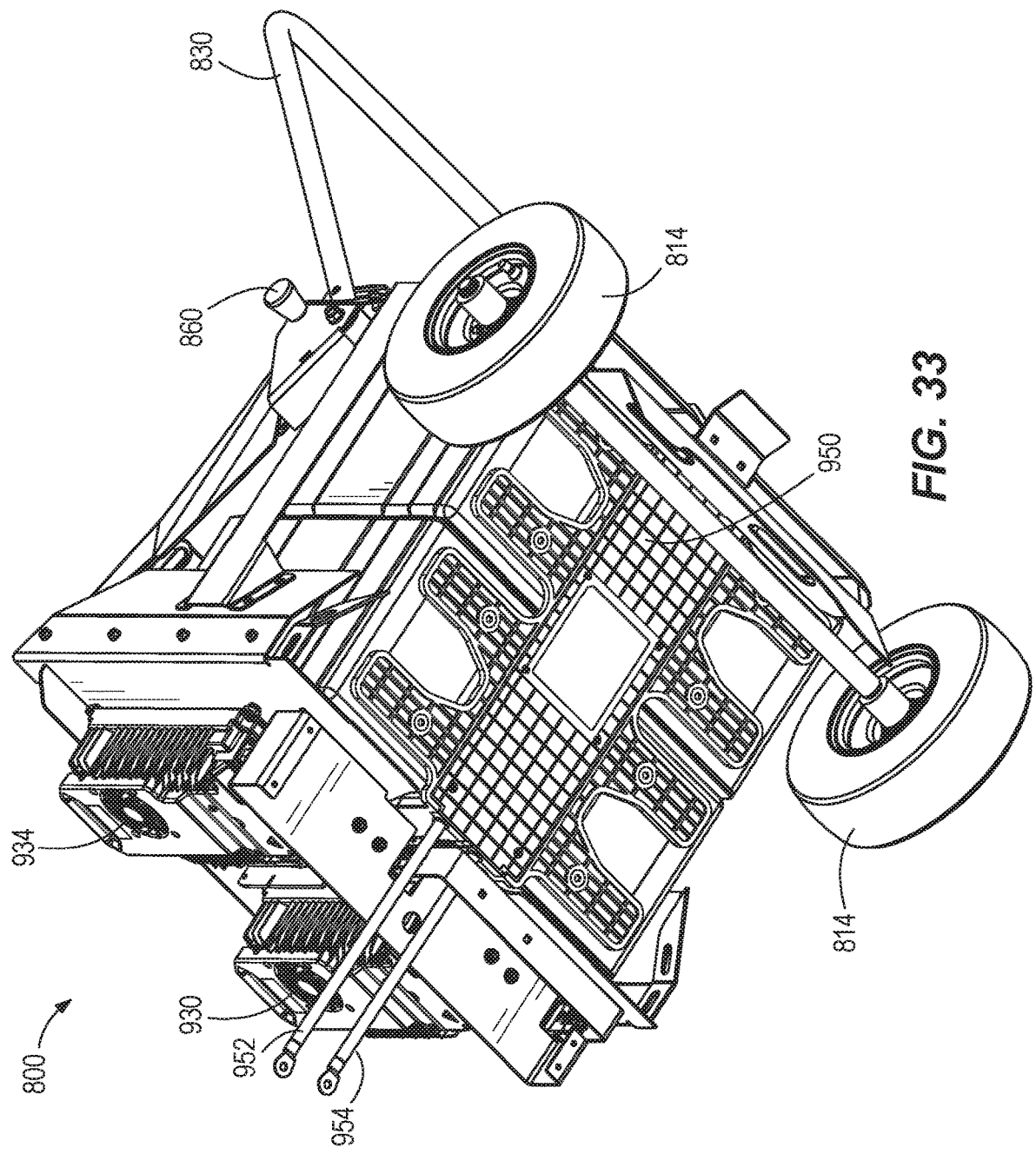
FIG. 33 is a bottom perspective view of the off-board charger illustrating a bottom side of a base unit.
Figure 34:
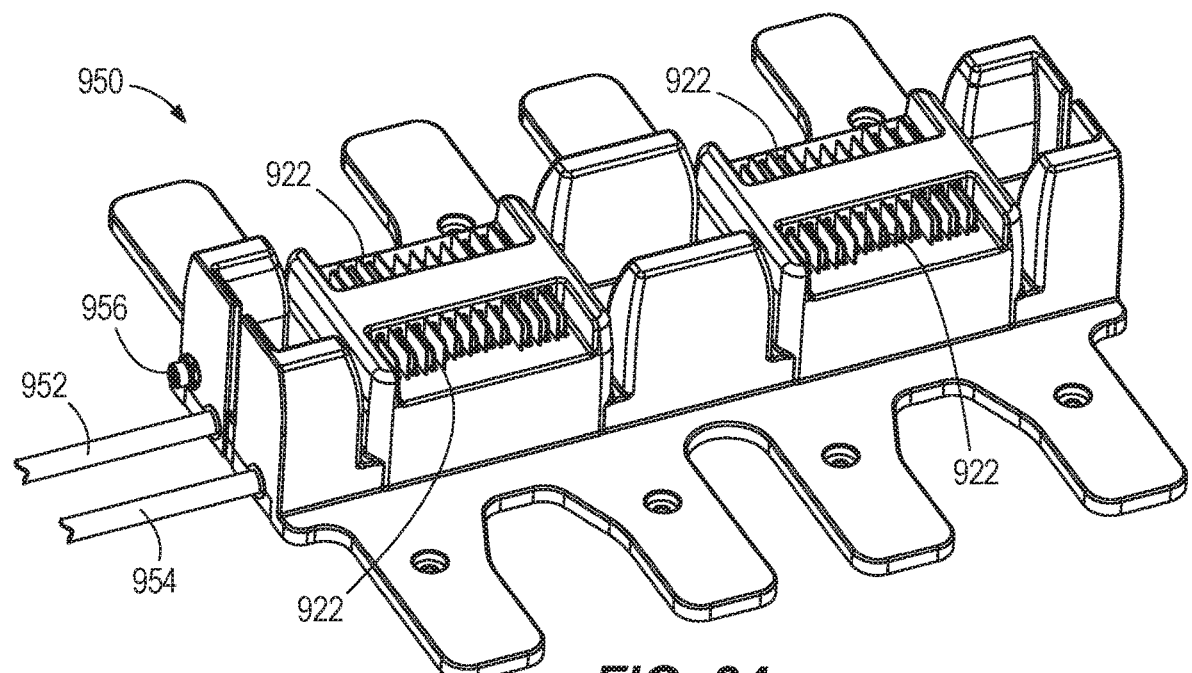
FIG. 34 is a perspective view of a docking station unit of the off-board charger.

FIG. 33 provides a bottom perspective view of the off-board charger 800 with the resting support 822 and a bottom cover removed, exposing an underside of a bus bar and docking station base 950, also referred to as the base 950. The top side of the base 950 forms a part of the bottom wall 910 and includes the docking stations 922, as shown in FIG. 34. Additionally, positive and negative power lines 952 and 954, which are configured to provide a connection to the chargers 930 and 934, at least indirectly, are shown extending away from the base 950 (disconnected), With reference to FIG. 34, a connector 9:56 is provided to connect the communication lines (e.g., CAN bus lines) of the chargers 930 and 934 to the base 950.

In some embodiments, a cable harness is provided to connect the chargers 930 and 934 to the base 950. The cable harness may include power and ground cables as well as one or more communication lines (collectively referred to as a communication cable). The cable harness may further have a first (bus bar-side) connection end including first ends of the power, ground, and communication cables and a second (charger-side) connection end including second ends of the power, ground, and communication cables. The frame 20 may include first power and ground studs (not shown) in the charger compartment 838 providing a connection point between the power lines 952 and 954 and the cable harness. More particularly, the power lines 952 and 954 are respectively connected to the first power and ground studs, and the first ends of the power and ground cables of the cable harness are also respectively coupled to the first power and ground studs. Additionally, the first end of the communication cable of the cable harness may be coupled to the connector 956. Turning to the second end of the cable harness, the second ends of the power and ground cables may be coupled to second power and ground studs of the frame 20 that are located closer to the chargers 930 and 934. The frame 20 may further include first and second charging ports (see, e.g., charging ports 224, 228 shown in FIG. 12A) that each include respective power and ground connections to the second power and ground studs. Additionally, the second end of the communication cable may be split into two connection points with shared communication lines, with the first connection point coupled to the first charging port and the second connection point coupled to the second charging port. To complete the connections between the chargers 930, 934 and the base 950, the charger 930 may include a first charging plug (similar to the charging plug 214 of FIG. 12A) that couples to the first charging port and the charger 934 may include a second charging plug (similar to the charging plug 218) that couples to the second charging port. The cable harness may further include a communication line of the communication cable that is coupled to a lid sensor (see, e.g., a lid sensor 1035 of FIG. 37).

Figure 35:
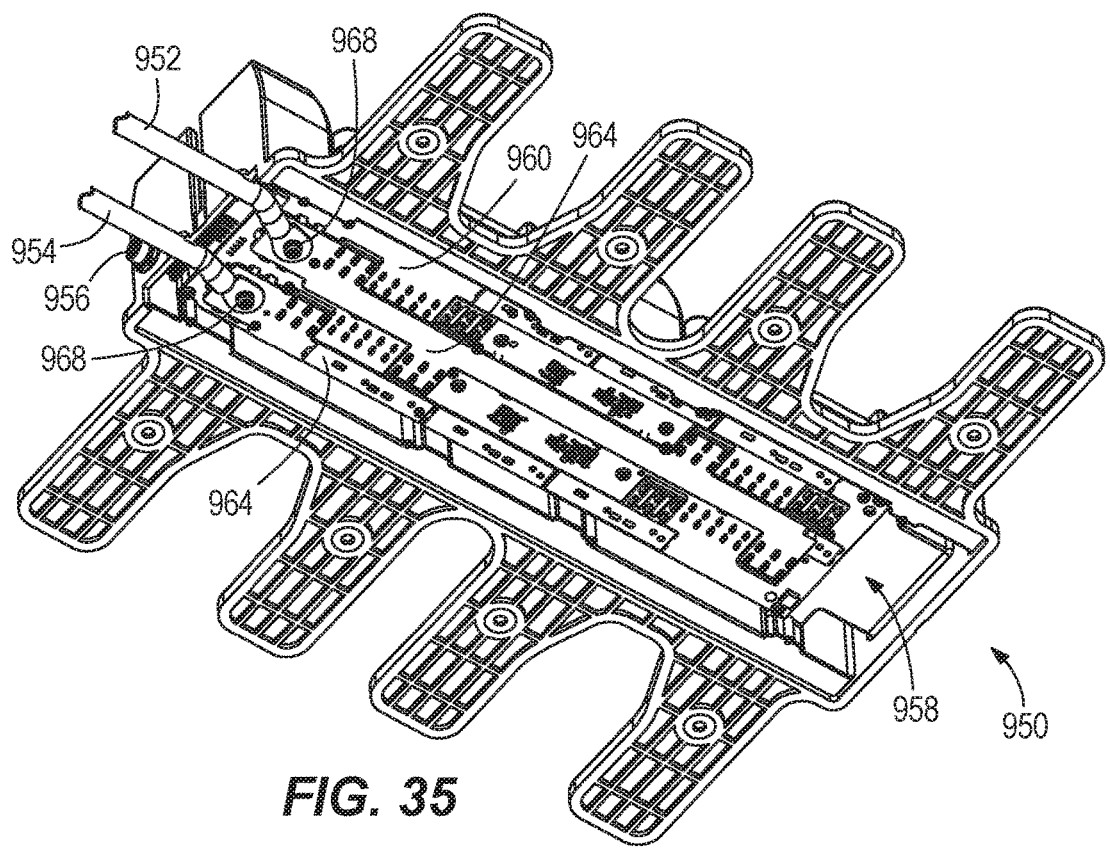
FIG. 35 is a bottom perspective cross-sectional view of the docking station unit illustrating a bus bar.

With reference to FIG. 35, a bus bar 958 is within a cavity of the base 950. The bus bar 958 includes a printed circuit board 960 with signal traces 962 (e.g. copper foil that remains after etching) for the communication lines between the chargers 930 and 934 and the communication terminals of the docking stations 922 (and, thus, connected battery packs). The bus bar 958 also includes conductive plates 964 mounted thereon to transfer power between the chargers 930 and 934, connected to the conductive plates 964 at power terminals 966 and 968, and the power terminals of the docking stations 922, which are mounted on or through the printed circuit board and conductively connected to the conductive plates 964. The conductive plates 964 are rated for conducting higher current levels (e.g., higher than the signal traces) to enable high current charging of battery packs connected to the docking stations. The conductive plates 964 enable higher power connections without large (high current) traces on the printed circuit board 960, which can be costly and space consuming. On the top side of the printed circuit board 960 are terminals of the docking stations 922 configured to electrically connect with battery packs 852, 854, 856, 858 (when coupled to the docking stations 922). Accordingly, the bus bar 958 provides communication and power connections between the chargers 930 and 934 and battery packs connected to the docking stations 922. In some embodiments, the bus bar 131 in FIG. 6 is similar to the bus bar 958 and a similar description of the bus bar 958 provided herein applies to the bus bar 131.

Figure 36:
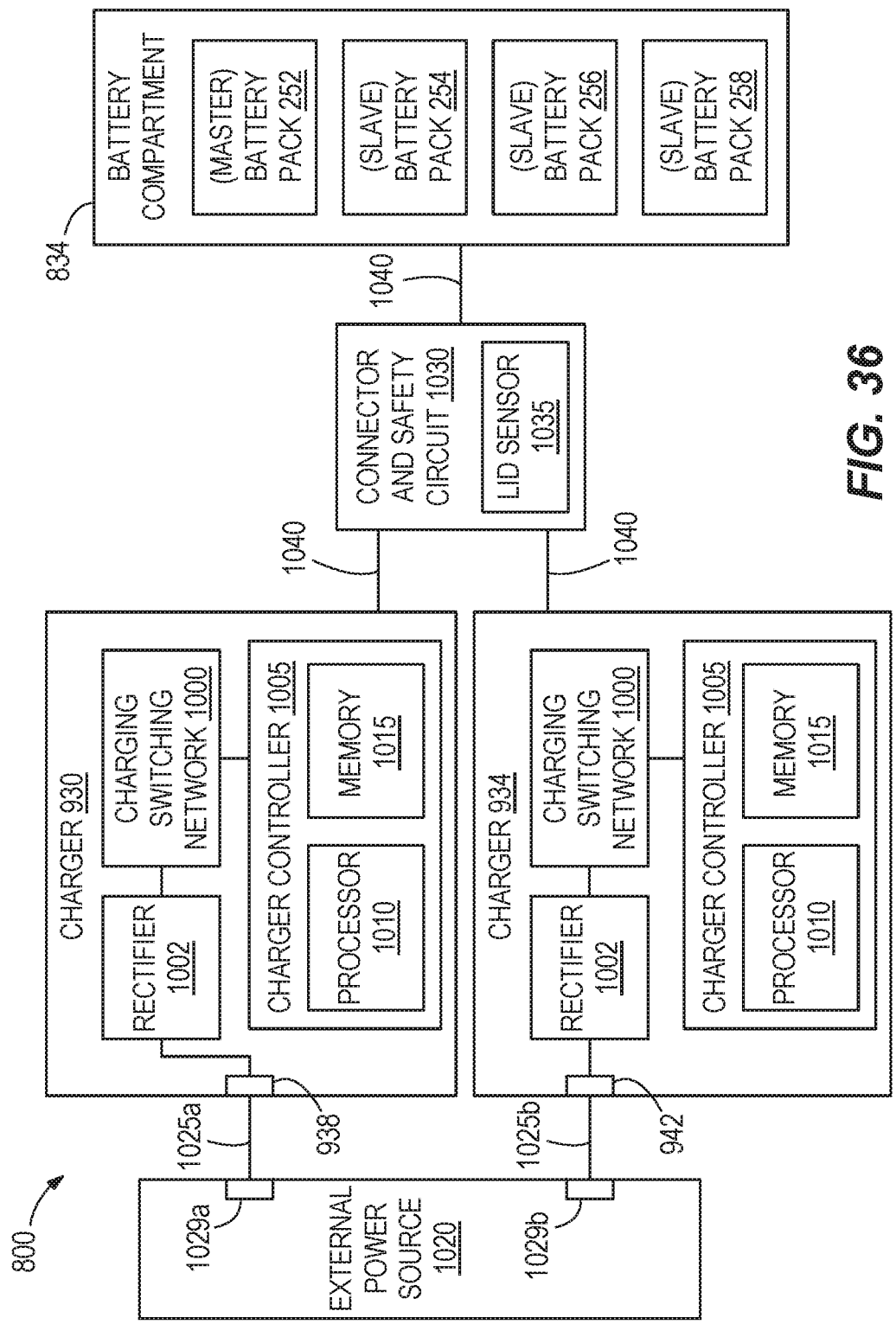
FIG. 36 is block diagram of an external power source in electrical communication with chargers to provide electrical power to battery packs.

FIG. 36 illustrates a block diagram of the off-board charger 800, according to some embodiments. In the illustrated embodiments, the off-board charger 800 includes the first charger 930 and the second charger 934, as well as four battery packs 252, 254, 256, and 258 (which may be, for example, the battery packs 852, 854, 856, and 858 shown in FIG. 30). However, in some embodiments, the off-board charger 800 includes fewer chargers or more chargers than two chargers. Additionally, in some embodiments, the off-board charger 800 includes fewer battery packs or more battery packs than four battery packs.

Each charger 930, 934 includes a charging switching network 1000, a rectifier 1002, and a charger controller 1005. The charger controller 1005 includes an electronic processor 1010 and a memory 1015 that stores instructions that are executed by the electronic processor 1010 to implement the functionality of the charger controller 1005 described herein.

The off-board charger 800 is coupled to an external power source 1020, which may be an alternative current (AC) power utility grid, an AC engine-generator, an AC inverter that inverts DC power from solar panels, batteries, or another DC source to AC power, or another source. The external power source 1020 may be, for example, a 120 V. 60 Hz AC source or a 220 V, 50 Hz AC source. Each charger 930, 934 is coupled to the external power source 1020 via an independent connection. More particularly, the first charger 930 is coupled to the external power source 1020 via a first power cable 1025a that connects the first power input connector 938 of the charger to a first outlet 1029a of the external power source 1020. The second charger 934 is coupled to the external power source 1020 via a second power cable 1025b that connects the second power input connector 942 of the charger to a second outlet 1029b of the external power source 1020.

In some embodiments, the first outlet 1029a and the second outlet 1029b are wall outlets (e.g., in a residential or commercial building or garage) that are each on a separate circuit of the external power source 1020. For example, the external power source 1020 may include an electrical panel coupled to the utility grid to receive power and distributing power via (i) a first circuit branch having a first current limit (e.g., 15 or 20 Amps) and being associated with a first circuit breaker and (ii) a second circuit branch having a second current limit (e.g., 15 or 20 Amps) and being associated with a second circuit breaker. The first outlet 1029a may be coupled to the first circuit branch and the second outlet 1029b may be coupled to the second circuit branch. Accordingly, the overall current that the charger 800 may draw from the external power source 1020 without tripping a circuit breaker may be larger (e.g., at 30 or 40 Amps) than if a single connection was provided to the external power source 1020 for both chargers 930 and 934. Additionally, because each charger 930, 934 is connected to an independent circuit, even if one circuit breaker trips for one of the outlets 1029a or 1029b, the other outlet may still be providing power and the charger 800 may be able to continue to charge.

The charger 800 further includes connector circuitry 1030 with a lid sensor 1035. The battery compartment 834 includes a bank of one or more batteries (e.g., the battery packs 852, 854, 856, 858), one of which may be identified as a master battery pack 252 and the remaining ones of which may be identified as a plurality of slave battery packs 254, 256, 258 (e.g., three in the illustrated embodiment). In other embodiments, the power source 250 may include more battery packs (e.g., five, six, seven, etc.) or fewer battery packs (e.g., two, three, one). The one or more battery packs of the battery compartment 834 (e.g., battery packs 252, 254, 256, and 258) are coupled to the one or more chargers 930, 934 by the connector circuitry 1030 and a power and communication bus 1040.

Each rectifier 1002 is configured to receive and convert AC power from the external power source 1020 to direct current (DC) power for output to the charging switching network 1000 of the same charger. The rectifier 1002 may be passive or active, and, in some embodiments, includes additional power conditioning components (e.g., one or more filters, DC-to-DC boost or buck converters, and the like). Each charger controller 1005 is configured to control the charging switching network 1000 (of the same charger) to selectively supply charging current to the one or more battery packs of the battery compartment 834 via the positive and negative lines of the bus 1040. For example, in some embodiments, each charging switching network 1000 includes one or more power switching elements (e.g., field effect transistors) that may be selectively activated by a control signal from the charger controller 1005 to enable DC power received from the associated rectifier 1002 to flow through positive and negative terminals on the bus 1040 to the one or more battery packs of the battery compartment 834.

In some embodiments, a similar technique as described above with the mower 10 is implemented to determine which battery pack 252, 254, 256, 258 is the master battery pack 252. For example, an identification number is assigned to each battery pack 252, 254, 256, 258 (e.g., one, two, three, four, etc. and the battery pack 252, 254, 256, 258 with the lowest identification number is selected as the master battery pack 252 and the remaining battery packs are slave battery packs 254, 256, 258. As previous described with respect to the mower 10, the battery packs themselves may communicate amongst one another to determine which of the battery packs has the lowest identification number and, therefore, is the designated master battery pack. If the master battery pack 252 is removed from the battery interface, the battery packs may communicate and automatically reassign the slave battery pack 254, 256, 258 with the lowest identification number to be the master battery pack 252. Similarly, if an additional battery pack is attached to the battery interface 120, the battery packs may communicate and automatically assign the additional battery pack to be the master battery pack 252 when the newly added battery pack has the lowest identification number, and otherwise identify the newly added battery pack as a slave battery pack.

Additionally, in some embodiments, a similar technique as described above with the mower 10 is used to implement a priority charging method for the battery pack 252, 254, 256, 258. For example, the master battery pack 252 communicates with the first and second chargers 930, 934 and the slave battery packs 254, 256, 258 to determine the priority charging method. The master battery pack 252 may communicate with the first and second chargers or the slave battery packs themselves to request charging of a single battery pack (e.g., for sequential charging) or a plurality of battery packs (e.g., two, three, four, etc.) in parallel.

Figure 37:
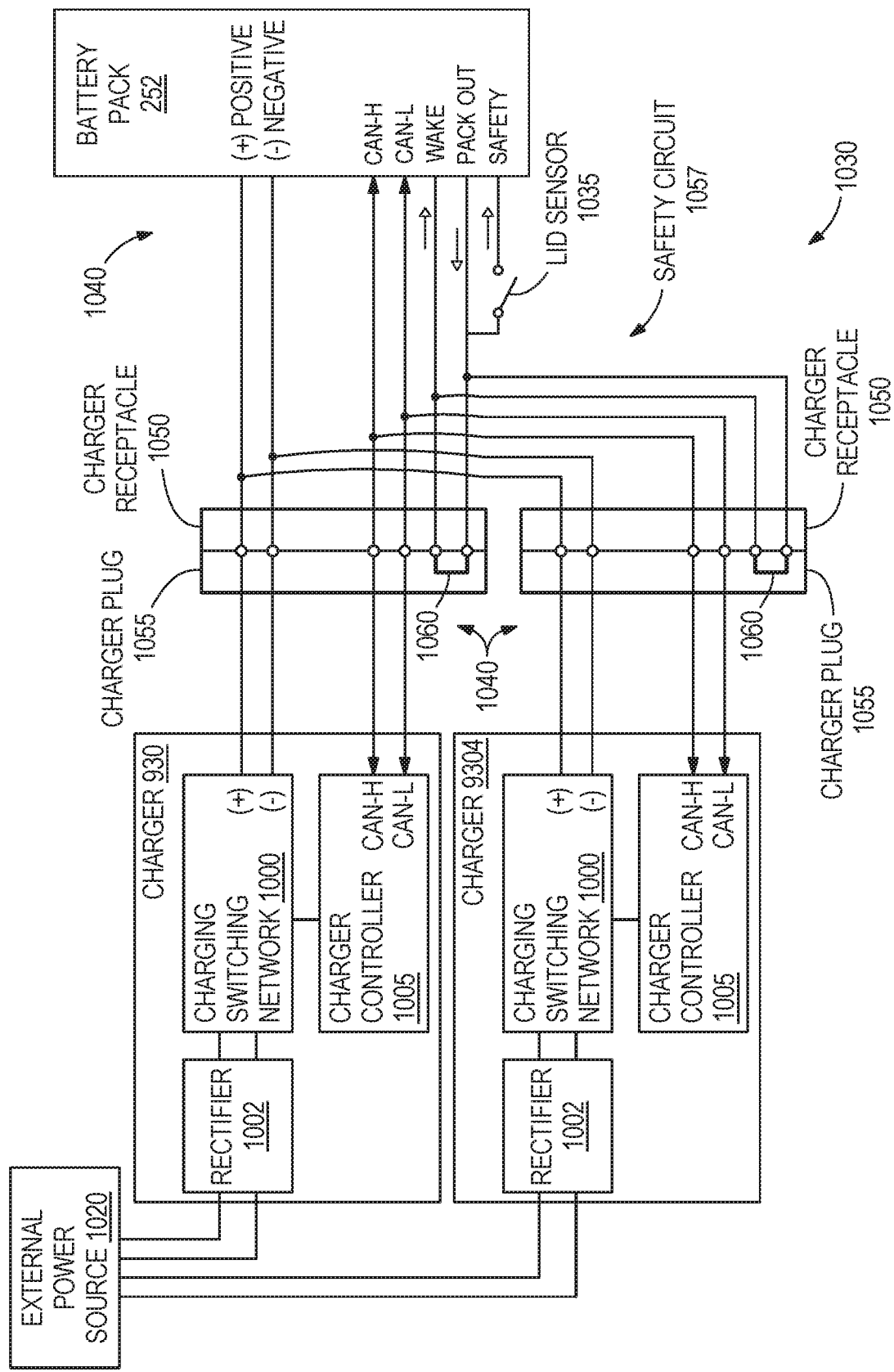
FIG. 37 illustrates interconnections of the external power source, the chargers, and a battery pack.

FIG. 37 illustrates interconnections of the charger 800 in further detail, including details of the bus 1040 and of the connector circuitry 1030. The bus 1040 is illustrated to include positive and negative power lines, a CAN-H communication line, and a CAN-L, communication line connecting the one or more chargers 930, 934 with the battery pack 252. The connector circuitry 1030 includes charger receptacles 1050, charger plugs 1055, and a safety circuit 1057. In some embodiments, the charger receptacles 1050 and the lines of the bus 1040 coupling the charger receptacles 1050 to the battery pack 252 are formed as part of the bus bar 958, described with respect to FIG. 35.

More specifically, each of the first and second chargers 930, 934 are coupled to charger receptacles 1050 of the off-board charger 800. In particular, a charger plug 1055 of each of the first and second chargers 930, 934 is coupled to respective charger receptacles 1050. The charger plug 1055 and charger receptacle 1050 connect positive and negative terminals of the first and second chargers 930, 934 to positive and negative terminals of the battery pack 252, respectively. Additionally, the charger plug 1055 and charger receptacle 1050 connect communication bus terminals (e.g., CAN-H and CAN-L terminals) of the first and second chargers 930, 934 to communication bus terminals of the battery pack 252. Additionally, each of the charger plugs 1055 includes a jumper 1060 that connects two terminals of the respective charger receptacle 1050.

The safety circuit 1057 includes conductive lines (e.g., wires, traces on a circuit board, etc.) between a wake terminal of the battery pack 252, a pack out terminal, and a safety terminal of the battery pack 252, as well as the lid sensor 1035 and the jumpers 1060 of the one or more charger plugs 1055 that may be present. In some instances, the lines connected to the wake terminal, pack out terminal, and safety terminal of the safety circuit 1057 may also be considered part of the bus 1040.

In some embodiments, the positive terminal, negative terminal, CAN-H terminal, CAN-L terminal, wake terminal, pack out terminal, and safety terminal illustrated in FIG. 37 are part of the terminal block 640 illustrated in FIG. 20A.

The lid sensor 1035 of FIG. 37 may take different forms. For example, in some embodiments, the lid sensor 918 of FIG. 30 serves as the lid sensor 1035. The lid sensor 918 is a magnetically actuated switch that is actuated to close (i.e., allow current flow) when the magnet 916 mounted on the lid 904 is positioned within a range of the lid sensor 918 when the lid 904 is closed, and that is actuated to open (i.e., interrupt current flow) when the magnet 916 mounted on the lid 904 is positioned outside of the range of the lid sensor 918 when the lid 904 is open. Returning to FIG. 37, in some embodiments, the lid sensor 1035 is a mechanically actuatable switch that is mechanically actuated to close when the lid 904 is closed, and that is mechanically actuated to open when the lid 904 is open. For example, with reference back to FIG. 30, the mechanically actuatable switch may include a spring-biased push button (not shown) located at an interface where the lid 904 meets the housing 902 when the lid 904 closes, such that the push button is biased open when the lid 904 is open and is depressed by a portion of the lid 904 when the lid 904 is closed.

Figure 38:
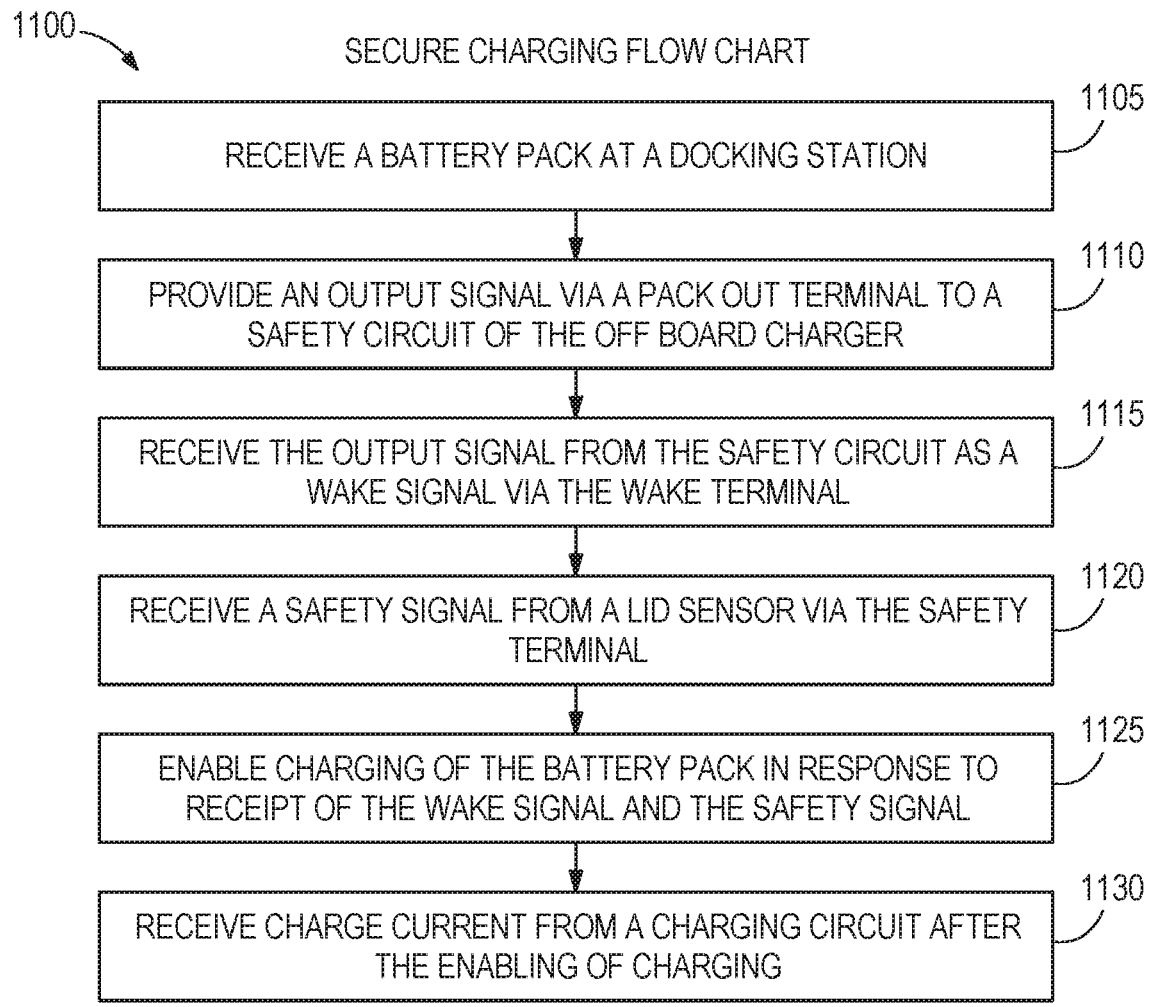
FIG. 38 illustrates a flow chart for a secure charging method for the chargers.

FIG. 38 illustrates a flow chart for a secure charging method 1100 according to some embodiments. In block 1105, a docking station of the battery compartment 834 of the charger 800 receives a battery pack (e.g., the battery pack 852), as described above with respect to FIG. 30. In block 1110, the battery controller 600 of the received battery pack 252 provides an output signal via a pack out terminal of the battery pack 252 to the safety circuit 1057 of the off-board charger 800. For example, the battery controller 600 may periodically output a low voltage signal (e.g., 3.3 or 5 volts) on the pack out terminal, as controlled by a standby software loop or a timer of the battery controller 600.

In block 1115, the battery controller 600 receives the output signal from the safety circuit 1057 as a wake signal via the wake terminal. For example, as illustrated in FIG. 37, the pack out terminal and the wake terminal of the battery pack 252 may be coupled by conductive lines and a jumper 1060 of the charger plug 1055. Thus, when no charger is present (and thus, no charger plug 1055 or jumper 1060 is present), or when the battery pack 252 is not coupled to the charger 800 or another device, the output signal from the pack out terminal is not received by the wake terminal.

In block 1120, the battery controller 600 receives a safety signal from the lid sensor 1035 via the safety terminal of the battery pack 252. The safety signal is indicative of whether the lid 904 for the battery compartment 834 is closed. For example, the lid sensor 1035 may include a switch (as illustrated in FIG. 37) that closes when the lid 904 is closed, and that opens when the lid 904 is open. The switch has an input side coupled to the pack out terminal of the battery pack 252 and an output side coupled to the safety terminal of the battery pack 252. Accordingly, when the switch of the lid sensor 1035 is closed, the output signal sent on the pack out terminal of the battery pack 252 returns via the switch of the lid sensor 1035 as the safety signal at the safety terminal of the battery pack 252. Thus, the battery controller 600 is configured to determine whether the lid is open (or closed) based on the safety signal (or absence of the safety signal).

In block 1125, the battery controller 600 enables charging of the battery pack 252 in response to receipt of the wake signal and the safety signal. For example, in response to receiving the wake signal and the safety signal, the battery controller 600 first awakens from a standby mode into a normal operation mode. In some embodiments, the standby mode is a low power mode in which the controller 600 consumes less power with reduced functionality and in which the battery pack 252 may not be charged or discharged. In the normal operation mode, the controller 600 returns to normal functionality and power consumption, and the battery pack 252 may be charged (when coupled to the charger 800) or may be discharged (e.g., when coupled to the mower 10). More particularly, once awakened, to enable charging of the battery pack 252, the battery controller 600 is configured to enable one or more charge switches of the charge/discharge switches 635 (see FIG. 20A) providing a connection between the positive and negative terminals of the battery pack 252 and the cells 615. In some embodiments, the battery controller 600 is already in a normal operation mode when the wake signal and safety signal are received, and the battery controller 600 proceeds to enable charging of the battery pack 252 in response to the wake signal and safety signal without first awakening out of a standby mode. In contrast to enabling charging, to disable charging of the battery pack 252, for example, when either of the wake signal or the safety signal is not received by the battery controller 600, the battery controller 600 disables one or more charge switches of the charge/discharge switches 635 (see FIG. 20A) to interrupt the connection between the positive and negative terminals of the battery pack 252 and the cells 615.

In some embodiments, the battery pack 252 provides feedback to a user upon receipt of the wake signal and the safety signal. For example, the battery pack 252 illuminates a light source (e.g., a light emitting diode (LED)) on a top surface of the battery pack 252 or generated an audible beep.

Accordingly, a user can readily determine whether a battery pack has been properly inserted into the off-board battery charger 800 (or mower 10).

In some embodiments, the battery controller 600 includes other preconditions before enabling charging of the battery pack 252 in addition to receiving the wake signal and the safety signal. For example, as another precondition to enabling charging, the battery controller 600 may await a communication from one or more battery packs (e.g., battery packs 254, 256, and 258) or from one or more of the chargers 930, 934 over the communications lines (CAN-H and CAN-L) of the bus 1040. The battery controller 600 may also implement one or more of the priority charging schemes noted above with respect to charging battery packs on the mower 10 and, accordingly, another precondition is that the battery pack 252 is selected for charging based on the applicable priority charging scheme.

In block 1130, after charging of the battery pack 252 is enabled, the battery pack 252 receives charge current from one or more of the chargers 930, 934 (also referred to as a charging circuit). For example, battery pack 252 may communicate a request for charging current over the communication lines (CAN-H and CAN-L) of the bus 1040 to the charger controller 1005 of each of the one or more chargers of the off-board charger 800. In response to the request, each of the charger controllers 1005 controls its associated charging switching network 1000 to provide charging current from the rectifier 1002 over the power lines of the bus 1040 to the battery pack 252.

Figure 39:
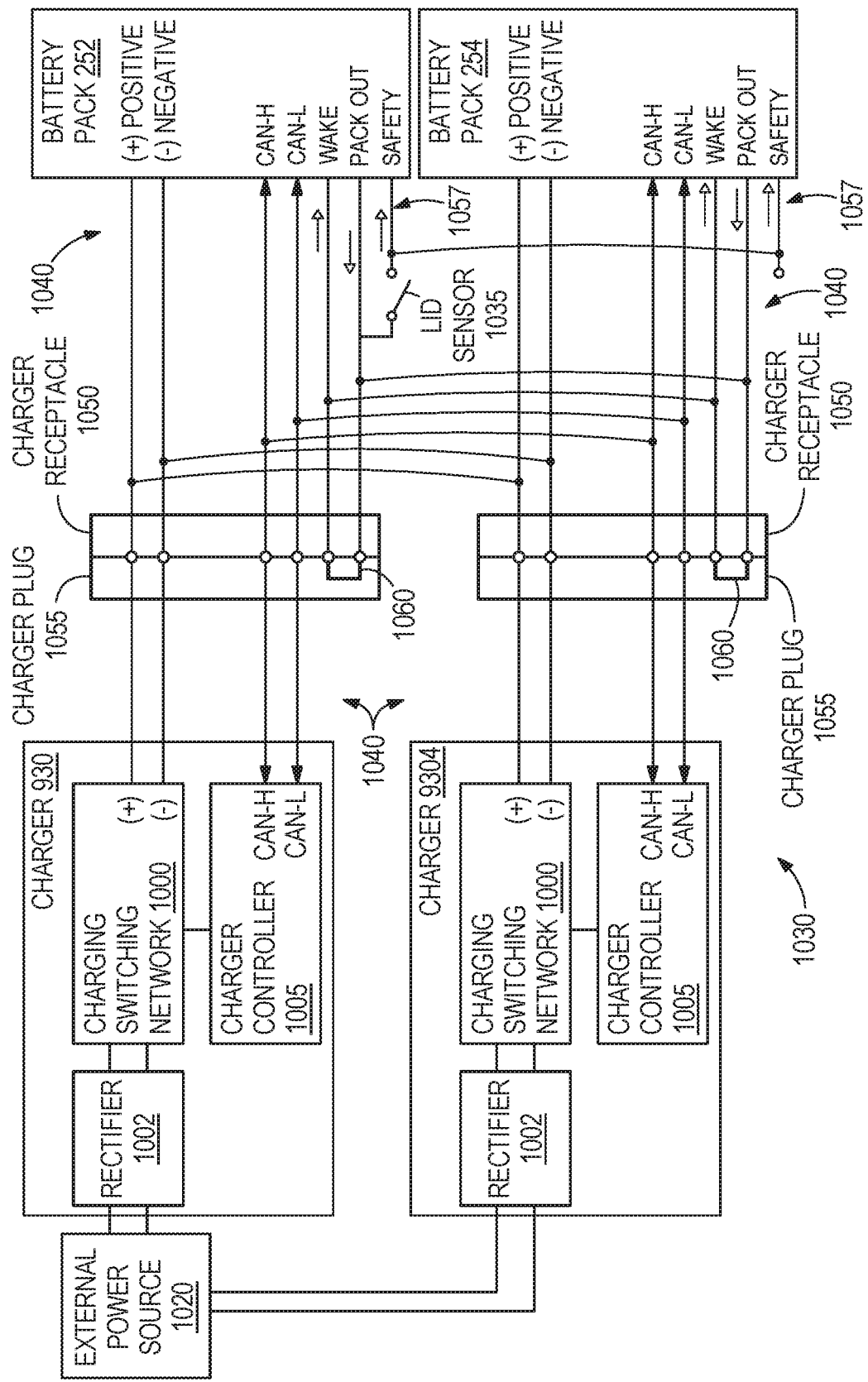
FIG. 39 illustrates interconnections of the external power source, the chargers, and two battery packs.

While the method 1100 is described with respect to charging the battery pack 252, the method is similarly applicable to the other battery packs that may be inserted into the battery, compartment (e.g., the battery packs 254, 256, and 258). For example, in FIG. 39, a second battery pack 254 is shown coupled to the off-board charger 800. As shown, the battery packs 252 and 254 (as well as further battery packs, when inserted into the battery compartment 834) are coupled in parallel such that like terminals of the battery packs are coupled together via the bus 1040 and the connector circuitry 1030. Each battery pack 252, 254, 256, and 258 is configured to independently execute the method 1100. Because of the parallel connection, an output signal via the pack out terminal of any of the coupled battery packs will be received by the wake terminal of all the parallelly connected battery packs. Additionally, when the lid sensor 1035 is actuated (because the lid 904 is closed), the output signal from the pack out terminal of any of the coupled battery packs will be received by the safety terminal of each of the parallelly connected battery packs in the battery compartment 834. For example, an output signal from the pack out terminal of the battery pack 252 will be received by the wake terminal of both the battery pack 252 and of the battery pack 254 and, if the lid sensor 1035 is actuated, by the safety terminal of both the battery pack 252 and of the battery pack 254.

Although FIGS. 36-39 are described with respect to the off-board charger 800, in some embodiments, similar components and functions are included on the mower 10. For example, the diagrams of FIGS. 36, 37, and 39 may also represent an arrangement of the mower 10 in that the one or more chargers 930, 934 may be present on the mower 10 (i.e., physically supported by the mower 10) or electrically coupled to the mower 10 (but located off of the mower 10), and the connector circuitry 1030 and bus 1040 may connect the one or more chargers 930, 934 to the bank of battery packs 252, 254, 256, and 258 (i.e., the power source 250). Additionally, the one or more chargers 930, 934 may be selectively mounted to or coupled to the mower 10 such that, in some instances, the mower 10 is connected to just one charger 930, while in other instances, the mower 10 is connected to two or more chargers 930, 934. Additionally, the mower 10 with one or more of the battery packs (e.g., the battery packs 252, 254, 256, and 258) may implement the method 1100 of FIG. 38.

Further, in some embodiments when the mower 10 implements the method 1100, the method further includes enabling discharging of the battery pack, by the battery controller 600, in response to receipt of the wake signal and the safety signal. For example, once awakened, to disable charging of the battery pack 252, the battery controller 600 is configured to enable one or more discharge switches of the charge/discharge switches 635 (see FIG. 20A) providing a connection between the positive and negative terminals of the battery pack 252 and the cells 615. Additionally, the battery pack 252 provides current to a motor of the mower 10 after the enabling of discharging, such as one or more of the drive motors 45 and deck motors 40. In some embodiments when the method 1100 is implemented on the mower 10, in step 1125, instead of enabling charging, the battery controller 600 enables discharging and, in step 1130, the battery pack 252 provides discharge current to one or more of the drive motors 45 and deck motors 40 (rather than receiving charge current). In some of these embodiments of the method 1100 implemented on the mower 10, step 1125 is further delineated into substeps. In a first substep, the battery controller 600 enables discharging at a first level (e.g., 7 amperes). In a second substep, the battery controller 600 then communicates with the vehicle control module 90 while the vehicle control module 90 performs a status check of components (see, e.g., discussion above regarding live to drive feature). In a third substep, after the vehicle control module 90 completes the status check and confirms that the predetermined conditions are satisfied, the vehicle control module 90 sends a message to the battery controller 600 indicating full power is now acceptable. In a fourth substep, in response to receipt of the message, the battery controller 600 enables discharging at a second (higher) level (e.g., 240 amperes), which may be referred to as full power. Then, in step 1130 of these embodiments, the battery pack 252 provides discharge current to one or more of the drive motors 45 and deck motors 40 (e.g., up to the second level of discharge current).

Maneuvering Control Arm Calibration

Figure 40:
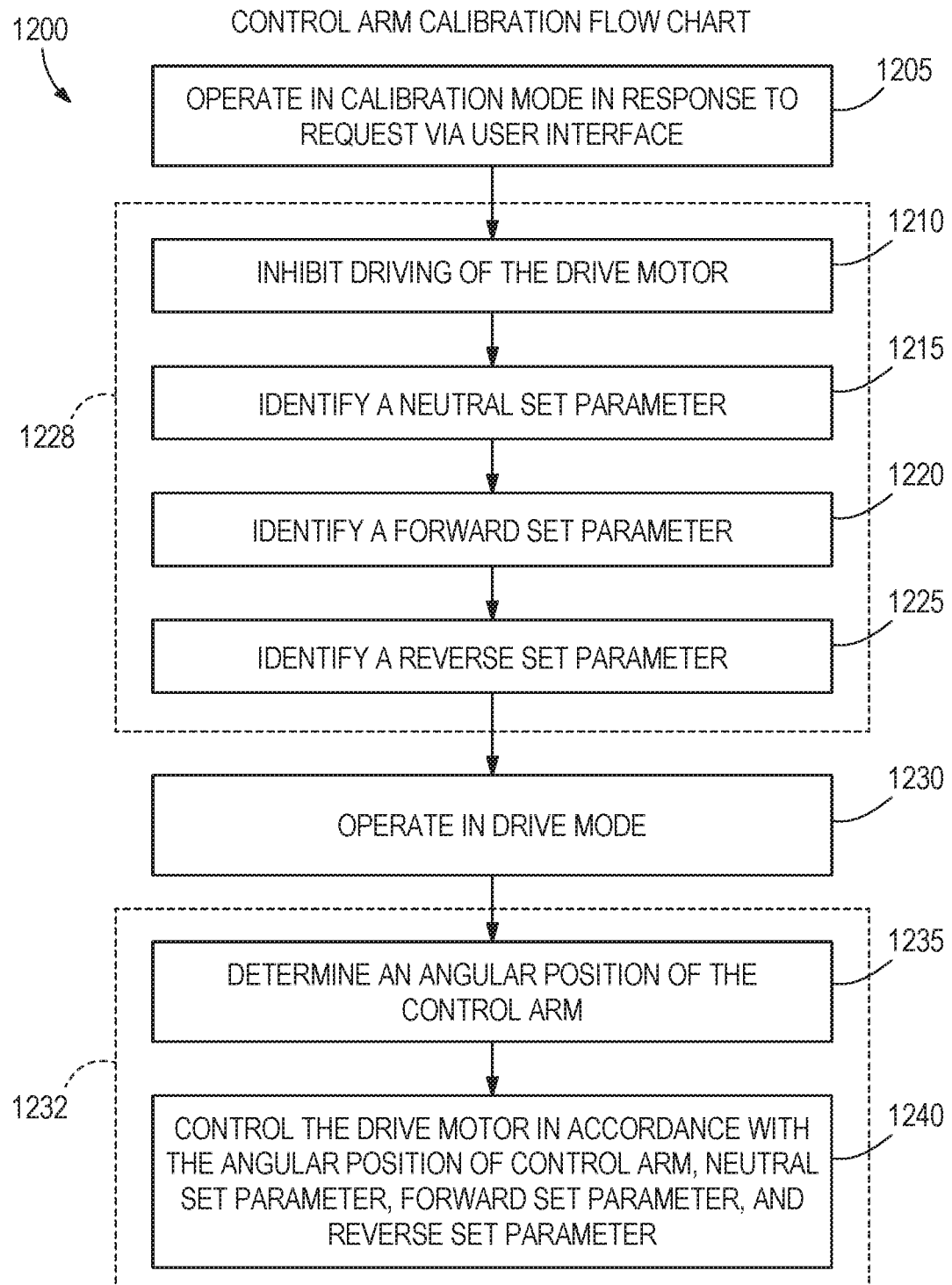
FIG. 40 illustrates a flow chart for a maneuvering control arm calibration method.

FIG. 40 illustrates a flow chart for a maneuvering control arm calibration method 1200 according to some embodiments. Although the method 1200 is described with respect to the mower 10 as shown herein, the method 1200 may also be implemented on other mowers (e.g., having more or fewer drive motors, more or fewer deck motors, and more or fewer battery packs) or on other electric vehicles. Further, for purposes of explanation, the method 1200 will be described with respect to the left control arm 72a, the drive motor controller 550a, and the (left) drive motor 45 associated with the drive motor controller 550a. However, the method 1200 is similarly applicable to the right control arm 72b, the drive motor controller 550b, and the (right) drive motor 45 associated with the drive motor controller 550b. That is, the method 1200 may be executed independently to calibrate the left control arm 72a and to calibrate the right control arm 72b.

In block 1205, the mower electronic controller 500 operates in a calibration mode in response to a request received via a user interface (e.g., the system interface 74) of the mower 10. For example, on the user display 78 may be a touch screen that includes a mode select button (soft key) 1207 (see 41A). When depressed or touched, the mode select button 1207 provides a request to the mower electronic controller 500 to enter the calibration mode. In some embodiments, the mode select button 1207 is provided as an electro-mechanical push button (hard key) on the user interface (e.g., near or on a housing of the user display 78).

In block 1210, while in the calibration mode, the mower electronic controller 500 inhibits driving of at least one drive motor (e.g., the drive motors 45). For example, while in the calibration mode, even though the control arms 72a or 72b may be pushed forward or pulled back, the vehicle control module 90 will not generate control signals to the motor controllers 505 to drive motors 45 so that the mower 10 will not be controlled to move. Additionally, a parking brake of the mower 10 may be actuated to prevent movement of the mower 10 while in the calibration mode.

In block 1215, while in the calibration mode, the mower electronic controller 500 identifies a neutral set parameter based on a first output value from the maneuvering control sensor 510 (a position sensor, see FIG. 18) associated with a neutral position of the left control arm 72a. As previously described, the control arm 72a is coupled to the frame 20 at the pivot joint 73a, and the control arm 72a is operable to pivot about the pivot joint 73a through a range of motion that includes a forward range of positions, a neutral position, and a reverse range of positions. The maneuvering control sensor 510 is configured to indicate an angular position of the left control arm 72a in the range of motion. For example, to the maneuvering control sensor 510 may include a position map (e.g., in a memory of the sensor) that maps potential sensed angles of the control arm to respective output values. The maneuvering control sensor 510, in turn, senses an angle and outputs the output value mapped to the sensed angle by the position map. Accordingly, in some embodiments, the value output by the maneuvering control sensor 510 while the left control arm 72a is in the neutral position is identified as the neutral set parameter. This neutral set parameter may be stored in a memory of the mower electronic controller 500 (e.g., the vehicle control module memory 507 of FIG. 19).

Figure 41A:
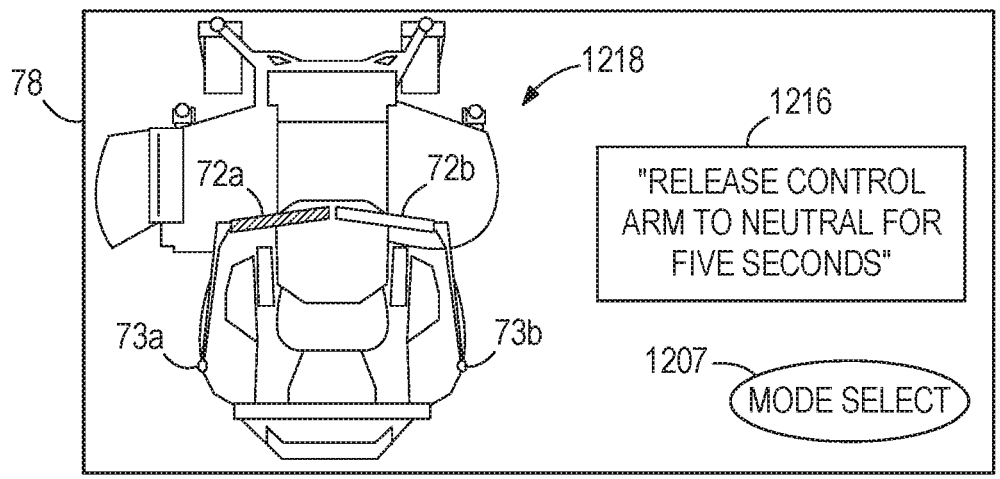
FIG. 41A illustrates a user display having a first mower calibration graphic.

In some embodiments, in block 1215, before identifying the neutral set parameter, the mower electronic controller 500 is configured to control the display 78 of the mower 10 to provide a first prompt on the display 78 to instruct the operator of the mower 10 to release the control arm 72a into the neutral position. For example, with reference to FIG. 41A, the display 78 includes a neutral prompt 1216 instructing the operator to release the control arm 72a and a neutral mower graphic 1218 illustrating the mower 10 with the control arm 72a in the neutral position. In some embodiments, as illustrated in FIG. 41A, the neutral mower graphic 1218 highlights the control arm that is being calibrated (i.e., the left control arm 72a in FIG. 41A, as opposed to the right control arm 72b).

In some embodiments, in block 1215, to identify the first output value as the neutral set parameter, the mower electronic controller 500 is configured to average output values from the maneuvering control sensor 510 over a period while the left control arm 72a is in the neutral position. For example, the period may be five seconds, or another similar time period. The determined average output value is then assigned as the neutral set parameter.

Figure 41B:
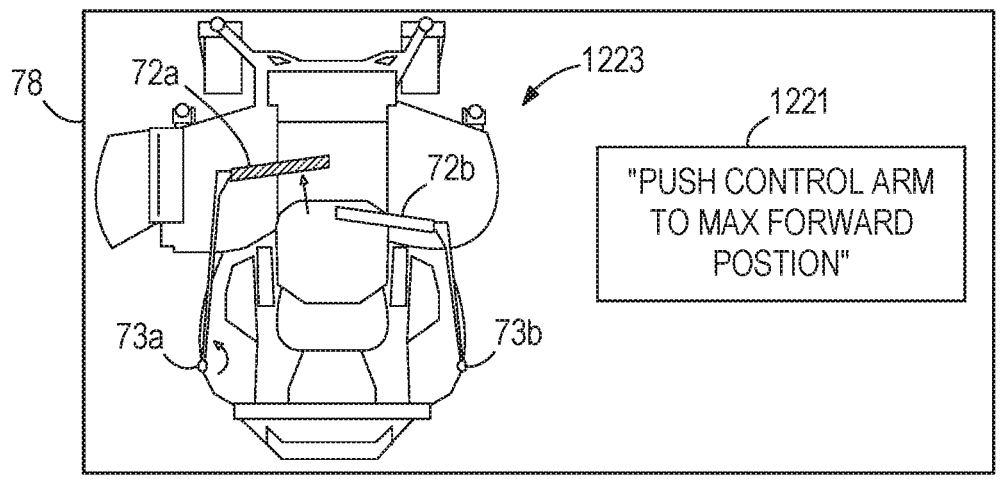
FIG. 41B illustrates the user display having a second mower calibration graphic.

In block 1220 and with additional reference to FIGS. 41B, while in the calibration mode, the mower electronic controller 500 identifies a second output value from the maneuvering control sensor 510 associated with a maximum forward position of the left control arm 72a as a forward set parameter. For example, in some embodiments, the value output by the maneuvering control sensor 510 while the left control arm 72a is pushed forward by the operator (e.g., fully forward until mechanically limited, or as far as the operator can reach) is identified as the forward set parameter. This forward set parameter may be stored in a memory of the mower electronic controller 500 (e.g., the vehicle control module memory 507 of FIG. 19).

In some embodiments, as seen in FIG. 41B, in block 1220, before identifying the forward set parameter, the mower electronic controller 500 is configured to control the display 78 of the mower 10 to provide a second prompt on the display 78 to instruct the operator of the mower 10 to push the control arm 72a into the forward position. FIG. 41B illustrates a forward prompt 1221 on the display 78 instructing the operator to push the left control arm 72a completely forward and a forward mower graphic 1223 illustrating the mower 10 with the control arm 72a in the forward position. In some embodiments, as illustrated in FIG. 41B, the forward mower graphic 1223 highlights the control arm that is being calibrated (i.e., the left control arm 72a in FIG. 41A, as opposed to the right control arm 72b).

In some embodiments, in block 1220, to identify the second output value as the forward set parameter, the mower electronic controller 500 is configured to detect the output value from the position sensor that has the greatest difference from the neutral set parameter while the control arm 72a is in the forward range (e.g., over a period, such as five seconds, or until the control arm 72a is released and returns to the neutral position). This output value with the greatest difference is then identified as the forward set parameter. In some embodiments, identifying this output value with the greatest difference as the forward set parameter is in response to the electronic controller also determining that this output value exceeds a minimum forward threshold value. For example, when the output value does not exceed the minimum forward threshold value, the output value is not identified as the forward set parameter, and the operator may again be provided the second prompt 1221 and the electronic controller may restart execution of the block 1220. In some embodiments, the minimum forward threshold value is used, for example, to ensure a minimum range of motion of the control arm 72a to enable the operator to control the drive motor 45 over a desired range of speeds with desired precision. In some embodiments, the minimum forward threshold is 10 degrees, at least 10 degrees, or another similar angle.

Figure 41C:
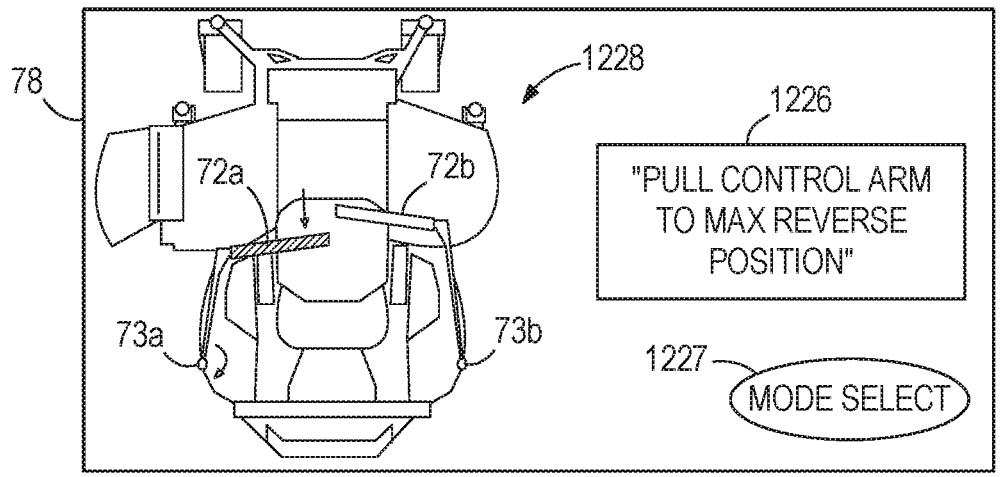
FIG. 41C illustrates the user display having a third mower calibration graphic.

In block 1225 and with additional reference to FIG. 41C, while in the calibration mode, the mower electronic controller 500 identifies a third output value from the maneuvering control sensor 510 associated with a maximum reverse position of the left control arm 72a as a reverse set parameter. For example, in some embodiments, the value output by the maneuvering control sensor 510 while the left control arm 72a is pulled back by the operator (e.g., pulled fully back until mechanically limited, or as far as the operator can pull) is identified as the reverse set parameter. This reverse set parameter may be stored in a memory of the mower electronic controller 500 (e.g., the vehicle control module memory 507 of FIG. 19).

In some embodiments, in block 1225, before identifying the reverse set parameter, the mower electronic controller 500 is configured to control the display 78 of the mower 10 to provide a third prompt on the display 78 to instruct the operator of the mower 10 to pull the control arm 72a into the reverse position. For example, with reference to FIG. 41C, the display 78 includes a reverse prompt 1226 instructing the operator to pull the left control arm 72a completely in reverse and a reverse mower graphic 1228 illustrating the mower 10 with the control arm 72a in the reverse position. In some embodiments, as illustrated in FIG. 41C, the reverse mower graphic 1228 highlights the control arm that is being calibrated (i.e., the left control arm 72a in FIG. 41A, as opposed to the right control arm 72b).

In some embodiments, in block 1225, to identify the third output value as the reverse set parameter, the mower electronic controller 500 is configured to detect the output value from the position sensor that has the greatest difference from the neutral set parameter while the control arm 72a is in the reverse range (e.g., over a period, such as five seconds, or until the control arm 72a is released and returns to the neutral position). This output value with the greatest difference is then identified as the reverse set parameter. In some embodiments, identifying this output value with the greatest difference as the reverse set parameter is in response to the electronic controller 500 also determining that this output value exceeds a minimum reverse threshold value. For example, when the output value does not exceed the minimum reverse threshold value, the output value is not identified as the reverse set parameter, and the operator may again be provided the second prompt 1226 and the electronic controller 500 may restart execution of the block 1225. In some embodiments, the minimum reverse threshold value is used, for example, to ensure a minimum range of motion of the control arm 72a to enable the operator to control the drive motor 45 over a desired range of speeds with desired precision. In some embodiments, the minimum reverse threshold is less than the minimum forward threshold. For example, the minimum reverse threshold may be 9 degrees, at least 9 degrees, or another similar angle.

As illustrated in FIG. 41C, in some embodiments after the reverse set parameter is identified in block 1225, a save button 1227 is displayed on the display 78. In response to detecting selection of the save button 1277 by the user on the display 78, the mower electronic controller 500 saves the identified neutral set parameter, forward set parameter, and reverse set parameter to a memory (e.g., the vehicle control module memory 507).

In some embodiments, blocks 1215, 1220, and 1225 are repeated for the right control arm 72b to identify a second neutral set parameter, a second forward set parameter, and a second reverse set parameter for the right control arm 72b.

In FIG. 40, a dashed box 1228 is illustrated around blocks 1210, 1215, 1220, and 1225 to signify that they occur while the mower electronic controller 500 is in the calibration mode. In some embodiments, after the neutral set parameter, the forward set parameter, and the reverse set parameter are identified (for one or both control arms 72a and 72b), the mower electronic controller 500 exits the calibration mode and begins operating in the drive mode (block 1230). A dashed box 1232 is illustrated around blocks 1235 and 1240 to signify that they occur while the mower electronic controller 500 is in the drive mode.

In block 1235, while operating in the drive mode, the mower electronic controller 500 determines an angular position of the left control arm 72a indicated by the maneuvering control sensor 510. For example, the maneuvering control sensor 510 senses the angular position of the left control arm 72a and, using the position map, generates an output value to the controller 500 that is indicative of the sensed angular position.

In block 1240, while operating in the drive mode, the mower electronic controller 500 controls the (left) drive motor 45 in accordance with the angular position of the left control arm 72a indicated by the maneuvering control sensor 510, the neutral set parameter, the forward set parameter, and the reverse set parameter. For example, when the angular position of the left control arm 72a is indicated to be at the neutral set parameter, the mower electronic controller 500 does not drive the drive motor 45. For example, a duty cycle of 0% is set by the drive motor controller 550a by the vehicle control module 90. When the angular position of the left control arm 72a is indicated to be at the forward set parameter, the mower electronic controller 500 drives the drive motor 45 at a maximum level in the forward direction. For example, the vehicle control module 90 may provide a control signal to the motor controller 550a and, in response, the motor controller 550a generates PWM control signals to the drive motor 45 forward and having a duty cycle of 100%. When the angular position of the left control arm 72a is indicated to be at the reverse set parameter, the mower electronic controller 500 drives the drive motor 45 at a maximum level in reverse. For example, the vehicle control module 90 may provide a control signal to the motor controller 550a and, in response, the motor controller 550a generates PWM control signals to the drive motor 45 in reverse and having a duty cycle of 100%. Additionally, when the angular position of the left control arm 72a is indicated to be at an angle between the forward set parameter and the neutral set parameter, the mower electronic controller 500 drives the drive motor 45 forward and at a speed proportional to the angle within the range of angles between the neutral set parameter and the forward set parameter. For example, when the range of angles between the neutral set parameter and the forward set parameter is 15 degrees, and the control arm 72a is at a midpoint in the range (i.e., 7.5 degrees), the PWM duty cycle may be 50%. Similarly, when the angular position of the left control arm 72a is indicated to be at an angle between the reverse set parameter and the neutral set parameter, the mower electronic controller 500 drives the drive motor 45 in reverse and at a speed proportional to the angle within the range of angles between the neutral set parameter and the reverse set parameter.

In some embodiments, in addition to the neutral set parameter, forward set parameter, and reverse set parameter, a deadband is determined for each parameter. The deadband provides a range of values for each respective parameter where, if the control arm 72a is determined to be in a deadband of a parameter, the mower electronic controller 500 controls the drive motor 45 as if the control arm 7a was at the particular parameter. For example, in some embodiments of the method 1200, while in the calibration mode, the mower electronic controller 500 determines one or more of: a neutral deadband based on the neutral set parameter, a maximum forward deadband based on the forward set parameter, and a maximum reverse deadband based on the reverse set parameter. For example, the mower electronic controller 500 may determine the neutral deadband by adding and subtracting a deadband value to the neutral set parameter (e.g., +/−3 degrees, +/−5 degrees, or +/−7 degrees). Similarly, the mower electronic controller 500 may determine the maximum forward and reverse deadband by adding and subtracting a deadband value to the forward and reverse set parameter, respectively (e.g., +/−3 degrees, +/−5 degrees, or +/−7 degrees). In some embodiments, the maximum forward and maximum reverse deadbands are each greater than the neutral deadband. When the mower electronic controller 500 is in the drive mode, the mower electronic controller 500 further controls the drive motor 45 in accordance with the angular position of the control arm indicated by the position sensor, the neutral deadband, the maximum forward deadband, and the maximum reverse deadband. Such control is similar to the control that was described above for block 1240, except that the deadbands are used in place of the specific neutral, forward set parameter, and reverse set parameter.

In some embodiments, while operating in the drive mode, the mower electronic controller 500 also executes block 1235 and 1240 for the right control arm 72b to drive the right drive motor 45 according to the angular position of the control arm 72b, the second neutral set parameter, the second forward set parameter, and the second reverse set parameter.

FIG. 42A provides an angular encoding diagram 1250 that illustrates a position map of the maneuvering control sensor 510 and the six parameters calibrated by embodiments of the method 1200 including the: neutral set parameter, the neutral deadband, the forward set parameter, the maximum forward deadband, the reverse set parameter, and the maximum reverse deadband. Additionally, the diagram 1250 illustrates an example of how the maneuvering control sensor 510 can map angles of the control arm 72a (and 72b) to output values ranging from 0 to 4096. For example, the maneuvering control sensor 510 may be a rotary encoder that includes a rotating spindle coupled to a base portion, where the rotating spindle is configured to rotate 360 degrees relative to the base portion about a longitudinal axis of the spindle. The rotary encoder may be, for example, an optical encoder, a non-contact magnetic rotary encoder, a digital potentiometer, or the like. A circuit or processor of the maneuvering control sensor 510 is configured to output a digital value, for example, from 0 to 4095, representing the current rotational angle of the spindle between 0 and 360 degrees. For example, in some such rotary encoders, a value of 0 equates to 0 (or 360) degrees, a value of 1024 equates to 90 degrees, a value of 2048 equates to 180 degrees, a value of 3072 equates to 270 degrees, and a value one more than the max of 4095 causes the encoder counter to return to a value of zero, again equating to 0 (or 360) degrees. A position map of the rotary encoder maps each rotational position of the rotating spindle to an associated encoder value. Additionally, the position map may be overwritten or updated to calibrate the rotary encoder so that, for example, a particular rotational position of the rotating spindle is assigned as the 0-degree position that generates a 0 output value. The other rotational positions of the rotary spindle (e.g., for degrees 1 through 359) in the position map are similarly assigned with updated output values to maintain the previously described relationship of rotational angle and encoder values. With reference to FIG. 1, at the pivot joint 73a, the base portion of the rotary encoder (not shown) may be fixed to the frame 20 and the rotating spindle of the rotary encoder (not shown) may be coupled to the left control arm 72a. Accordingly, as the control arm 72a pivots about the pivot joint 73a, the rotating spindle rotates relative to the base portion of the rotary encoder. In other words, the axis of rotation of the control arm 72a may be coaxial with the rotation axis of the rotating spindle. A rotary encoder may similarly be provided for the right control arm 72b. Because the range of angular motion of the control arms 72a and 72b is mechanically limited they cannot rotate for a complete 360-degree rotation), only a portion of the total range of encoder values may be used.

Returning to FIG. 42A, in the angular encoding diagram 1250, the maneuvering control sensor 510 maps a neutral position to a 180 degree position having a 2048 count value, the reverse set parameter to a value between 2048 (180 degrees) and 3072 (270 degrees), and the forward set parameter to a value between 102.4 (90 degrees) and 2048 (180 degrees). The mapping and precision of the encoding diagram 1250 are merely examples, and other mappings and precision levels are used in other embodiments. At least in some instances, the vehicle control module 90 may fault in response to output from the maneuvering control sensor 510 crossing the cross-over point (e.g., the maneuvering control sensor 510 providing an output that goes from 4095 (max value) to 0 (min value). Accordingly, in some embodiments, the neutral position is mapped to the 180 degree position having the 2048 count value, or another value spaced far enough from the 0 degree position so that the mapping does not overlap with the 0 (or 360) degree cross-over point.

In some embodiments, while in the calibration mode, the electronic controller 500 is further configured to update the position map of the maneuvering control sensor 510 to map a midpoint output value of the maneuvering control sensor 510 (e.g., 180 degrees/2048 count) to the neutral position of the control arm 72a. For example, if the neutral set parameter was determined to be 181 degrees (~2059 count), the position map may be updated with a one degree offset such that the maneuvering control sensor 510 will now output 180 degrees/2048 count when the control arm 72a is in the neutral position, Additionally, to accommodate this update, the electronic controller 500 updates the forward set parameter (and associated maximum forward deadband) based on an offset from the neutral set parameter and the midpoint output value, and updates the reverse set parameter (and associated maximum reverse deadband) based on the offset. For example, if the forward set parameter was previously 164 degrees, an offset of 1 degree would be added to result in the forward set parameter being 165 degrees. Further, the electronic controller 500 updates the neutral set parameter to be the midpoint output value (e.g., 180 degrees/2048 count) to accommodate the update.

FIGS. 42B and 42C illustrate partial angular encoding diagrams 1255 and 1260. Although the diagrams of FIGS. 42B and 42C are described with respect to the control arm 72a, they are similarly applicable to the control arm 72b. The diagrams 1255 and 1260 illustrate the neutral set parameter, a forward set parameter, and a maximum forward deadband, but the reverse set parameter and other deadbands are not illustrated to simplify the diagrams. The diagram 1255 provides an initial mapping for the control arm 72a with a first forward set parameter 1262, a first forward deadband 1264, and a neutral set parameter 1266. When the control arm 72a is sensed to be in the first forward deadband 1264, the mower electronic controller 500 drives the motor 45 at full speed (100%). When the control arm 72a is between the first forward deadband 1264 and the neutral set parameter 1366, the mower electronic controller 500 drives the motor 45 at a speed proportional to the sensed angle (e.g., between 0% speed when at the neutral set parameter and 99% speed when reaching the first forward deadband 1264).

The diagram 1260 provides a subsequent mapping for the control arm 72a with a revised forward set parameter 1268, a revised forward deadband 1270, and the neutral set parameter 1266. The subsequent mapping for the control arm 72a in the diagram 1260 may be generated using the calibration method 1200. The revised forward set parameter 1268 and the revised forward deadband 1270 are shifted such that the revised forward deadband 1270 is not reached until a greater angle of the control arm 72a is reached (i.e., the control arm 72*a* is pushed further forward) as compared with the diagram 1255 and the initial mapping, thus giving the user more fine tune drivability.

Thus, embodiments described herein provide, among other things, systems, methods, and devices related to electric vehicles, mowers, and chargers. Various features, advantages, and embodiments are set forth in the following claims.

What is claimed is:

1. An electronic device for charging an electric vehicle battery, the electronic device comprising:
   a frame;
   a battery compartment supported by the frame and defining an inner space;
   a lid for the battery compartment, the lid movable between an open position to provide access to the inner space and a closed position to restrict access to the inner space;
   a battery docking station in the inner space of the battery compartment;
   a battery pack connected to the docking station, the battery pack having an electronic controller, a pack out terminal configured to provide an output signal, a wake terminal configured to receive a wake signal, and a safety terminal configured to receive a safety signal, the battery pack configured to power a motor of an electric vehicle; and
   a safety circuit having
      a connector that connects the pack out terminal to the wake terminal to provide the output signal to the battery pack as the wake signal, and
      a lid sensor configured to provide the safety signal to the battery pack indicative of whether the lid is closed; and
   a charging circuit having a power input connector and a power output connector, the power input connector configured to receive power from an external source, the power output connector configured to provide charging current to the battery pack,
   wherein the electronic controller of the battery pack is configured to enable charging of the battery pack in response to receipt of the wake signal and the safety signal indicating that the lid is closed
   wherein the lid sensor includes a lid switch having an input terminal and an output terminal, the lid switch configured to close when the lid is in the closed position to make a connection between the input terminal and the output terminal, and open when the lid is in the open position to interrupt the connection between the input terminal and the output terminal; and
   wherein the safety circuit provides a connection between the pack out terminal and the input terminal of the lid switch.

2. The electronic device of claim 1, wherein the lid switch is a magnetically actuatable switch that is actuated to close when a magnet positioned on the lid is positioned within a range of the lid switch when the lid is closed, and that is actuated to open when a magnet positioned on the lid is positioned outside of the range of the lid switch when the lid is open.

3. The electronic device of claim 1, wherein the lid switch is a mechanically actuatable switch that is mechanically actuated to close when the lid is closed, and that is mechanically actuated to open when the lid is open.

4. The electronic device of claim 1, wherein the connector that connects the pack out terminal to the wake terminal is a jumper in a charger plug, the charger plug connecting the battery pack to the battery docking station.

5. The electronic device of claim 1, wherein the electronic controller is coupled to the pack out terminal and the wake terminal, and wherein the electronic controller is configured to:
   generate the output signal provided at the pack out terminal; and
   wake the battery pack in response to receipt of the wake signal.

6. The electronic device of claim 1, wherein the electronic device is an off-board charger separate from the electric vehicle.

7. The electronic device of claim 1, wherein the electronic device is a mower having the motor, and the electronic controller is further configured to:
   enable discharging of the battery pack in response to receipt of the wake signal and the safety signal; and
   provide current from cell so the battery pack to the motor after the enabling of discharging.

8. A method for charging or discharging a battery of an electric vehicle, the method comprising:
   receiving, at a docking station of the electric vehicle or an off-board charger, a battery pack, the docking station positioned in an inner space of a battery compartment of an electronic device, and the battery pack having an electronic controller, a pack out terminal, a wake terminal, and a safety terminal;
   providing, by the electronic controller, an output signal via the pack out terminal to a safety circuit of the electronic device;
   receiving, by the electronic controller, the output signal from the safety circuit as a wake signal via the wake terminal;
   receiving, by the electronic controller, a safety signal from a lid sensor via the safety terminal, the safety signal indicative of whether a lid for the battery compartment is closed;
   enabling charging of the battery pack, by the electronic controller, in response to receipt of the wake signal and the safety signal; and
   receiving, by the battery pack, charge current from a charging circuit after the enabling of charging;
   wherein the lid sensor includes a lid switch having an input terminal and an output terminal, the method further comprising:
   closing, by the lid switch, when the lid is in a closed position to make a connection between the input terminal and the output terminal, and
   opening, by the lid switch, when the lid is in an open position to interrupt the connection between the input terminal and the output terminal;
   wherein the safety circuit provides a connection between the pack out terminal and the input terminal of the lid switch.

9. The method of claim 8, wherein the docking station is of the electric vehicle, the method further comprising
   enabling discharging of the battery pack, by the electronic controller, in response to receipt of the wake signal and the safety signal; and
   providing, by the battery pack, current to a motor of the electric vehicle after the enabling of discharging.

10. The method of claim 8, wherein the lid switch is a magnetically actuatable switch that is actuated to close when a magnet positioned on the lid is positioned within a range of the lid switch when the lid is closed, and that is actuated to open when a magnet positioned on the lid is positioned outside of the range of the lid switch when the lid is open.

11. The method of claim 8, wherein the lid switch is a mechanically actuatable switch that is mechanically actuated to close when the lid is closed, and that is mechanically actuated to open when the lid is open.

12. The method of claim 8, wherein, receiving, by the electronic controller, the output signal from the safety circuit as the wake signal via the wake terminal includes:
  providing, by a connector of the safety circuit, the output signal as the wake signal to the wake terminal, wherein the connector is a jumper in a charger plug, the charger plug connecting the battery pack to the docking station.

13. The method of claim 8, further comprising:
  waking, by the electronic controller, the battery pack in response to receipt of the wake signal and the safety signal.

\* \* \* \* \*